(12) United States Patent
Hublou et al.

(10) Patent No.: US 10,048,706 B2
(45) Date of Patent: Aug. 14, 2018

(54) SYSTEM AND METHOD FOR OPTIMIZING USE OF INDIVIDUAL HVAC UNITS IN MULTI-UNIT CHILLER-BASED SYSTEMS

(75) Inventors: Scott Douglas Hublou, Redwood City, CA (US); John Douglas Steinberg, Millbrae, CA (US)

(73) Assignee: EcoFactor, Inc., Redwood City, CA (US)

( * ) Notice: Subject to any disclaimer, the term of this patent is extended or adjusted under 35 U.S.C. 154(b) by 470 days.

(21) Appl. No.: 13/523,697

(22) Filed: Jun. 14, 2012

(65) Prior Publication Data

US 2013/0338837 A1    Dec. 19, 2013

(51) Int. Cl.
  *G05D 23/00*    (2006.01)
  *G05D 23/19*    (2006.01)
(52) U.S. Cl.
  CPC ................ *G05D 23/1923* (2013.01)
(58) Field of Classification Search
  CPC .................................................. G05D 23/00
  USPC ....................................................... 700/278
  See application file for complete search history.

(56) References Cited

U.S. PATENT DOCUMENTS

| | | |
|---|---|---|
| 4,136,732 A | 1/1979 | Demaray et al. |
| 4,270,693 A | 6/1981 | Hayes |
| 4,341,345 A | 7/1982 | Hammer et al. |
| 4,403,644 A | 9/1983 | Hebert |
| 4,451,879 A | 5/1984 | Welch et al. |
| 4,475,685 A | 10/1984 | Grimado et al. |
| 4,655,279 A | 4/1987 | Harmon |
| 4,674,027 A | 6/1987 | Beckey |
| 4,675,828 A * | 6/1987 | Winston .............. G06Q 50/06 340/870.03 |
| 4,702,305 A | 10/1987 | Beckey et al. |
| 4,702,413 A | 10/1987 | Beckey et al. |
| 4,897,798 A | 1/1990 | Cler |
| 5,124,502 A | 6/1992 | Nelson et al. |
| 5,244,146 A | 9/1993 | Jefferson et al. |
| 5,270,952 A | 12/1993 | Adams et al. |
| 5,279,458 A | 1/1994 | Dewolf et al. |

(Continued)

FOREIGN PATENT DOCUMENTS

| | | |
|---|---|---|
| EP | 0415747 | 3/1991 |
| EP | 1102500 A2 | 5/2001 |

(Continued)

OTHER PUBLICATIONS

U.S. Appl. No. 13/523,697, filed Jun. 14, 2012, Hublou, Scott Douglas et al.

(Continued)

*Primary Examiner* — Miranda Huang
*Assistant Examiner* — John Park
(74) *Attorney, Agent, or Firm* — Knobbe, Martens, Olson & Bear, LLP

(57) ABSTRACT

Systems are disclosed for allocating the cost of operating an HVAC system of a multiunit structure. The HVAC system comprises at least a first component that consumes energy based on thermostatic settings in a particular unit of the multiunit structure. In addition, associated with the multiunit structure, is a second component such as a central heating and air conditioning unit. The run time associated with the first component as reported by the thermostatic controller is used as a determinant of the cost of operation of the second component.

16 Claims, 52 Drawing Sheets

(56) References Cited

U.S. PATENT DOCUMENTS

| | | |
|---|---|---|
| 5,297,838 A | 3/1994 | Juravich |
| 5,314,004 A | 5/1994 | Strand et al. |
| 5,348,078 A | 9/1994 | Dushane et al. |
| 5,454,511 A | 10/1995 | Van Ostrand et al. |
| 5,462,225 A | 10/1995 | Massara et al. |
| 5,544,036 A | 8/1996 | Brown et al. |
| 5,555,927 A | 9/1996 | Shah |
| 5,572,438 A | 11/1996 | Ehlers et al. |
| 5,682,949 A | 11/1997 | Ratcliffe et al. |
| 5,706,190 A | 1/1998 | Russ et al. |
| 5,717,609 A | 2/1998 | Packa et al. |
| 5,725,148 A | 3/1998 | Hartman |
| 5,729,474 A | 3/1998 | Hildebrand et al. |
| 5,818,347 A | 10/1998 | Dolan et al. |
| 5,839,654 A | 11/1998 | Weber |
| 5,977,964 A | 11/1999 | Williams et al. |
| 6,079,626 A | 6/2000 | Hartman |
| 6,115,713 A | 9/2000 | Pascucci et al. |
| 6,145,751 A | 11/2000 | Ahmed |
| 6,178,362 B1 | 1/2001 | Woolard et al. |
| 6,223,544 B1 | 5/2001 | Seem |
| 6,241,156 B1 | 6/2001 | Kline et al. |
| 6,260,765 B1 | 7/2001 | Natale et al. |
| 6,351,693 B1 | 2/2002 | Monie |
| 6,400,956 B1 | 6/2002 | Richton |
| 6,400,996 B1 | 6/2002 | Hoffberg et al. |
| 6,437,692 B1 | 8/2002 | Petite et al. |
| 6,449,534 B1 | 9/2002 | Stewart |
| 6,454,177 B1 | 9/2002 | Sasao et al. |
| 6,478,233 B1 | 11/2002 | Shah |
| 6,480,803 B1 | 11/2002 | Pierret et al. |
| 6,483,906 B1 | 11/2002 | Lggulden et al. |
| 6,536,675 B1 | 3/2003 | Pesko et al. |
| 6,542,076 B1 | 4/2003 | Joao |
| 6,549,130 B1 | 4/2003 | Joao |
| 6,574,537 B2 | 6/2003 | Kipersztok et al. |
| 6,580,950 B1 | 6/2003 | Johnson |
| 6,594,825 B1 | 7/2003 | Goldschmidtlki et al. |
| 6,595,430 B1 | 7/2003 | Shah |
| 6,598,056 B1 | 7/2003 | Hull et al. |
| 6,619,555 B2 | 9/2003 | Rosen |
| 6,622,097 B2 | 9/2003 | Hunter |
| 6,622,115 B1 | 9/2003 | Brown et al. |
| 6,622,925 B2 | 9/2003 | Carner et al. |
| 6,622,926 B1 | 9/2003 | Sartain et al. |
| 6,628,997 B1 | 9/2003 | Fox et al. |
| 6,633,823 B2 | 10/2003 | Bartone et al. |
| 6,643,567 B2 | 11/2003 | Kolk et al. |
| 6,644,098 B2 | 11/2003 | Cardinale et al. |
| 6,671,586 B2 | 12/2003 | Davis et al. |
| 6,695,218 B2 | 2/2004 | Fleckenstein |
| 6,700,224 B2 | 3/2004 | Biskup, Sr. |
| 6,726,113 B2 | 4/2004 | Guo |
| 6,731,992 B1 | 5/2004 | Ziegler |
| 6,734,806 B1 | 5/2004 | Cratsley |
| 6,772,052 B1 | 8/2004 | Amundsen |
| 6,785,592 B1 | 8/2004 | Smith |
| 6,785,630 B2 | 8/2004 | Kolk |
| 6,786,421 B2 | 9/2004 | Rosen |
| 6,789,739 B2 | 9/2004 | Rosen |
| 6,845,918 B2 | 1/2005 | Rotondo |
| 6,853,959 B2 | 2/2005 | Ikeda et al. |
| 6,868,293 B1 | 3/2005 | Schurr |
| 6,868,319 B2 | 3/2005 | Kipersztok et al. |
| 6,882,712 B1 | 4/2005 | Iggulden et al. |
| 6,889,908 B2 | 5/2005 | Crippen et al. |
| 6,912,429 B1 | 6/2005 | Bilger |
| 6,891,838 B1 | 10/2005 | Petite et al. |
| 6,981,383 B2 | 1/2006 | Shah et al. |
| 6,991,029 B2 | 1/2006 | Orfield et al. |
| 7,009,493 B2 | 3/2006 | Howard |
| 7,031,880 B1 | 4/2006 | Seem et al. |
| 7,039,532 B2 | 5/2006 | Hunter |
| 7,061,393 B2 | 6/2006 | Buckingham et al. |
| 7,089,088 B2 | 8/2006 | Terry et al. |
| 7,130,719 B2 | 10/2006 | Ehlers et al. |
| 7,130,832 B2 | 10/2006 | Bannai et al. |
| H2176 H | 12/2006 | Meyer et al. |
| 7,167,079 B2 | 1/2007 | Smyth et al. |
| 7,187,986 B2 | 3/2007 | Johnson et al. |
| 7,205,892 B2 | 4/2007 | Luebke et al. |
| 7,206,670 B2 | 4/2007 | Pimputkar et al. |
| 7,215,746 B2 | 5/2007 | Iggulden et al. |
| 7,216,015 B2 | 5/2007 | Poth |
| 7,231,424 B2 | 6/2007 | Bodin et al. |
| 7,232,075 B1 | 6/2007 | Rosen |
| 7,242,988 B1 | 7/2007 | Hoffberg et al. |
| 7,260,823 B2 | 8/2007 | Schlack et al. |
| 7,356,384 B2 | 4/2008 | Gull et al. |
| 7,476,020 B2 | 1/2009 | Zufferey et al. |
| 7,483,964 B1 | 1/2009 | Jackson et al. |
| 7,590,469 B2 | 9/2009 | Grohman |
| 7,644,869 B2 | 1/2010 | Hoglund et al. |
| 7,702,424 B2 | 4/2010 | Cannon et al. |
| 7,758,729 B1 | 7/2010 | DeWhitt |
| 7,784,704 B2 | 8/2010 | Harter |
| 7,848,900 B2 | 12/2010 | Steinberg et al. |
| 7,869,904 B2 | 1/2011 | Cannon et al. |
| 7,894,943 B2 | 2/2011 | Sloup et al. |
| 7,908,116 B2 | 3/2011 | Steinberg et al. |
| 7,908,117 B2 | 3/2011 | Steinberg et al. |
| 7,983,795 B2 | 7/2011 | Josephson et al. |
| 8,010,237 B2 | 8/2011 | Cheung et al. |
| 8,019,567 B2 | 9/2011 | Steinberg et al. |
| D646,990 S | 10/2011 | Rhodes |
| 8,090,477 B1 | 1/2012 | Steinberg |
| 8,131,497 B2 | 3/2012 | Steinberg et al. |
| 8,131,506 B2 | 3/2012 | Steinberg et al. |
| D659,560 S | 5/2012 | Rhodes |
| 8,180,492 B2 | 5/2012 | Steinberg |
| 8,340,826 B2 | 12/2012 | Steinberg |
| D673,467 S | 1/2013 | Lee et al. |
| 8,412,488 B2 | 4/2013 | Steinberg et al. |
| 8,423,322 B2 | 4/2013 | Steinberg et al. |
| 8,428,782 B2 | 4/2013 | Imes |
| 8,428,785 B2 | 4/2013 | Boucher et al. |
| 8,457,797 B2 | 6/2013 | Imes et al. |
| 8,498,753 B2 | 7/2013 | Steinberg et al. |
| 8,556,188 B2 | 10/2013 | Steinberg |
| 8,596,550 B2 | 12/2013 | Steinberg et al. |
| 8,712,590 B2 | 4/2014 | Steinberg |
| D705,095 S | 5/2014 | Steinberg et al. |
| 8,738,327 B2 | 5/2014 | Steinberg et al. |
| 8,740,100 B2 | 6/2014 | Steinberg |
| 8,751,186 B2 | 6/2014 | Steinberg et al. |
| 8,840,033 B2 | 9/2014 | Steinberg |
| 8,850,348 B2 | 9/2014 | Fadell et al. |
| 8,886,488 B2 | 11/2014 | Steinberg et al. |
| 9,057,649 B2 | 6/2015 | Steinberg et al. |
| 9,134,710 B2 | 9/2015 | Cheung et al. |
| 9,194,597 B2 | 11/2015 | Steinberg et al. |
| 9,244,470 B2 | 1/2016 | Steinberg |
| 9,279,594 B2 | 3/2016 | Steinberg |
| 9,709,292 B2 | 7/2017 | Steinberg |
| 2001/0025349 A1 | 9/2001 | Sharood et al. |
| 2003/0040934 A1 | 2/2003 | Skidmore et al. |
| 2004/0065095 A1 | 4/2004 | Osborne et al. |
| 2004/0117330 A1 | 6/2004 | Ehlers et al. |
| 2004/0133314 A1 | 7/2004 | Ehlers et al. |
| 2004/0176880 A1 | 9/2004 | Obradovich et al. |
| 2005/0222889 A1 | 10/2005 | Lai et al. |
| 2005/0288822 A1 | 12/2005 | Rayburn |
| 2006/0045105 A1 | 3/2006 | Dobosz et al. |
| 2006/0214014 A1 | 9/2006 | Bash et al. |
| 2006/0283965 A1 | 12/2006 | Mueller et al. |
| 2007/0043477 A1 | 2/2007 | Elhers et al. |
| 2007/0045431 A1 | 3/2007 | Chapman et al. |
| 2007/0146126 A1 | 6/2007 | Wang |
| 2008/0083234 A1 | 4/2008 | Krebs et al. |
| 2008/0083834 A1 | 4/2008 | Krebs et al. |
| 2008/0198549 A1 | 8/2008 | Rasmussen et al. |
| 2008/0281472 A1 | 11/2008 | Podgorny et al. |
| 2009/0005070 A1 | 1/2009 | Forstall et al. |
| 2009/0018673 A1 | 1/2009 | Dushane et al. |

(56) References Cited

U.S. PATENT DOCUMENTS

| | | |
|---|---|---|
| 2009/0052859 A1 | 2/2009 | Greenberger et al. |
| 2009/0057426 A1 | 3/2009 | Sullivan et al. |
| 2009/0062970 A1 | 3/2009 | Forbes et al. |
| 2009/0065596 A1 | 3/2009 | Seem et al. |
| 2009/0099699 A1 | 4/2009 | Steinberg et al. |
| 2009/0125151 A1 | 5/2009 | Steinberg et al. |
| 2009/0188985 A1* | 7/2009 | Scharing .......... F24F 3/06 237/1 R |
| 2009/0240381 A1 | 9/2009 | Lane |
| 2009/0271013 A1 | 10/2009 | Chen |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0156608 A1 | 6/2010 | Bae et al. |
| 2010/0162285 A1 | 6/2010 | Cohen et al. |
| 2010/0211224 A1 | 8/2010 | Keeling et al. |
| 2010/0235004 A1 | 9/2010 | Thind |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0031323 A1 | 2/2011 | Nold et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0173542 A1 | 7/2011 | Imes et al. |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0253796 A1* | 10/2011 | Posa et al. ............ 236/49.3 |
| 2011/0290893 A1 | 12/2011 | Steinberg |
| 2011/0307101 A1 | 12/2011 | Imes et al. |
| 2011/0307103 A1 | 12/2011 | Cheung et al. |
| 2012/0023225 A1 | 1/2012 | Imes et al. |
| 2012/0046859 A1 | 2/2012 | Imes et al. |
| 2012/0064923 A1 | 3/2012 | Imes et al. |
| 2012/0065935 A1 | 3/2012 | Steinberg et al. |
| 2012/0072033 A1 | 3/2012 | Imes et al. |
| 2012/0086562 A1 | 4/2012 | Steinberg |
| 2012/0093141 A1 | 4/2012 | Imes et al. |
| 2012/0101637 A1 | 4/2012 | Imes et al. |
| 2012/0135759 A1 | 5/2012 | Imes et al. |
| 2012/0158350 A1 | 6/2012 | Steinberg et al. |
| 2012/0186774 A1 | 7/2012 | Matsuoka et al. |
| 2012/0215725 A1 | 8/2012 | Imes et al. |
| 2012/0221151 A1 | 8/2012 | Steinberg |
| 2012/0221718 A1 | 8/2012 | Imes et al. |
| 2012/0252430 A1 | 10/2012 | Imes et al. |
| 2012/0324119 A1 | 12/2012 | Imes et al. |
| 2013/0053054 A1 | 2/2013 | Lovitt et al. |
| 2013/0054758 A1 | 2/2013 | Imes et al. |
| 2013/0054863 A1 | 2/2013 | Imes et al. |
| 2013/0060387 A1 | 3/2013 | Imes et al. |
| 2013/0073094 A1 | 3/2013 | Knapton et al. |
| 2013/0144445 A1 | 6/2013 | Steinberg |
| 2013/0144453 A1 | 6/2013 | Subbloie |
| 2013/0167035 A1 | 6/2013 | Imes et al. |
| 2013/0173064 A1 | 7/2013 | Fadell et al. |
| 2013/0178985 A1* | 7/2013 | Lombard .......... G05D 23/1904 700/276 |
| 2013/0226502 A1 | 8/2013 | Steinberg et al. |
| 2013/0231785 A1 | 9/2013 | Steinberg et al. |
| 2013/0310989 A1 | 11/2013 | Steinberg et al. |
| 2014/0039690 A1 | 2/2014 | Steinberg |
| 2014/0058567 A1* | 2/2014 | Matsuoka .......... G05D 23/1917 700/276 |
| 2014/0188290 A1 | 7/2014 | Steinberg et al. |
| 2014/0229018 A1 | 8/2014 | Steinberg |
| 2014/0316581 A1 | 10/2014 | Fadell et al. |
| 2015/0021405 A1 | 1/2015 | Steinberg |
| 2015/0025691 A1 | 1/2015 | Fadell et al. |
| 2015/0043615 A1 | 2/2015 | Steinberg et al. |
| 2015/0120235 A1 | 4/2015 | Steinberg et al. |
| 2015/0142180 A1 | 5/2015 | Matsuoka et al. |
| 2015/0168001 A1 | 6/2015 | Steinberg |
| 2016/0061474 A1 | 3/2016 | Cheung et al. |
| 2016/0091219 A1 | 3/2016 | Steinberg et al. |
| 2016/0097557 A1 | 4/2016 | Steinberg |
| 2016/0138822 A1 | 5/2016 | Steinberg |
| 2016/0238270 A1 | 8/2016 | Steinberg |
| 2016/0363337 A1 | 12/2016 | Steinberg et al. |
| 2017/0241662 A1 | 8/2017 | Steinberg et al. |
| 2017/0336090 A1 | 11/2017 | Steinberg |

FOREIGN PATENT DOCUMENTS

| | | |
|---|---|---|
| EP | 2372263 A2 | 5/2011 |
| GB | 2408592 A | 6/2005 |
| JP | 05-189659 | 7/1993 |
| JP | 2010-038377 | 2/2010 |
| JP | 2010-286218 | 12/2010 |
| KR | 10-1994-0011902 | 6/1994 |
| KR | 10-1999-0070368 | 9/1999 |
| KR | 10-2000-0059532 | 10/2000 |
| WO | WO 2005098331 A1 * | 10/2005 |
| WO | WO 2009/036764 A2 | 3/2009 |
| WO | WO 2011/011404 A1 | 1/2011 |
| WO | WO 2011/100427 A2 | 8/2011 |
| WO | WO 2011/149600 | 12/2011 |
| WO | WO 2012/024534 | 2/2012 |
| WO | WO 2013/187996 | 12/2013 |

OTHER PUBLICATIONS

U.S. Appl. No. 13/852,577, filed Mar. 28, 2013, Steinberg, John Douglas et al.
U.S. Appl. No. 13/861,189, filed Apr. 11, 2013, Steinberg, John Douglas et al.
Arens, et al., "How Ambient Intelligence Will Improve Habitability and Energy Efficiency in Buildings", 2005, research paper, Center for the Built Environment, Controls and Information Technology.
Bourhan, et al., "Cynamic model of an HVAC system for control analysis", Elsevier 2004.
Brush, et al., Preheat—Controlling Home Heating with Occupancy Prediction, 2013.
Comverge SuperStat Flyer, prior to Jun. 28, 2007.
Control4 Wireless Thermostat Brochure, 2006.
Cooper Power Systems Web Page, 2000-2009.
Emerson Climate Technologies, "Network Thermostat for E2 Building Controller Installation and Operation Manual", 2007.
Enernoc Web Page, 2004-2009.
Enerwise Website, 1999-2009.
Gupta, Adding GPS-Control to Traditional Thermostats: An Exploration of Potential Energy Savings and Design Challenges, MIT, 2009.
Gupta, et al., A Persuasive GPS-Controlled Thermostat System, MIT, 2008.
Honeywell Programmable Thermostat Owner's Guide, www.honeywell.com/yourhome, 2004.
Honeywell, W7600/W7620 Controller Reference Manual, HW0021207, Oct. 1992.
International Search Report and Written Opinion for PCT/US2013/035726, dated Aug. 6, 2013.
Johnson Controls, "T600HCx-3 Single-Stage Thermostats", 2006.
Johnson Controls, Touch4 building automation system brochure, 2007.
Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.

(56) References Cited

OTHER PUBLICATIONS

Krumm, et al., Learning Time-Based Presence Probabilities, Jun. 2011.
Lin, et al., "Multi-Sensor Single-Actuator Control of HVAC Systems", 2002.
Pier, Southern California Edison, Demand Responsive Control of Air Conditioning via Programmable Communicating Thermostats Draft Report, 2006.
Proliphix Thermostat Brochure, prior to Jun. 2007.
Raji, "Smart Networks for Control", IEEE Spectrum, Jun. 1994.
Scott, et al., Home Heating Using GPS-Based Arrival Prediction, 2010.
Wang, et al., "Opportunities to Save Energy and Improve Comfort by Using Wireless Sensor Networks in Buildings," (2003), Center for Environmental Design Research.
Wetter, et al., A comparison of deterministic and probabilistic optimization algorithms for nonsmooth simulation-based optimization., Building and Environment 39, 2004, pp. 989-999.
Written Opinion and Search Report for PCT/US2011/032537, dated Dec. 12, 2011.
U.S. Appl. No. 13/470,074, filed Aug. 30, 2012, Steinberg.
U.S. Appl. No. 13/725,447, filed Jun. 6, 2013, Steinberg.
U.S. Appl. No. 13/858,710, filed Sep. 5, 2013, Steinberg et al.
U.S. Appl. No. 14/082,675, filed Nov. 18, 2003, Steinberg et al.
U.S. Appl. No. 14/263,762, filed Apr. 28, 2014, Steinberg.
U.S. Appl. No. 14/285,384, filed May 22, 2014, Steinberg, et al.
U.S. Appl. No. 14/292,377, filed May 30, 2014, Steinberg.
U.S. Appl. No. 14/491,554, filed Sep. 19, 2014, Steinberg.
U.S. Appl. No. 14/527,433, filed Oct. 29, 2014, Steinberg, et al.
International Preliminary Report on Patentability in PCT/US2013/035726 dated Dec. 16, 2014.
U.S. Appl. No. 12/805,705, filed Jun. 10, 2010, Crabtree.
U.S. Appl. No. 13/729,401, filed Dec. 28, 2012, Sloop.
U.S. Appl. No. 14/731,221, filed Jun. 4, 2015, Steinberg, et al.
Cheng et al., "Smart Sensors Enable Smart Air Conditioning Control", Sensors 2014, ISSN 1424-8220, Jun. 24, 2014, 25 pages.
Simmini et al., Energy Efficient Control and Fault Detection for HVAC Systems, Univ. of Padova, XXVI Series, 2014, 144 pages.
Sklavounos, "Detection of Abnormal Situations and Energy Efficiency Control in Heating Ventilation and Air Conditioning (HVAC) Systems", Brunel University thesis, Sep. 2015, 151 pages.
Extended Search Report for European Application No. 13804057.1 dated Jun. 1, 2016.
U.S. Appl. No. 15/616,719, filed Jun. 7, 2017, Steinberg, et al.
Gunes et al., "Improving Energy Efficiency and Thermal Comfort of Smart Buildings with HVAC Systems in the Presence of Sensor Faults", IEEE, Aug. 24-26, 2015, 6 pages.
Office Action in Canadian Application No. 2800491 dated Dec. 7, 2016.
Search Report in European Application No. 11787067.5 dated Aug. 14, 2017.
Extended Search Report for European Application No. 11818805.1 dated Jun. 9, 2017.
Examination Report in Australian Application No. 2013274827 dated Apr. 11, 2017.

\* cited by examiner

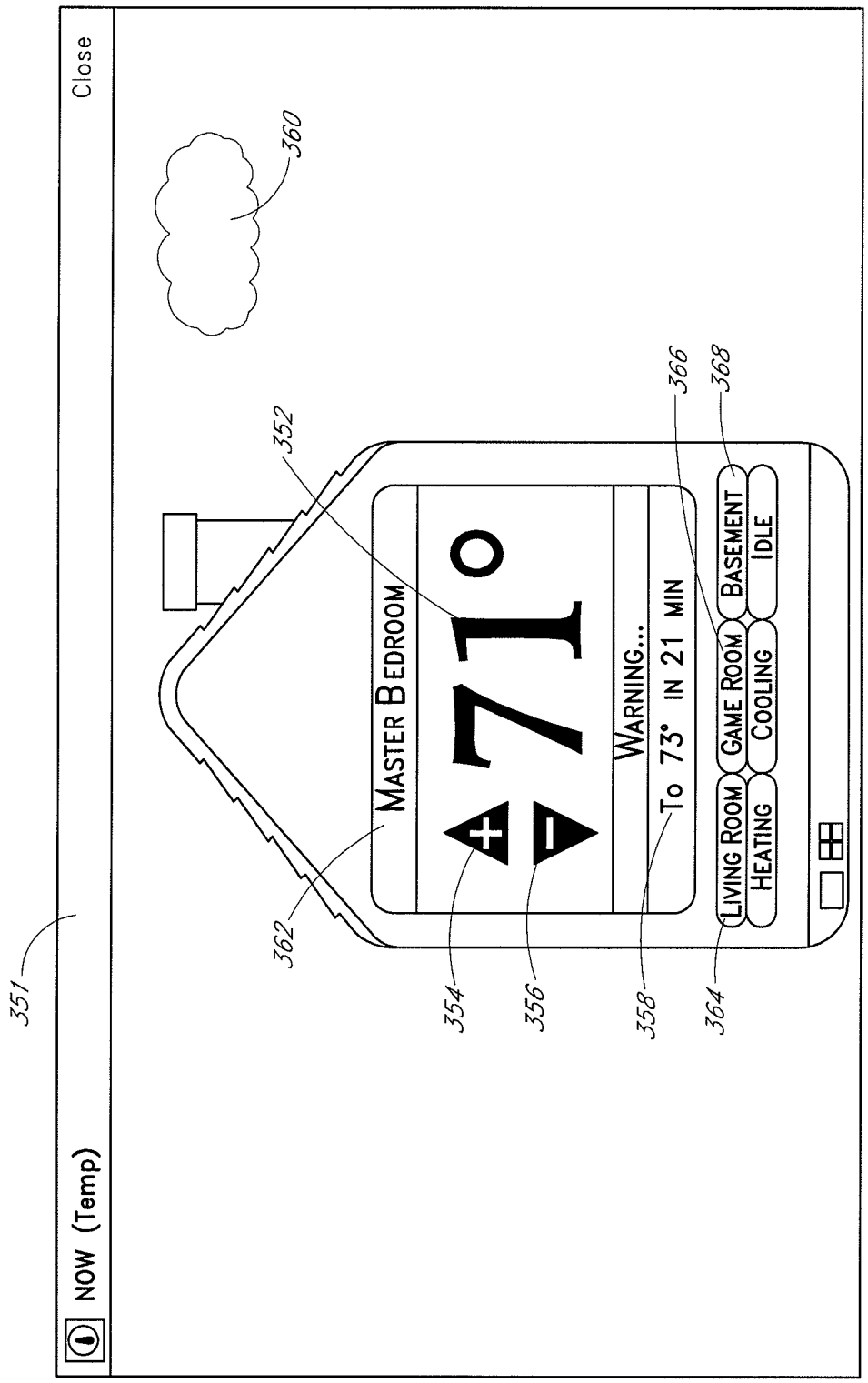

FIG. 14

| Time (hh24:mm) | Temperature | | Outside Conditions | | | | | Inside Conditions | | | | | | |
|---|---|---|---|---|---|---|---|---|---|---|---|---|---|---|
| | Inside Temp. | Outside Temp. | Conditions | Humidity | Pressure | Wind Speed | Wind Direction | Cool Setting | Heat Setting | Hold Mode | Schd Setting | Schd Cool | Schd Heat | Hvac State | Hvac Mode |
| 2009/04/10 11:00 | 69.70 | 54.00 | Mostly Cloudy | 74% | 29.89in/ 1012.1hPa Steady | 1.0mph 1.6kph | SE | 80.00 | 71.00 | Off | Out/Day | 80.00 | 65.00 | Heat | Heat |
| 2009/04/10 11:01 | 69.69 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:02 | 69.60 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:03 | 69.70 | 54.10 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:04 | 69.70 | 54.10 | Overcast | 74% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:05 | 69.70 | 54.70 | Overcast | 74% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:06 | 69.80 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:07 | 69.80 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:08 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |
| 2009/04/10 11:09 | 70.00 | 54.70 | Overcast | 72% | 29.89in/ 1012.1hPa Rising | 2.0mph 3.2kph | SE | 80.00 | 71.00 | Off | Out/Day | 80.00 | 65.00 | Heat | Heat |
| 2009/04/10 11:10 | 70.00 | 54.70 | Overcast | 72% | 29.89in/ 1012.1hPa Steady | 2.0mph 3.2kph | SE | 80.00 | 71.00 | Off | Out/Day | 80.00 | 65.00 | Heat | Heat |

FIG. 17

| FIG. 17-1 |
|---|
| FIG. 17-2 |

FIG. 17-1

| Outside/Inside Difference, Degrees F | Predicted Inside Temp Change, Degrees F/hour | Outside/Inside Difference, Degrees F | Predicted Inside Temp Change, Degrees F/hour | Outside/Inside Difference, Degrees F | Predicted Inside Temp Change, Degrees F/hour | Outside/Inside Difference, Degrees F | Predicted Inside Temp Change, Degrees F/hour |
|---|---|---|---|---|---|---|---|
| -99 | -1.20945425 | -49 | 0.61355475 | 1 | 2.43656376 | 51 | 4.25957277 |
| -98 | -1.17299407 | -48 | 0.65001493 | 2 | 2.47302394 | 52 | 4.29603295 |
| -97 | -1.13653389 | -47 | 0.68647511 | 3 | 2.50948412 | 53 | 4.33249313 |
| -96 | -1.10007371 | -46 | 0.72293529 | 4 | 2.5459443 | 54 | 4.36895331 |
| -95 | -1.06361353 | -45 | 0.75939547 | 5 | 2.58240448 | 55 | 4.40541349 |
| -94 | -1.02715335 | -44 | 0.79585565 | 6 | 2.61886466 | 56 | 4.44187367 |
| -93 | -0.99069317 | -43 | 0.83231583 | 7 | 2.65532484 | 57 | 4.47833385 |
| -92 | -0.95423299 | -42 | 0.86877602 | 8 | 2.69178502 | 58 | 4.51479403 |
| -91 | -0.91777281 | -41 | 0.9052362 | 9 | 2.7282452 | 59 | 4.55125421 |
| -90 | -0.88131263 | -40 | 0.94169638 | 10 | 2.76470538 | 60 | 4.58771439 |
| -89 | -0.84485245 | -39 | 0.97815656 | 11 | 2.80116556 | 61 | 4.62417457 |
| -88 | -0.80839227 | -38 | 1.01461674 | 12 | 2.83762574 | 62 | 4.66063475 |
| -87 | -0.77193209 | -37 | 1.05107692 | 13 | 2.87408592 | 63 | 4.69709493 |
| -86 | -0.73547191 | -36 | 1.0542371 | 14 | 2.9105461 | 64 | 4.73355511 |
| -85 | -0.69901173 | -35 | 1.12399728 | 15 | 2.94700628 | 65 | 4.77001529 |
| -84 | -0.66255155 | -34 | 1.16045746 | 16 | 2.98346646 | 66 | 4.80647547 |
| -83 | -0.62609137 | -33 | 1.19691764 | 17 | 3.01992664 | 67 | 4.84293565 |
| -82 | -0.58963119 | -32 | 1.23337782 | 18 | 3.05638682 | 68 | 4.87939583 |
| -81 | -0.55317101 | -31 | 1.269838 | 19 | 3.092847 | 69 | 4.91585601 |
| -80 | -0.51671083 | -30 | 1.30629818 | 20 | 3.12930718 | 70 | 4.95231619 |
| -79 | -0.48025065 | -29 | 1.34275836 | 21 | 3.16576736 | 71 | 4.98877637 |
| -78 | -0.44379047 | -28 | 1.37921854 | 22 | 3.20222754 | 72 | 5.02523655 |

| | | | | | |
|---|---|---|---|---|---|
| -77 | -0.40733029 | -27 | 1.41567872 | 73 | 5.06169673 |
| -76 | -0.37087011 | -26 | 1.4521389 | 74 | 5.09815691 |
| -75 | -0.33440993 | -25 | 1.48859908 | 75 | 5.13461709 |
| -74 | -0.29794975 | -24 | 1.52505926 | 76 | 5.17107727 |
| -73 | -0.26148957 | -23 | 1.56151944 | 77 | 5.20753745 |
| -72 | -0.22502939 | -22 | 1.59797962 | 78 | 5.24399763 |
| -71 | -0.18856921 | -21 | 1.6344398 | 79 | 5.28045781 |
| -70 | -0.15210903 | -20 | 1.67089998 | 80 | 5.31691799 |
| -69 | -0.11564885 | -19 | 1.70736016 | 81 | 5.35337817 |
| -68 | -0.07918867 | -18 | 1.74382034 | 82 | 5.38983835 |
| -67 | -0.04272849 | -17 | 1.78028052 | 83 | 5.42629853 |
| -66 | -0.00626831 | -16 | 1.8167407 | 84 | 5.46275871 |
| -65 | 0.03019187 | -15 | 1.85320088 | 85 | 5.49921889 |
| -64 | 0.06665205 | -14 | 1.88966106 | 86 | 5.53567907 |
| -63 | 0.10311223 | -13 | 1.92612124 | 87 | 5.57213925 |
| -62 | 0.13957241 | -12 | 1.96258142 | 88 | 5.60859943 |
| -61 | 0.17603259 | -11 | 1.9990416 | 89 | 5.64505962 |
| -60 | 0.21249277 | -10 | 2.03550178 | 90 | 5.6815198 |
| -59 | 0.24895295 | -9 | 2.07196196 | 91 | 5.71797998 |
| -58 | 0.28541313 | -8 | 2.10842214 | 92 | 5.75444016 |
| -57 | 0.32187331 | -7 | 2.14488232 | 93 | 5.79090034 |
| -56 | 0.35833349 | -6 | 2.1813425 | 94 | 5.82736052 |
| -55 | 0.39479367 | -5 | 2.21780268 | 95 | 5.8638207 |
| -54 | 0.43125385 | -4 | 2.25426286 | 96 | 5.90028088 |
| -53 | 0.46771403 | -3 | 2.29072304 | 97 | 5.93674106 |
| -52 | 0.50417421 | -2 | 2.32718322 | 98 | 5.97320124 |
| -51 | 0.54063439 | -1 | 2.3636434 | 99 | 6.00966142 |
| -50 | 0.57709457 | 0 | 2.40010358 | | |

FIG. 17-2

SYSTEM AND METHOD FOR OPTIMIZING USE OF INDIVIDUAL HVAC UNITS IN MULTI-UNIT CHILLER-BASED SYSTEMS

BACKGROUND OF THE INVENTION

Field of the Invention

This invention relates to the use of thermostatic HVAC controls that are connected to a computer network. More specifically, the present invention pertains to the use of communicating thermostats to inform an energy management system, to accurately allocate operational costs across multiple users in a multi-user and/or multi-tenant context, to provide enhanced efficiency, and to verify demand response.

People have sought to control the temperature inside buildings using a variety of approaches for thousands of years. For most of that time, heating has been much easier to accomplish than cooling. The adoption of vapor-compression-based systems in the early part of the $20^{th}$ century made it common for the first time to reliably chill inside environments well below ambient temperatures. This technological advance led to major changes in architecture (windows in many commercial buildings transmit light, but are no longer used to admit airflow), in society (enabling the development of cities in places previously inhospitable to most human preferences), and in dependence on energy from fossil fuels.

The HVAC systems used in most single-family residences today are generally different from those used in larger buildings. In residential and automotive systems, a refrigerant (formerly chlorofluorocarbons such as Freon, but today a number of different materials are used due to the ozone-depleting characteristics of CFCs) circulates between a mechanical compressor and an evaporator located inside the space to be conditioned, or in ductwork connected to the conditioned space. When operated as an air conditioner, the compressor converts the refrigerant from gaseous to liquid form, thereby extracting considerable heat from it. That heat is then transferred to the outside air. The newly chilled liquid is then circulated to the evaporator under high pressure through insulated tubing. Once it reaches the evaporator, which is located inside an air handler in which the air is conditioned by being forced past the evaporator by a fan, the pressure on the liquid is removed, at which point the liquid re-converts into a gas, thereby absorbing heat from the air being blown across the evaporator. The refrigerant is then transported in gaseous form back to the compressor to repeat the cycle. Thus heat is transferred from the air in the conditioned space to the refrigerant, and then from the refrigerant to the outside air.

Many HVAC systems in large buildings include upsized versions of this type of system. Others use different technologies, such as absorption chillers, which require less electricity, but instead require a significant heat source.

Because these systems work primarily by moving heat rather than by creating it, many modern systems can also in effect "work backwards"—that is, rather than transfer heat from the air in the conditioned space and transfer it to the refrigerant and then the outside air, these systems, known as heat pumps, can collect heat from the outside air and transfer it to the refrigerant and then to the conditioned space. Thus many buildings can use the same system to deliver both cooling and heating.

In the single-family residential and automotive contexts, this approach is aided by the fact that reasonably short runs of refrigerant lines between compressor and evaporator are possible. But in large, multi-tenant buildings, this approach is problematic. Long refrigerant lines are expensive and difficult to maintain. They are also lossy, so that a significant percentage of the work done by the compressor is effectively wasted before it ever chills the conditioned space.

Another difficulty with this approach is that different tenants are likely to have different preferences for inside temperature, as well as different conditions (such as solar gain, number of heat-producing machines and people inside the space, etc.) Efficiently regulating comfort in such conditions is difficult with such a system.

Because of these difficulties, a common approach in such buildings is to add a second, intermediate medium to transfer heat from a centralized plant to each conditioned space. Water is commonly used for this purpose. Relative to gases like Freon, water has extremely high thermal mass. This property leads to several benefits in such systems. First, water's high thermal mass allows the centralized chillers to effectively store cold in advance of the need to deliver cold air in conditioned spaces, thereby permitting a small amount of load shifting. Second, when the cold water is circulated, losses are easier to control. Third, the network of low-pressure water pipes is easier to build and maintain as compared to high-pressure refrigerant lines. Fourth, the circulatory system is easily modulated in individual air handlers, enabling easier control of the distribution of cooling. And fifth, larger compressors tend to be more efficient than smaller ones, which leads to stronger preferences for centralized systems as building size increases. These systems are often referred to as chiller-based systems. Where individual systems in the single-family residential context may generally be sized from 2-4 tons of cooling capacity (24,000-48,000 BTU/hour), chiller-based systems are typically 15-1500 tons (180,000 to 18,000,000 BTU/h). From an overall system efficiency standpoint, these chiller-based systems can be as much as 50-100% more efficient than systems designed for single-family residences. However, these systems generally share an important drawback.

Thermal space conditioning is the largest use of energy on average in American residences. In a typical single-family residence, where heavy air conditioning use in July is followed by receipt of a large electricity bill in August, there is a delayed but more or less effective feedback loop incentivizing consumers to avoid waste. But in central chiller-based systems, a significant portion of the energy used in cooling an individual space is consumed by a central plant that may supply conditioning to as many as hundreds or even thousands of units. These systems require large motors—in large buildings, chillers often require motors that deliver hundreds of horsepower or more—that are often the largest single use of energy in the building. Determining the amount of energy properly allocated to a given unit is generally impossible. Landlords and building owners can allocate the cost based on square footage or other static means, but when price does not vary with usage, there is little or no incentive to conserve. Thus occupants tend not manage energy consumption for efficiency, and waste is common.

SUMMARY OF THE INVENTION

Thus it would be desirable to offer a system that combined the mechanical efficiency of a centrally chilled system with the ability to price the service based upon metered use of individually conditioned systems, which tends to lead to improved behavioral efficiency.

It would also be desirable to offer a system that can respond to information about the presence or absence of occupants of individual conditioned spaces within a larger structure, including information generated by mobile devices such as cell phones, and by other devices located within the conditioned spaces, such as personal computers and home entertainment systems.

It would also be desirable to offer a system that can calculate thermal properties, such as dynamic signatures, of individual conditioned spaces within a larger structure.

It would also be desirable to offer a system that can reduce energy use in individual conditioned spaces within a larger structure by offering just-in-time space conditioning.

It would also be desirable to offer a system that can adapt the programming of HVAC systems to user inputs.

It would also be desirable to offer a system that can shape and shed electrical loads related to HVAC while reducing or eliminating negative effects on occupant comfort.

It would also be desirable to offer a system that can recognize performance degradations in HVAC performance over time where a central chiller supplies multiple separate habitable spaces.

It would also be desirable to offer a system that can use data collected from one or more thermostats in different units of a multi-dwelling unit building in order to correct for anomalous or missing data from another thermostat in another unit.

It would also be desirable to offer a system that can execute specific patterns of setpoint variations on order to reduce energy consumption while minimizing adverse effects to comfort. In one embodiment, the invention comprises a chiller-based HVAC system, a networked thermostat, a local network connecting the load-control switch to a larger network such as the Internet, and a server in bi-directional communication with such networked load-control switch and device.

In one embodiment, a system allocates the cost of operating an HVAC system where the HVAC system comprises at least a first component that consumes energy based at least in part on whether equipment associated with an individual unit of occupancy in a building comprised of a plurality of occupancy units is "on" or "off", and at least a second component that is associated with a plurality of occupancy units that consumes energy at least in part whether or not the first component is "on or "off".

The HVAC system comprises a thermostatic controller comprising a thermostat, the thermostatic controller configured to that turn on or off a first component that is associated with an individual unit of occupancy at least in part based on temperature readings from inside the individual unit of occupancy, and that is capable of reporting that the first component that is associated with the individual unit of occupancy is on or off.

The HVAC system further comprises at least a processor not located inside the individual unit of occupancy that is in communication with the thermostat and a database for storing data reported by the thermostat.

In addition, where at least the run time associated with the first component that is associated with the individual unit of occupancy as reported by the thermostatic controller is a determinant of the cost of operation of a second component that is associated with a plurality of units allocated to the individual unit of occupancy.

In yet another embodiment, the second component includes at least a central chiller. In addition, the individual unit of occupancy is an apartment. Still further, the thermostatic controller communicates at least in part via a wireless network. Moreover, the thermostatic controller communicates at least in part via the Internet.

In yet other embodiments, the medium used to transfer heat between the first component and the second component is water. Also, the medium used to transfer heat between the first component and the second component is steam. Furthermore, the individual unit of occupancy is a non-residential commercial space. In addition, the building comprises multiple stories.

An additional embodiment relates to a method for allocating the cost of operating an HVAC system where the HVAC system comprises at least a first component that consumes energy based at least in part on whether equipment associated with an individual unit of occupancy in a building comprised of a plurality of occupancy units is "on" or "off", and at least a second component that is associated with a plurality of occupancy units that consumes energy at least in part whether or not the first component is "on or "off."

The method comprises measuring the runtime of a first component with a thermostatic controller that turns on or off the first component that is associated with the individual unit of occupancy at least in part based on temperature readings from inside the individual unit of occupancy, and that is capable of reporting that the first component that is associated with the individual unit of occupancy is on or off.

The method also measures the runtime of at least the second component that is associated with a plurality of occupancy units that consumes energy at least in part whether or not the first component is "on or "off."

In addition, the method calculates the cost of operating the HVAC system to be allocated to the individual unit of occupancy based at least in part on the run time associated with the first component that is associated with the individual unit of occupancy as reported by the thermostatic controller relative to the cost of operation of the second component that is associated with a plurality of units allocated to the individual unit of occupancy.

In yet other embodiments, the second component includes at least a central chiller and the individual unit of occupancy is an apartment. Still further, the thermostatic controller communicates at least in part via a wireless network such as the Internet.

Moreover, the medium used to transfer heat between the first component and the second component is water. In another example, the medium used to transfer heat between the first component and the second component is steam. Also, the individual occupancy units are non-residential commercial spaces. In addition, the building comprises multiple stories.

In another embodiment, a system allocates the cost of operating an HVAC system where the HVAC system comprises at least a first component that is associated with an individual unit of occupancy in a building comprised of a plurality of occupancy units, and at least a second component that is associated with a plurality of occupancy units.

The system comprises a thermostatic controller that turns on or off the first component that is associated with the individual unit of occupancy at least in part based on temperature readings from inside the individual unit of occupancy, and that is capable of reporting that the first component that is associated with the individual unit of occupancy is on or off.

Furthermore, the system comprises at least a processor not located inside the individual unit of occupancy that is in communication with the thermostat and a database for storing data reported by the thermostat.

Where at least the run time associated with the first component that is associated with the individual unit of occupancy as reported by the thermostatic controller is a determinant of the cost of operation of the second component that is associated with a plurality of units allocated to the individual unit of occupancy.

For purposes of summarizing the disclosure, certain aspects, advantages and novel features of the inventions have been described herein. It is to be understood that not necessarily all such advantages may be achieved in accordance with any particular embodiment of the invention. Thus, embodiments of the invention may be carried out in a manner that achieves one advantage or group of advantages as taught herein without necessarily achieving other advantages as may be taught or suggested herein.

BRIEF DESCRIPTION OF THE DRAWINGS

FIGS. 6a and 6b illustrate pages of a website that may be used with an embodiment of the subject invention.

FIG. 14 shows a table of some of the data used by an embodiment of the subject invention to predict temperatures.

FIGS. 17-1 and 17-2 shows a table of predicted rates of change in temperature inside a given conditioned space for a range of temperature differentials between inside and outside.

DETAILED DESCRIPTION OF THE PREFERRED EMBODIMENTS

Figure 1:
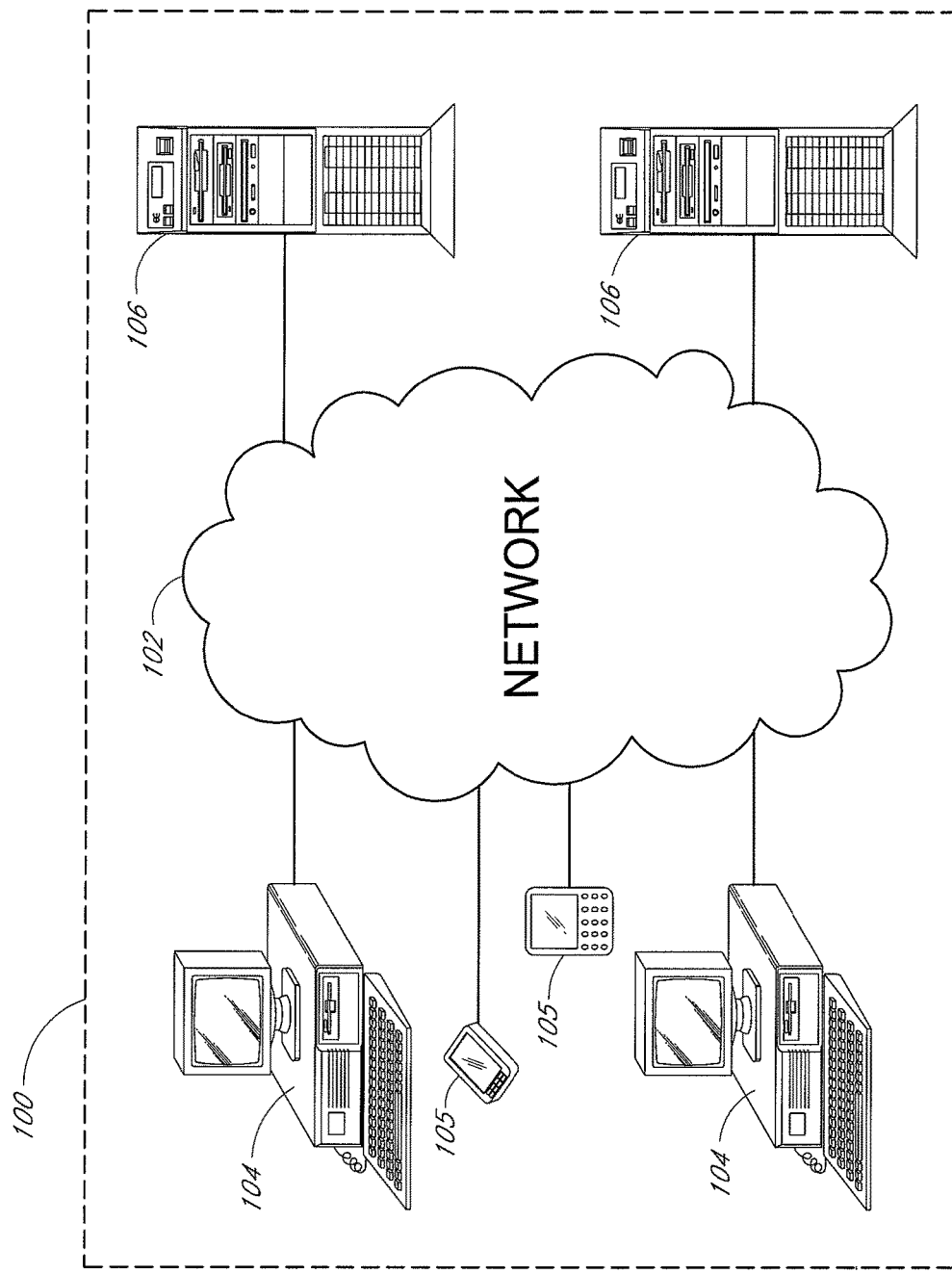
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are mobile devices 105, and one or more server computers 106, which store information and make the information available to computers 104 and mobile devices 105. The network 102 allows communication between and among the computers 104, mobile devices 105 and servers 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols. It also includes various networks used to connect mobile and wireless devices, such as cellular networks.

When a user of an embodiment of the subject invention wishes to access information on network 102 using computer 104 or mobile device 105, the user initiates connection from his computer 104 or mobile device 105. For example, the user invokes a browser, which executes on computer 104 or mobile device 105. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store HyperText Markup Language (HTML) and other documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to delivering content in the form of web pages, network 102 may also be used to deliver computer applications that have traditionally been executed locally on computers 104. This approach is sometimes known as delivering hosted applications, or SaaS (Software as a Service). Where a network connection is generally present, SaaS offers a number of advantages over the traditional software model: only a single instance of the application has to be maintained, patched and updated; users may be able to access the application from a variety of locations, etc. Hosted applications may offer users most or all of the functionality of a local application without having to install the program, simply by logging into the application through a browser.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem, a network interface card or wireless networking such as 802.11 or cellular radio-based systems. The computers include processors such as those sold by Intel and AMD. Other processors may also be used, including general-purpose processors, multi-chip processors, embedded processors and the like.

Computers 104 can also be microprocessor-controlled home entertainment equipment including advanced televisions, televisions paired with home entertainment/media centers, and wireless remote controls.

Computers 104 and mobile devices 105 may utilize a browser or other application configured to interact with the World Wide Web or other remotely served applications. Such browsers may include Microsoft Explorer, Mozilla, Firefox, Opera, Chrome or Safari. They may also include browsers or similar software used on handheld, home entertainment and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 and mobile devices 105 may use an operating system such as Microsoft Windows, Apple Mac OS, Linux, Unix or the like, or may use simpler embedded operating systems with limited ability to run applications.

Computers 106 may include a range of devices that provide information, sound, graphics and text, and may use a variety of operating systems and software optimized for distribution of content via networks.

Figure 2:
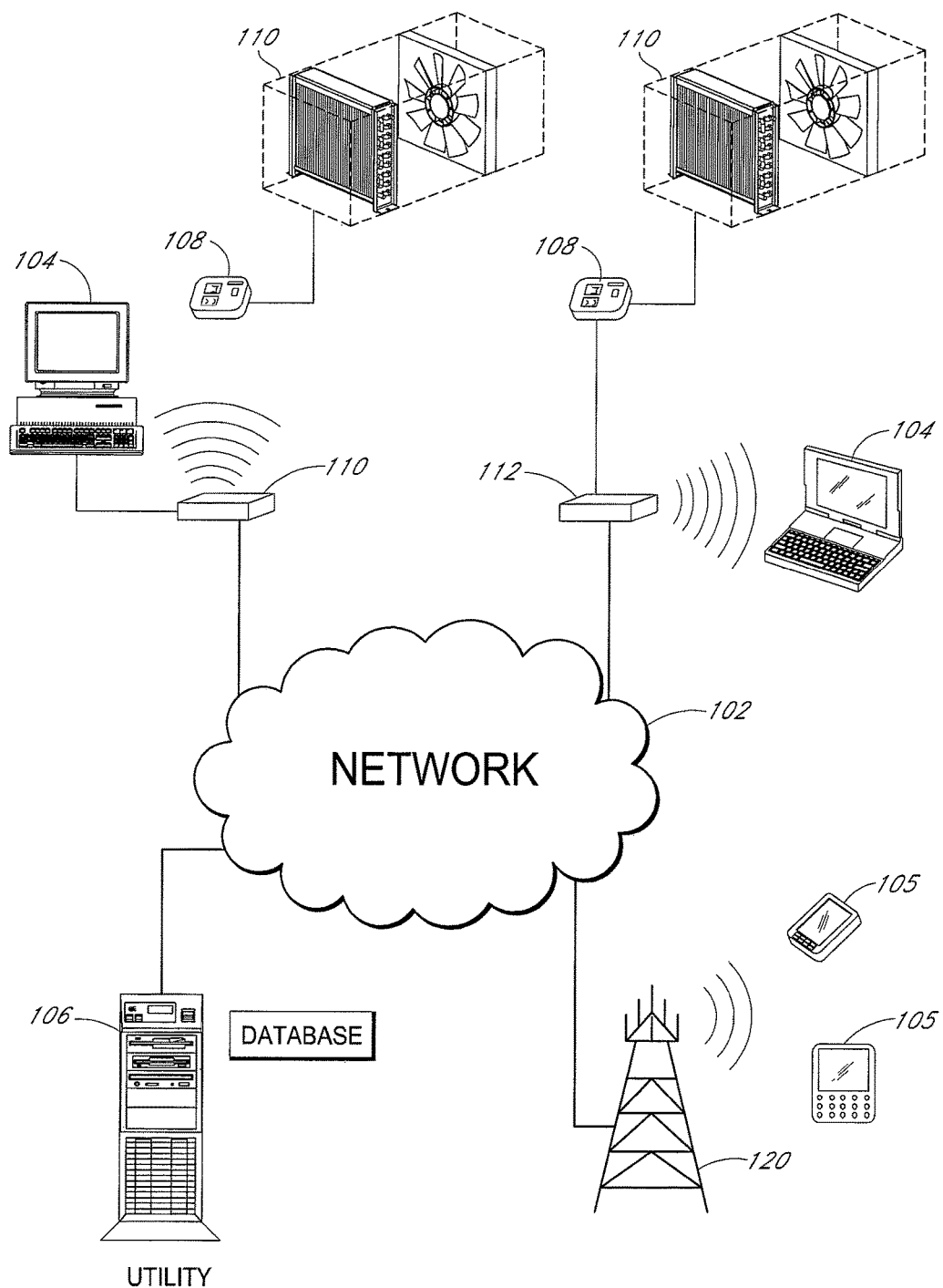
FIG. 2 shows a high-level illustration of the architecture of a network showing the relationship between the major elements of one embodiment of the subject invention.

Mobile devices 105 can also be handheld and wireless devices such as personal digital assistants (PDAs), cellular telephones and other devices capable of accessing the network. Mobile devices 105 can use a variety of means for establishing the location of each device at a given time. Such methods may include the Global Positioning System (GPS), location relative to cellular towers, connection to specific wireless access points, or other means FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are individual air handlers 110. Each air handler may supply conditioned air to an entire apartment or unit, or multiple air handlers may be used in a given space. Each user may be connected to the server 106 via wired or wireless connection such as Ethernet or a wireless protocol such as IEEE 802.11, via a modem or gateway 112 that connects the computer and thermostat to the Internet via a broadband connection such as a digital subscriber line (DSL), cellular radio or other method of connection to the World Wide Web. The thermostats 108 may be connected locally via a wired connection such as Ethernet or Homeplug or other wired network, or wirelessly via IEEE802.11, 802.15.4, or other wireless network, which may include a gateway 112. Server 106 contains content to be served as web pages and viewed by computers 104, software to manage thermostats 108, software to manage the operation of thermostats 108, as well as databases containing information used by the servers.

Also attached to the Network may be cellular radio towers 120, or other means to transmit and receive wireless signals in communication with mobile devices 105. Such communication may use GPRS, GSM, CDMA, EvDO, EDGE or other protocols and technologies for connecting mobile devices to a network.

Figure 3A:
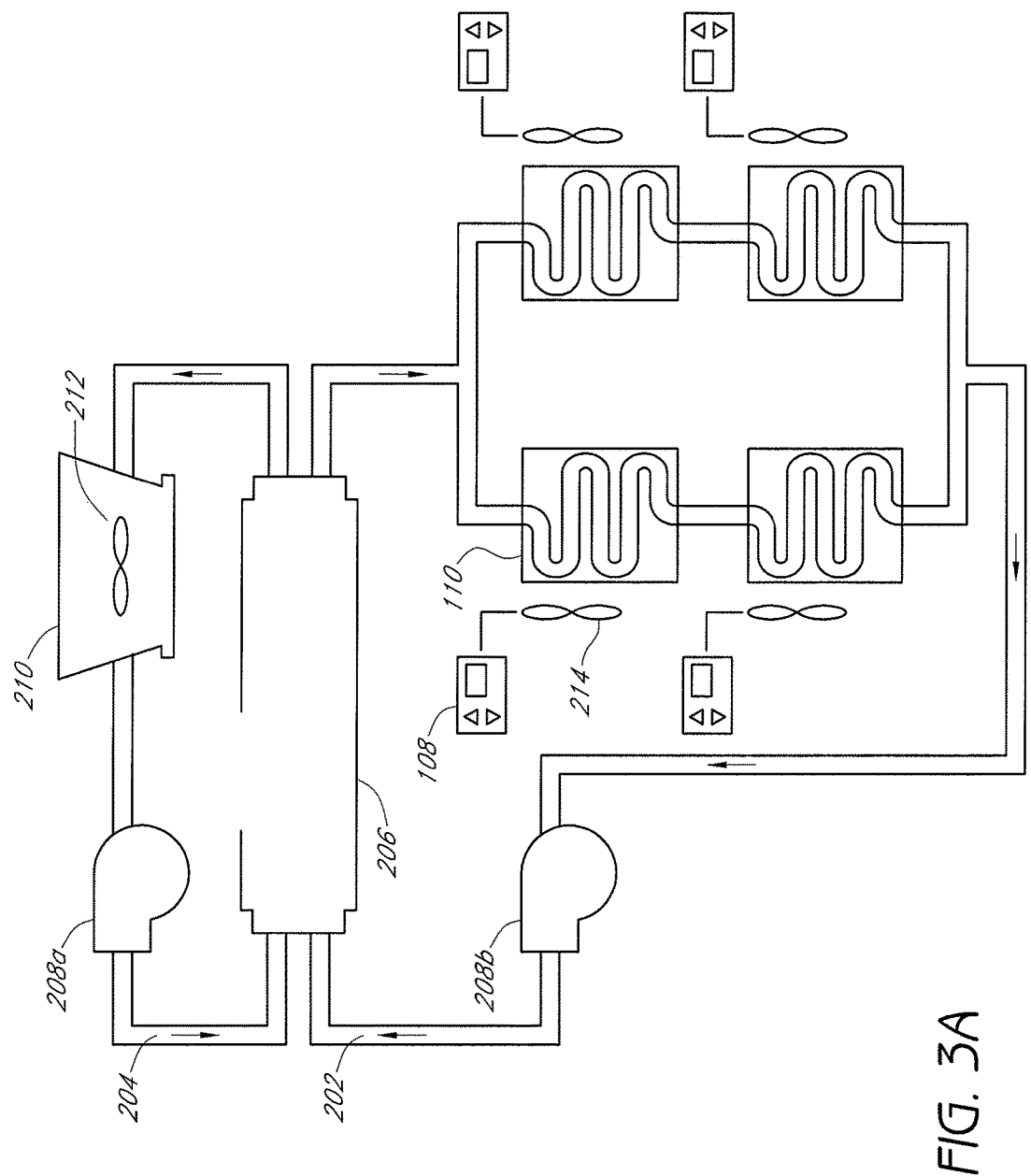
FIGS. 3a, 3b and 3c are simplified schematics of central chiller HVAC systems used in multi-unit buildings.

FIG. 3a shows a simplified high-level schematic of a representative sample of one kind of chiller-based air conditioning system with which the subject invention may be used. The system includes two water loops. Secondary loop 202 absorbs heat from inside the conditioned space; primary loop 204 transfers that heat to the outside air. Chiller 206 is where the heat is exchanged between the two loops. Pumps 208a and 208b force water to move through the primary and secondary loops. Heat is transferred to the outside air in cooling tower 210, where fan 212 blows air past the water that has absorbed heat in the chiller. (Some system architectures use heat exchangers inside the cooling tower; others directly expose the water to the air.)

Water in the secondary loop emerges from the chiller and is sent to through pipes to individual air handlers 110. In some implementations, the chilled water always flows through the same path regardless of the settings of thermostats 108. If thermostat 108 is in cooling mode, then fan 214 blows air from inside the conditioned unit across the air handler, transferring heat from the air to the water being transported through the air handler 110. If thermostat 108 is in off mode, then fan 214 does not move air across the air handler, and negligible heat transfer takes place. In the simplest case, the thermostat is binary: the fan is off or it is on. Alternatively, the fan may have two or more discrete speeds, or may even be controlled by a potentiometer that permits infinite adjustment of speed within the fan's range.

Figure 3B:
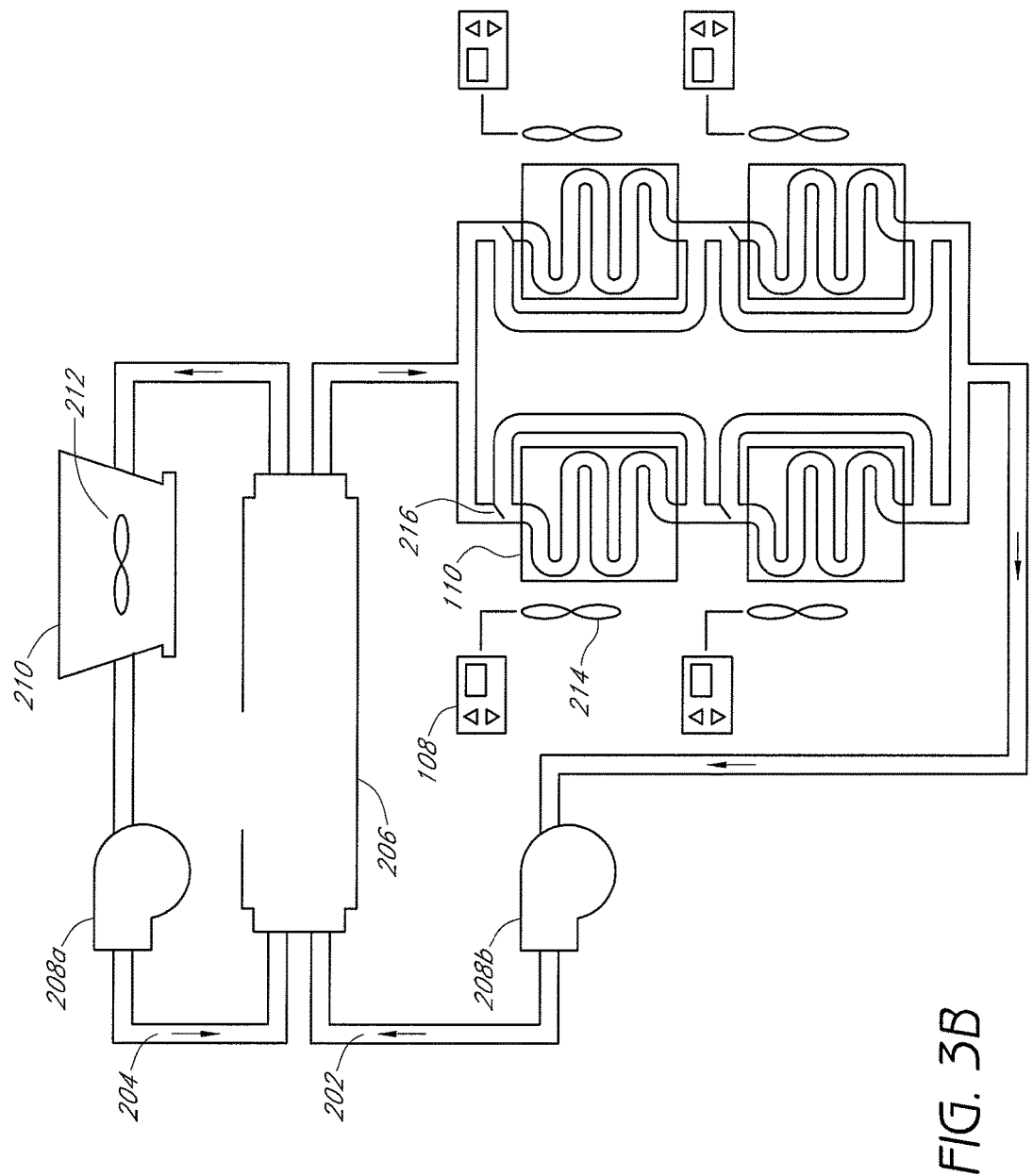

FIG. 3b shows a schematic of an alternative chiller-based HVAC system with which the subject invention may be used. The system architecture is roughly similar to the system shown in FIG. 3a, but in this embodiment, there are valves 216 that may be used to divert chilled water away from air handlers 110. These valves may be controlled by thermostats 108. This approach may be used in order to, for example, allow users to run the fan without "running the air conditioner", which may increase comfort at lower cost due the well-known value of moving air in order to increase comfort in warm conditions.

With the systems shown in FIGS. 3a and 3b, it is possible to allocate at least a portion the energy use associated with an individual air handler with data generated by or otherwise available at each individual thermostat.

Figure 3C:
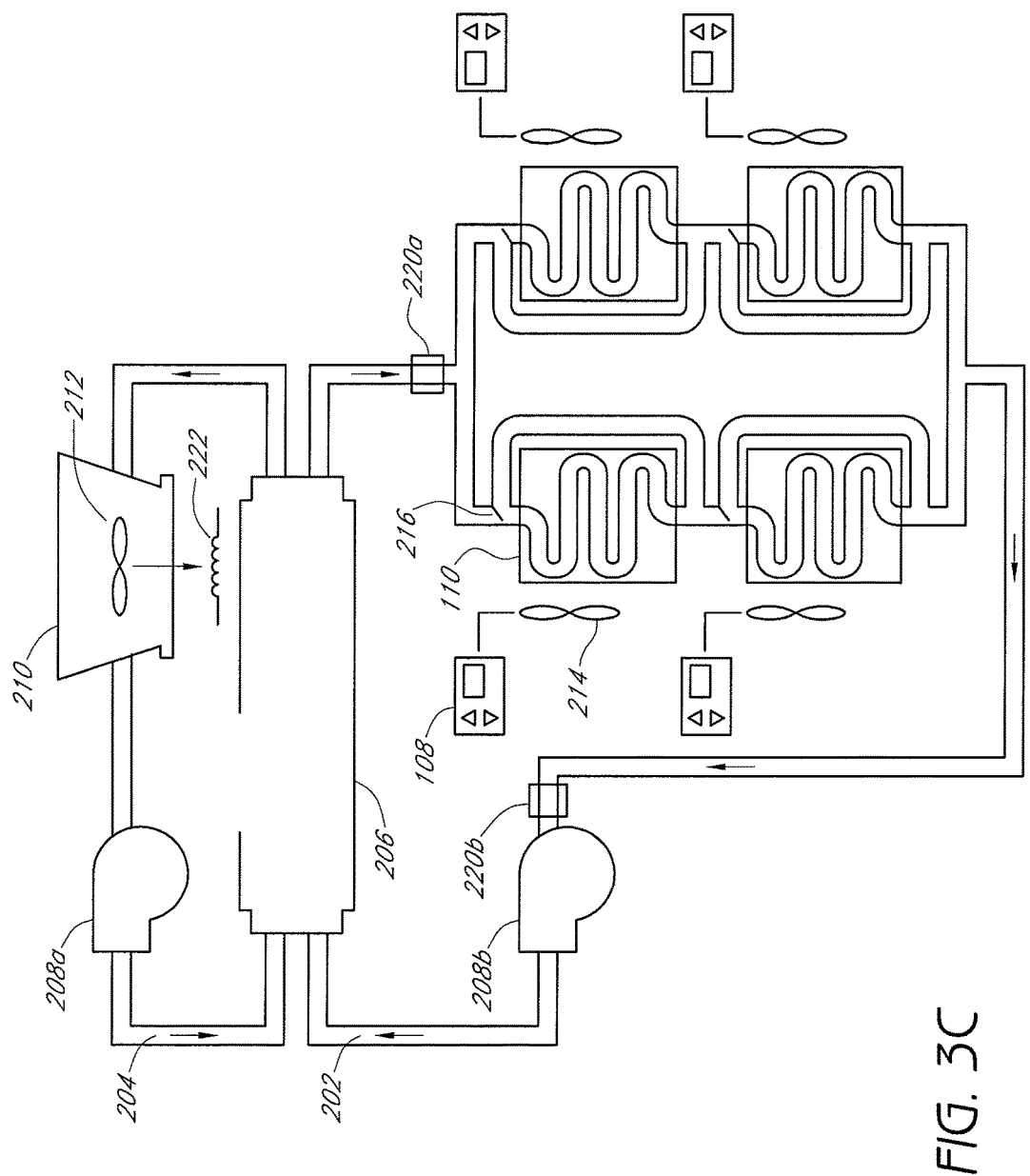

FIG. 3c shows a schematic of an alternative chiller-based HVAC system with which the subject invention may be used. The system architecture is roughly similar to that shown in FIGS. 3a and 3b, but in this embodiment, there are also means for measuring the temperature of the water in the secondary loop at at least two places: temperature sensor 220a measures the temperature of the water in the secondary loop prior to circulation through heat exchangers 110 (WT1); temperature sensor 220b measures the temperature of the water in the secondary loop after circulation through heat exchangers 110 (WT2). The difference between these two ($\Delta$WT) gives a measure of the amount of cooling accomplished by the loop overall. When the air handlers in each unit in the loop are all off and/or when the valves determining whether to route the loop through the air handlers are all set to bypass, $\Delta$WT will be relatively small, and this baseline value may be thought of as system overhead or deadweight loss. When the air handlers in each unit in the loop are all on and/or when the valves determining whether to route the loop through the air handlers are all set to send the water through each air handler, $\Delta$WT will be relatively large. The difference between the two cases represents a measure of the work done by the HVAC system, and can be used to calculate the energy use attributable to the units in a given loop.

FIG. 3c also includes a means 222 for varying the speed of the fan in cooling tower 210. Some chiller-based systems increase efficiency under dynamic load conditions by varying the speed of the motor driving the fan (and/or by increasing or decreasing the speed with which water is pumped through the primary and/or secondary loops). A variation on the system shown in FIG. 3c would be a system in which the flow rate of the water circulating between the central chiller and the individual occupancy units may be varied by increasing or decreasing the work done by the pumps that circulate the water.

Figure 4:
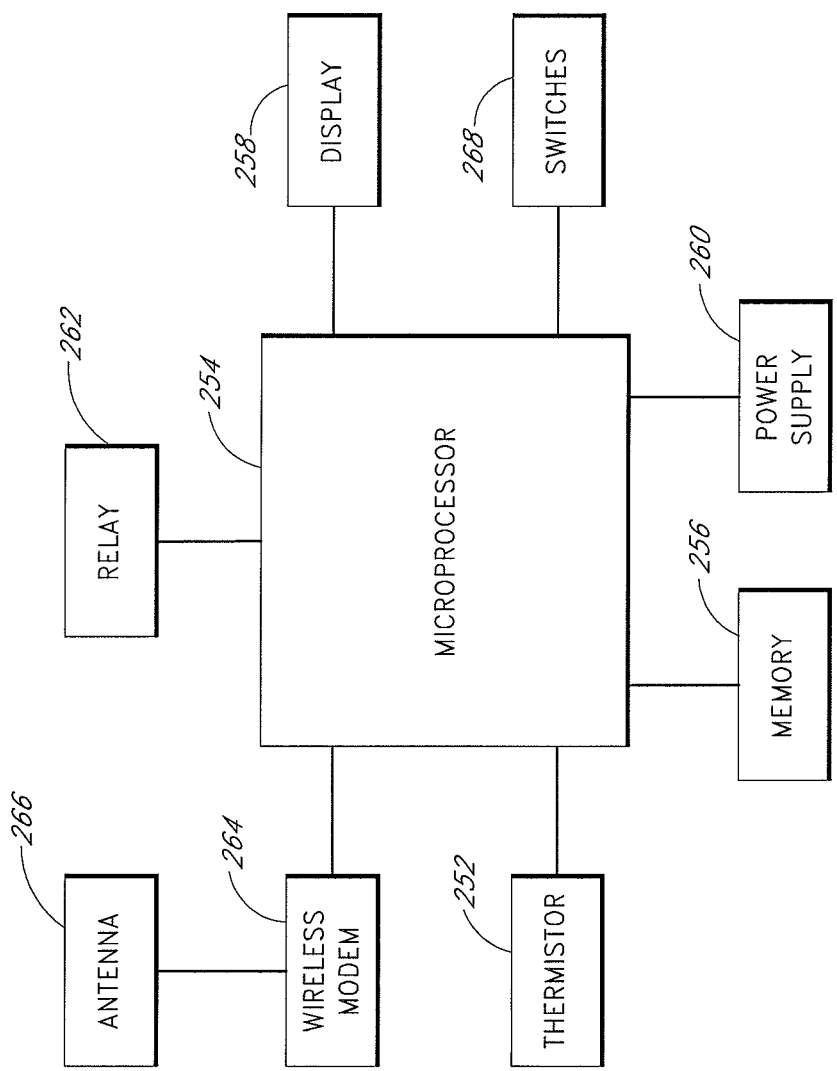
FIG. 4 shows a high-level schematic of the thermostat used as part of an embodiment of the subject invention.

FIG. 4 shows a high-level block diagram of thermostat 108 used as part of an embodiment of the subject invention. Thermostat 108 includes temperature sensing means 252, which may be a thermistor, thermal diode or other means commonly used in the design of electronic thermostats. It includes a microprocessor 254, memory 256, a display 258, a power source 260, a relay 262, which turns the blower motor in the air handler on and off in response to a signal from the microprocessor, and contacts by which the relay is connected to the wires that lead to the blower motor. In systems in which the thermostat controls a valve that determines the flow of water through the air handler, a relay, potentiometer or other device will control the valve.

To allow the thermostat to communicate bi-directionally with the computer network, the thermostat also includes means 264 to connect the thermostat to a local computer or to a wireless network. Such means could be in the form of Ethernet, wireless protocols such as IEEE 802.11, IEEE 802.15.4, Bluetooth, cellular systems such as CDMA, GSM and GPRS, or other wireless protocols. Communication means 264 may include one or more antennae 266. Thermostat 108 may also include controls 268 allowing users to change settings directly at the thermostat, but such controls are not necessary to allow the thermostat to function for all parts of part of the subject invention. Such controls may consist of buttons, switches, dials, etc. Thermostat 108 may also include means to vary additional system parameters, such as variable fan speed, opening and closing valves that regulate the flow of the heat transfer medium, etc. Thermostat 108 should be capable of communicating such parameters to servers 106, and of allowing remote control of such parameters as well.

Figure 5:
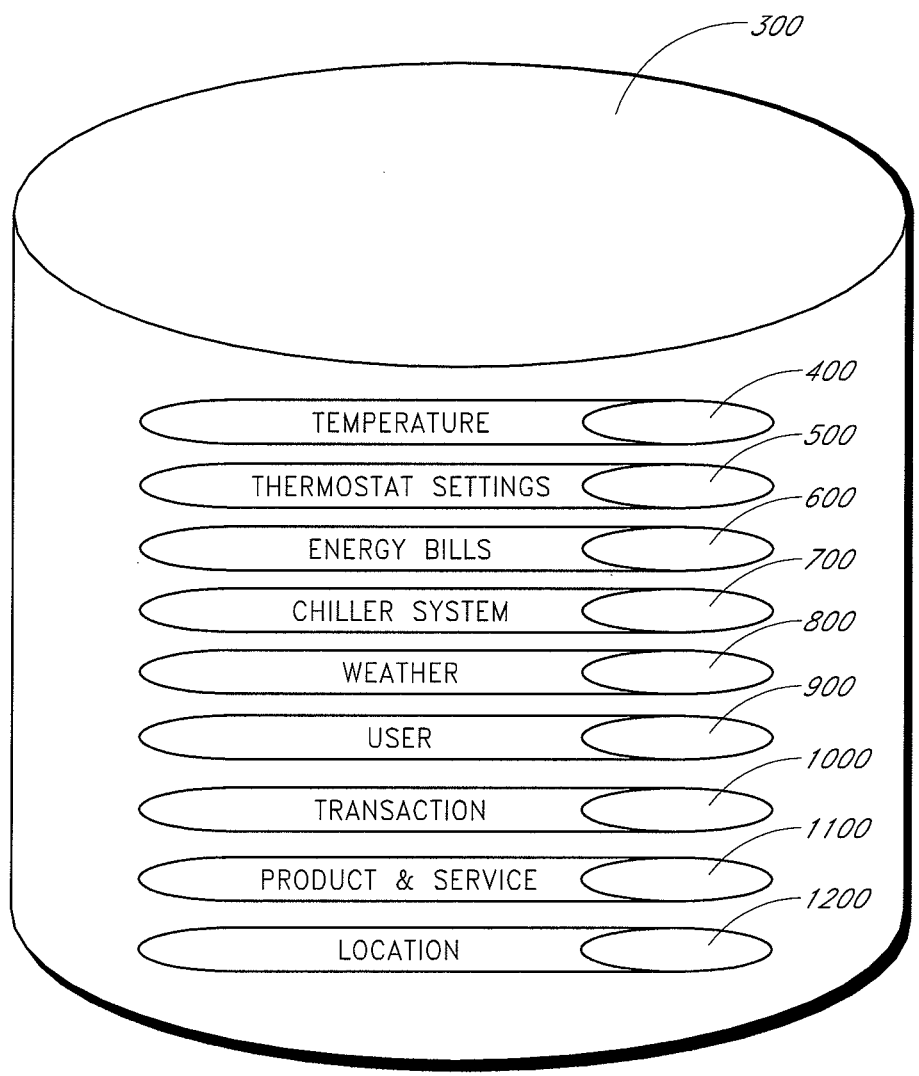
FIG. 5 shows one embodiment of the database structure used as part of an embodiment of the subject invention.

The data used to manage the subject invention is stored on one or more servers 106 within one or more databases. As shown in FIG. 5, the overall database structure 300 may include temperature database 400, thermostat settings database 500, energy bill database 600, chiller system variable database 700, weather database 800, user database 900, transaction database 1000, product and service database 1100, user location database 1200 and such other databases as may be needed to support these and additional features. Alternatively, data may be managed using a distributed file system such as Apache Hadoop.

Users of connected thermostats 108 may create personal accounts. Each user's account will store information in database 900, which tracks various attributes relative to users of the system. Such attributes may include the location and size of the user's unit within a building (e.g., the southwest corner, $11^{th}$ floor); the specific configuration of the air handler and other unit-specific equipment in the user's unit; the user's preferred temperature settings, whether the user is a participant in a demand response program, etc.

User personal accounts may also associate one or more mobile devices with such personal accounts. For mobile devices with the capability for geopositioning awareness, these personal accounts will have the ability log such positioning data over time in database 1200.

In one embodiment, a background application installed on mobile device 105 shares geopositioning data for the mobile device with the application running on server 106 that logs such data. Based upon this data, server 106 runs software that interprets said data (as described in more detail below).

Server 106 may then, depending on context, (a) transmit a signal to thermostat 108 changing setpoint because occupancy has been detected at a time when the system did not expect occupancy (or vice versa); or (b) transmit a message to mobile device 105 that asks the user if the server should change the current setpoint, alter the overall programming of the system based upon a new occupancy pattern, etc. Such signaling activity may be conducted via email, text message, pop-up alerts, voice messaging, or other means.

Figure 6B:
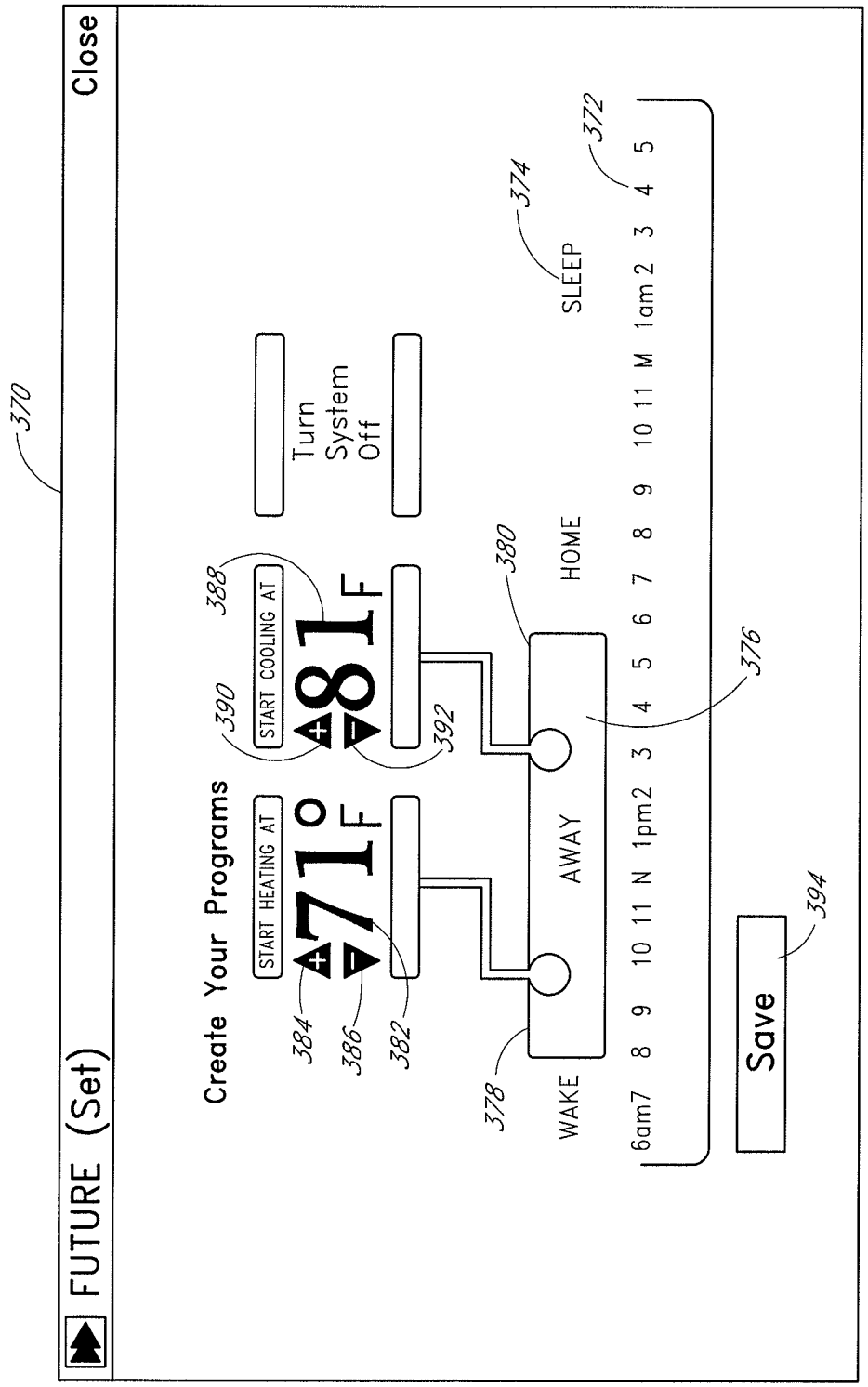

FIGS. 6a and 6b illustrate a website that may be provided to assist users and others to interact with an embodiment of the subject invention. The website will permit thermostat users to perform through the web browser substantially all of the programming functions traditionally performed directly at the physical thermostat, such as choosing temperature set points, the time at which the thermostat should be at each set point, etc. Preferably the website will also allow users to accomplish more advanced tasks such as allow users to program in vacation settings for times when the HVAC system may be turned off or run at more economical settings, and to set macros that will allow changing the settings of the temperature for all periods with a single gesture such as a mouse click.

As shown in FIG. 6a, screen 351 of website 350 displays current temperature 352 as sensed by thermostat 108. Clicking on "up" arrow 354 raises the setpoint 358; clicking the down arrow 356 lowers setpoint 358. Screen 351 may also convey information about the outside weather conditions, such as a graphic representation 360 of the sun, clouds, etc. In conditioned spaces with multiple thermostats, screen 351 may allow users to select from multiple devices to adjust or monitor. Users will be able to use screen 351 by selecting, for example, master bedroom thermostat 362, living room thermostat 364, game room thermostat 366, or basement thermostat 368.

As shown in FIG. 6b, screen 370 allows users to establish programming schedules. Row 372 shows a 24-hour period. Programming row 374 displays various programming periods and when they are scheduled, such as away setting 376, which begins at approximately 8 AM and runs until approximately 5:30 PM. When the away setting 376 is highlighted, the user can adjust the starting time and ending time for the setting by dragging the beginning time 378 to the left to choose an earlier start time, and dragging it to the right to make it later. Similarly, the user can drag ending time 380 to the left to make it earlier, and to the right to make it later. While away setting 376 is highlighted, the user can also change heating setpoint 382 by clicking on up arrow 384 or down arrow 386, and cooling setpoint 388 by clicking on up arrow 390 or down arrow 392. The user can save the program by clicking on save button 394.

Figure 7A:
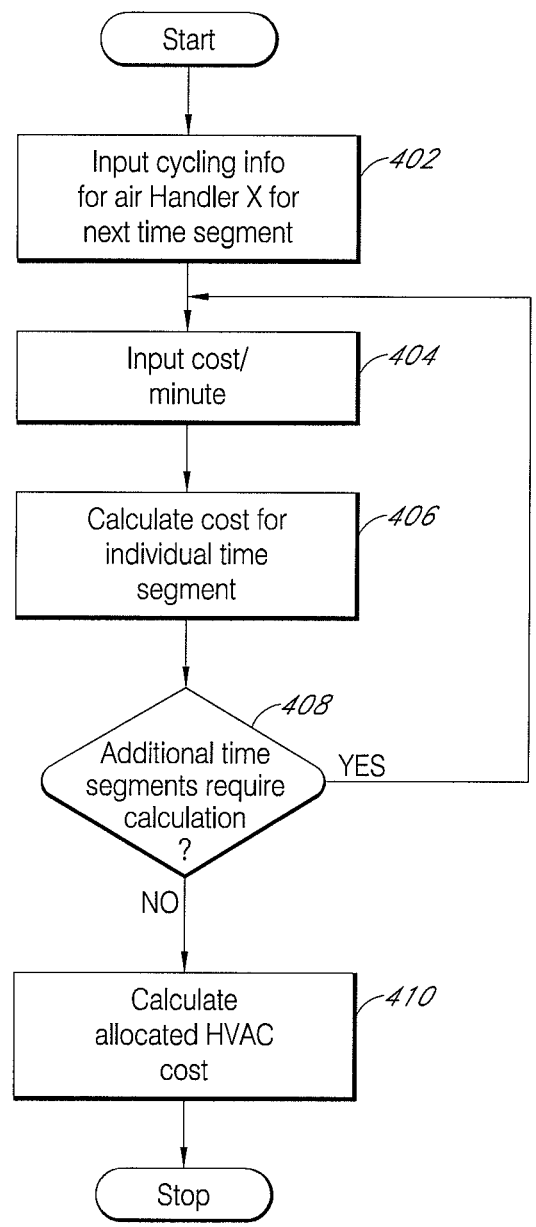
FIGS. 7a, 7b, 7c, 7d, 7e, 7f and 7g are flowcharts showing the steps involved in the operation of different embodiments of the subject invention.

FIG. 7a illustrates how an embodiment of the subject invention can be used to calculate the cost of operation of the chiller and other common portions of the HVAC system to be allocated to a given conditioned space using the cycle time of the blower for the air handler in that conditioned space.

In step 402 the server retrieves from database 300 the cycling data for a given air handler for a specified time interval (such as for one minute). Such data could indicate that for the interval in question the fan in the air handler was "on," or that it was "off". In step 404 the server retrieves from database 300 the cost per minute of run time for the air handler. This number is likely to be a function of several variables, which may include the cost per kilowatt hour of electricity (or the cost of other energy sources), the operating cost per time interval for the chiller unit associated with the air handler, and the number (and perhaps size) of other air handlers also associated with the same chiller. For example, a given chiller may be connected to 75 air handlers, and cost $50 per hour to operate when electricity costs $0.09/kWh. In step 406 the server computes the cost to operate the individual air handler for the specified time interval. For example, if during a given minute the cost to operate a given chiller is $1.50, and during that minute 20 air handlers are operating, then the chiller cost for each air handler would be $0.075 for that minute. In step 408 the server determines whether there are additional time intervals for which operating cost is to be calculated. If there are additional intervals, the server returns to step 402. If not, in step 410 the server calculates the allocated HVAC cost for all of the individual time intervals.

Figure 7B:
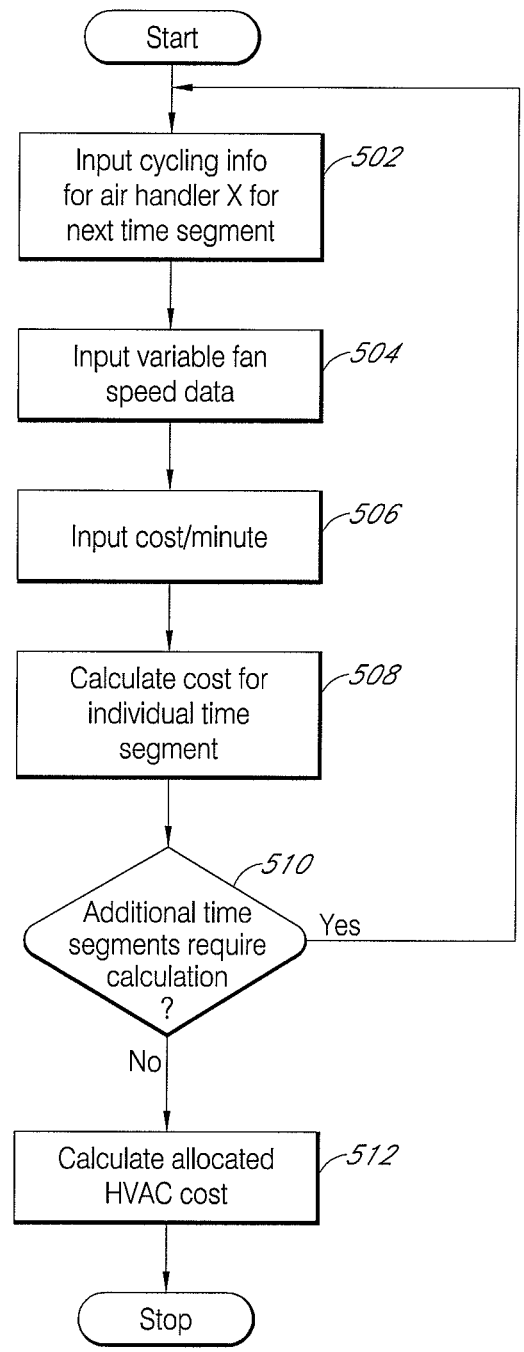

FIG. 7b illustrates how an embodiment of the subject invention can be used to calculate the cost of operation of the HVAC system to be allocated to a given conditioned space using the cycle time of the blower for the air handler in that conditioned space plus variable speed data for that blower.

In step 502 the server retrieves from database 300 the cycling data for a given air handler for a specified time interval (such as for one minute). Such data could indicate that for the interval in question the fan in the air handler was "on," or that it was "off". In step 504 the server retrieves from database 300 values for the speed of the fan in the air handler for the specified time interval. Such data may be expressed as a percentage of maximum speed, as a direct measurement of revolutions per minute, as a measurement of the current drawn by the electric motor powering the fan, or some other measurement. In step 506 the server retrieves from database 300 the cost per minute of run time for the air handler given the actual fan speed as retrieved in step 504. This number is also likely to be a function of variables including the cost per kilowatt/hour of electricity, the overall operating cost per time interval for the chiller unit associated with the air handler, and the number (and perhaps size) of other air handlers also associated with the same chiller. In step 508 the server computes the cost to operate the individual air handler for the specified time interval. In step 510 the server determines whether there are additional time intervals for which operating cost is to be calculated. If there are additional intervals, the server returns to step 502. If not, in step 512 the server calculates the allocated HVAC cost for all of the individual time intervals.

Figure 7C:
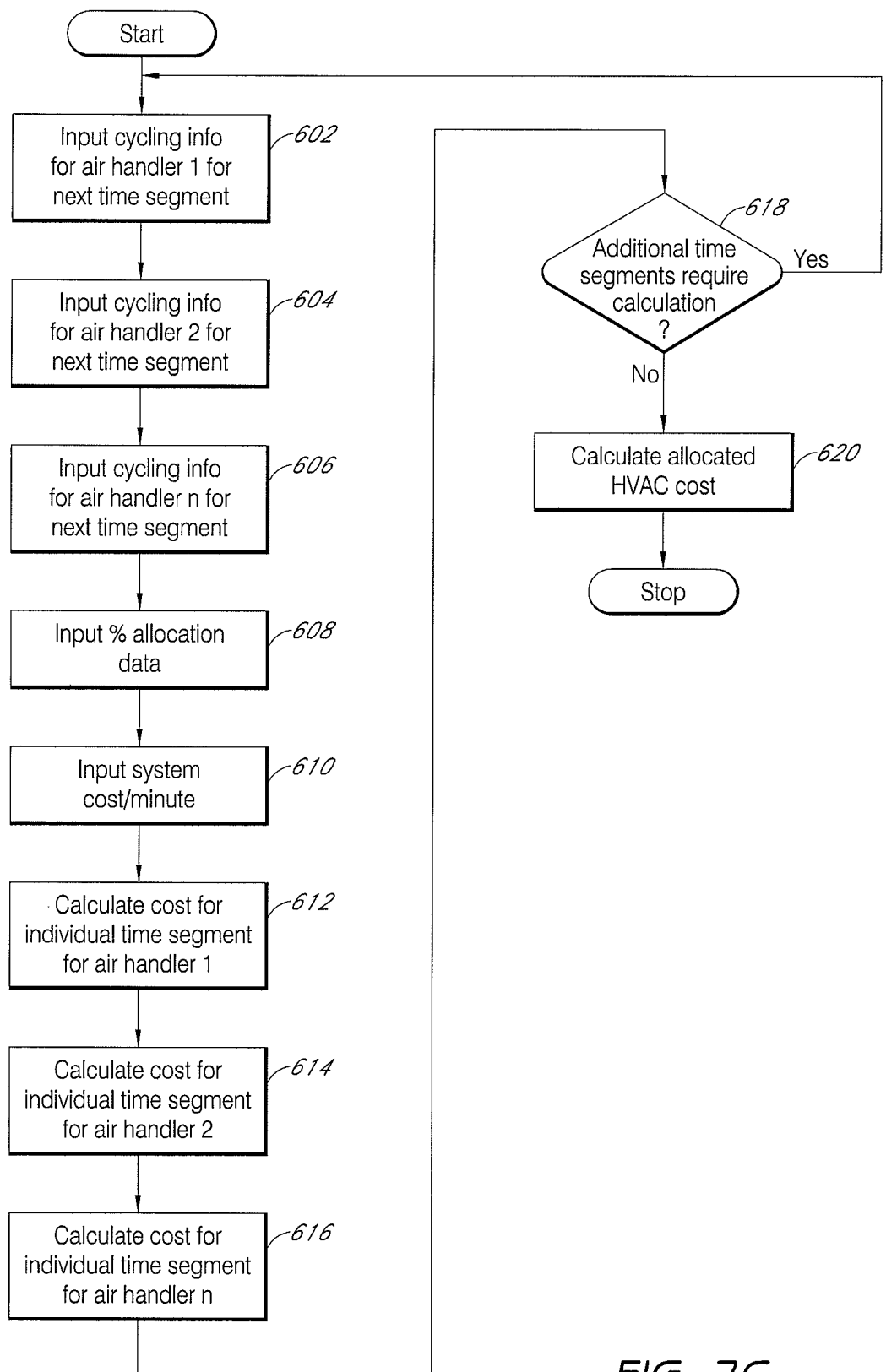

FIG. 7c illustrates how an embodiment of the subject invention can be used to calculate the cost of operation of the HVAC system to be allocated to a given conditioned space using the cycle time of the blower for the air handler in that conditioned space plus data from other blowers in other units. This approach permits calculation of variable operating costs—that is, it permits the amount allocated to a given unit to vary as actual operating cost change with the demands placed on the system by other units.

In step 602 the server retrieves from database 300 the cycling data for the first air handler to be evaluated for a specified time interval (such as for one minute). Such data could indicate that for the interval in question the fan in the air handler was "on," or that it was "off". In step 604 the server retrieves from database 300 the cycling data for the next air handler to be evaluated for the specified time interval. The server continues to retrieve cycling data for additional air handlers until in step 606 the server retrieves from database 300 the cycling data for the last air handler to be evaluated.

In step 608 the server retrieves additional data to be used to allocate overall operating costs during the specified interval. Such data may include static data such as the square footage of each separate unit in the building, the relative location of each unit (because units with more south and west-facing windows are likely to have higher cooling loads, etc.), the size of each air handler and/or its included blower, motor, or dynamic data such as the actual and/or predicted temperature rise (in the case of cooling) or drop (in the case of heating) for each air handler. In step 610 the server retrieves from database 300 the cost per minute of run time for the complete chiller system for the time increment being evaluated. This number may be calculated or actually measured, and will likely be a function of the cost of a kilowatt-hour of electricity, the overall operating cost per time interval for the chiller unit associated with the air handler, and the number (and perhaps size) of other air handlers also associated with the same chiller.

In step 612 the server calculates the cost of operating the first air handler for the time increment being evaluated. This cost will likely be a function of the overall cost per minute calculated in step 610, as well as the other parameters retrieved in steps 602-608. Specifically, the method described in FIG. 7c is intended to vary the allocated cost for a given unit during a given interval based upon the load placed upon the chiller not just by that unit, but by other units as well. This approach would allow equitable full allocation of chiller operating costs regardless of the number of units operating at a given time. Alternatively, the sources for the data used for this calculation may be sensor data sourced from the controlled system rather than stored values retrieved from a database.

In step 614 the server repeats the process followed in step 612 for the same time increment for the next air handler to be evaluated.

The server continues to calculate operating costs for additional time increments until in step 616 the server calculates operating costs for the last air handler to be evaluated for that time increment.

In step 618 the server determines whether additional time segments will require evaluation. If more time segments do require calculation, the server returns to step 602. If not, the server proceeds to step 620, in which it calculates the total allocated operating cost allocated to the first air handler for the relevant intervals.

The process disclosed in FIG. 7c may be repeated for each of the air handlers connected to a given chiller.

Figure 7D:
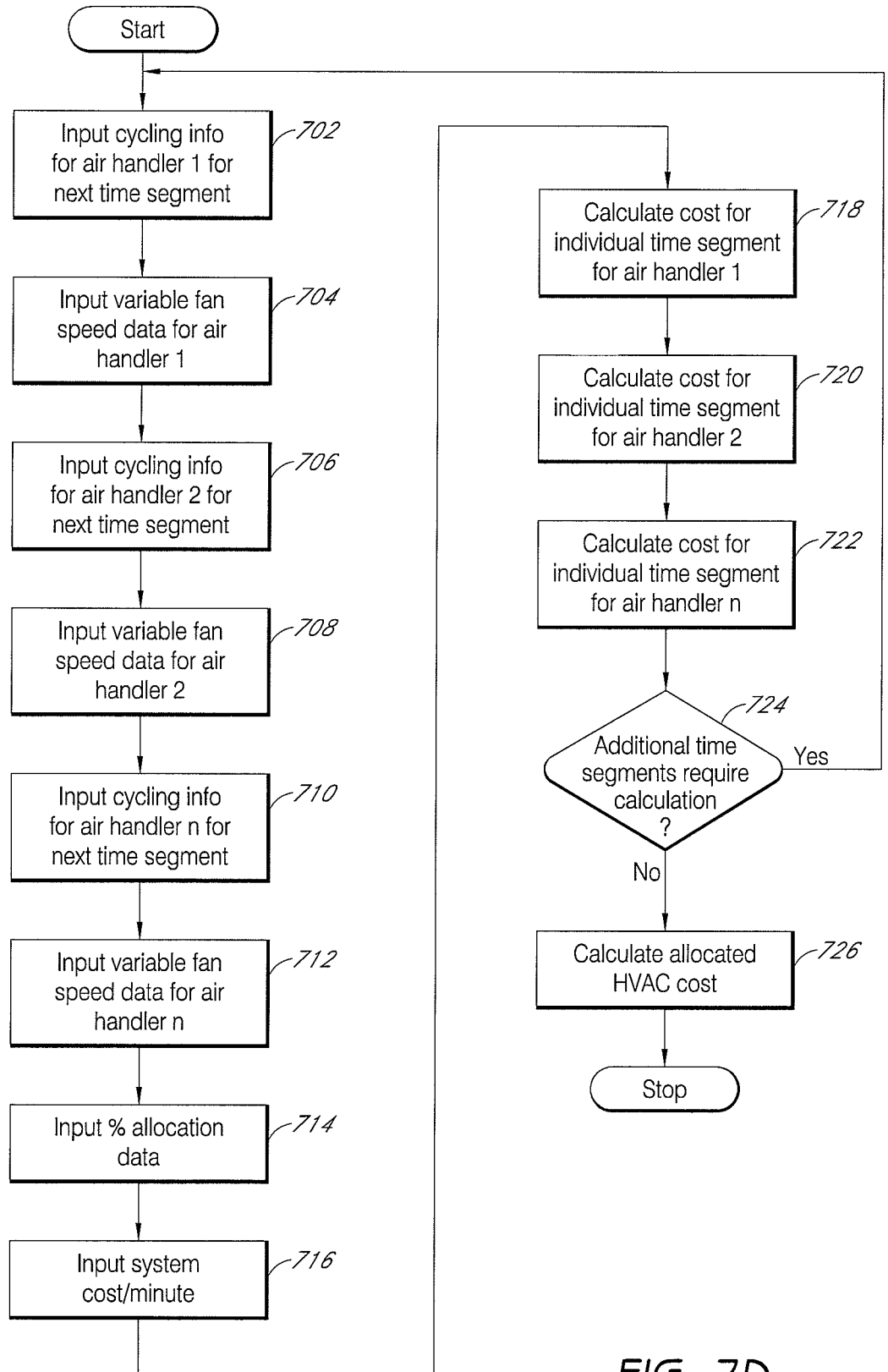

FIG. 7d illustrates how an embodiment of the subject invention can be used to calculate the cost of operation of the HVAC system to be allocated to a given conditioned space using the cycle time and fan speed of the blower for the air handler in that conditioned space plus data from other blowers in other units.

In step 702 the server retrieves from database 300 the cycling data for the first air handler to be evaluated for a specified time interval (such as for one minute). Such data could indicate that for the interval in question the fan in the air handler was "on," or that it was "off". In step 704 the server retrieves from database 300 values for the speed of the fan in the air handler for the specified time interval. Such data may be expressed as a percentage of maximum speed, as a direct measurement of revolutions per minute, as a measurement of the current drawn by the electric motor powering the fan, or some other measurement.

In step 706 the server retrieves from database 300 the cycling data for the next air handler to be evaluated for the specified time interval, and in step 708 the server retrieves from database 300 values for the speed of the fan in the next air handler for the specified time interval. The server continues to retrieve cycling data and fan speed values for additional air handlers until in steps 710 and 712 the server retrieves from database 300 the cycling and fan speed data for the last air handler to be evaluated.

In step 714 the server retrieves additional data that may be used to allocate overall operating costs during the specified interval. Such data may include static data such as the square footage of each separate unit in the building, the relative location of each unit (because units with more south and west-facing windows are likely to have higher loads, etc.), the size of each air handler and/or its included blower motor, or dynamic data such as the actual or predicted temperature rise (in the case of cooling) or drop (in the case of heating) for each air handler.

In step 716 the server retrieves from database 300 the cost per minute of run time for the complete chiller system for the time increment being evaluated. This number may be calculated or actually measured, and will likely be a function of the cost of a kilowatt-hour of electricity, the overall operating cost per time interval for the chiller unit associated with the air handler, and the number (and perhaps size) of other air handlers also associated with the same chiller. Alternatively, the sources for the data used for this calculation may be sensor data sourced from the controlled system rather than stored values retrieved from a database.

In step 718 the server calculates the cost of operating the first air handler for the time increment being evaluated. This cost will likely be a function of the overall cost per minute calculated in step 716, as well as the other parameters retrieved in steps 702-714. Specifically, the method described in FIG. 7d is intended to vary the allocated cost for a given unit during a given interval based upon the load placed upon the chiller not just by that unit, but by other units as well. This approach would allow equitable full allocation of chiller operating costs regardless of the number of units operating at a given time, even where the individual units employ variable-speed fans.

In step 720 the server calculates the cost of operating the next air handler for the time increment being evaluated. The server continues to calculate operating costs for additional air handlers until in step 722 the server calculates operating costs for the last air handler to be evaluated for that time increment.

In step 724 the server determines whether there are additional time intervals for which operating costs are to be calculated. If there are additional intervals, the server returns to step 702. If not, in step 726 the server calculates the allocated HVAC cost for all of the individual time intervals.

Figure 7E:
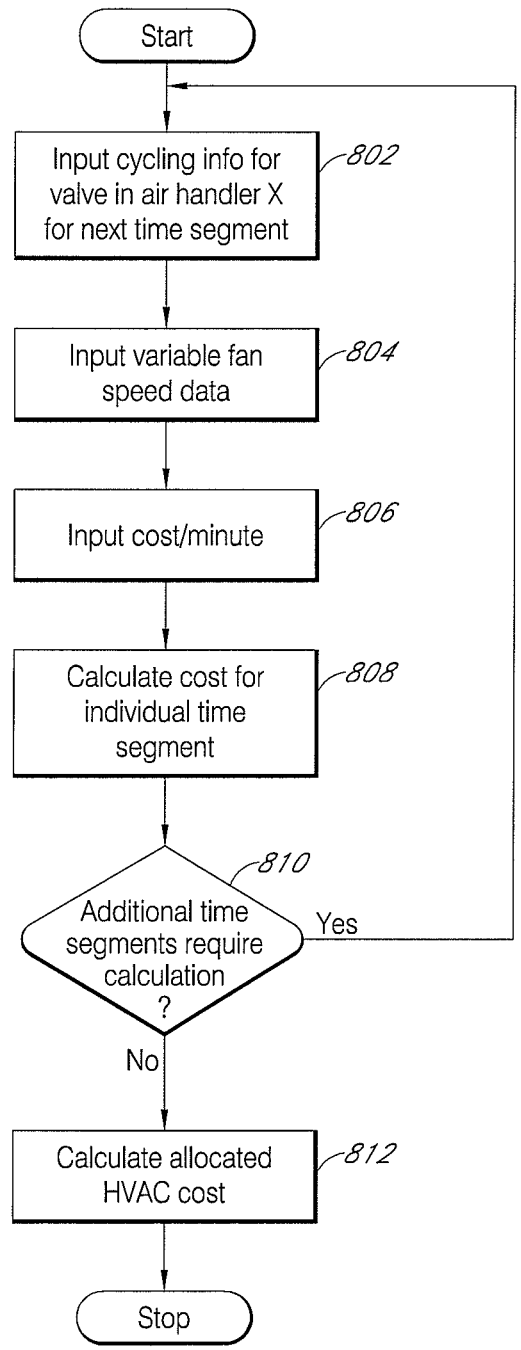

FIG. 7e illustrates how an embodiment of the subject invention can be used to calculate the cost of operation of the HVAC system to be allocated to a given conditioned space where the thermostat for a given unit operates by opening and closing a valve that determines whether the coolant in secondary loop 202 circulates through air handler in that conditioned space 110 plus data from other valves connected to the air handlers in other units.

In step 802 the server retrieves from database 300 the cycling data for a given air handler for a specified time interval (such as for one minute). Such data could indicate that for the interval in question the valve that determines whether secondary coolant is circulated through the air handler was "on," or "off". In step 804 the server retrieves from database 300 values for the speed of the fan in the air handler for the specified time interval. Such data may be expressed as a percentage of maximum speed, as a direct measurement of revolutions per minute, as a measurement of the current drawn by the electric motor powering the fan, or some other measurement. In step 806 the server retrieves from database 300 the cost per minute of run time for the air handler given both the valve status and actual fan speed as retrieved in step 804. This number is also likely to be a function of the cost per kilowatt/hour of electricity, the overall operating cost per time interval for the chiller unit associated with the air handler, and the number (and perhaps size) of other air handlers also associated with the same chiller. In step 808 the server computes the cost to operate the individual air handler for the specified time interval. In step 810 the server determines whether there are additional time intervals for which operating cost is to be calculated. If there are additional intervals, the server returns to step 802. If not, in step 812 the server calculates the allocated HVAC cost for all of the individual time intervals.

Figure 7F:
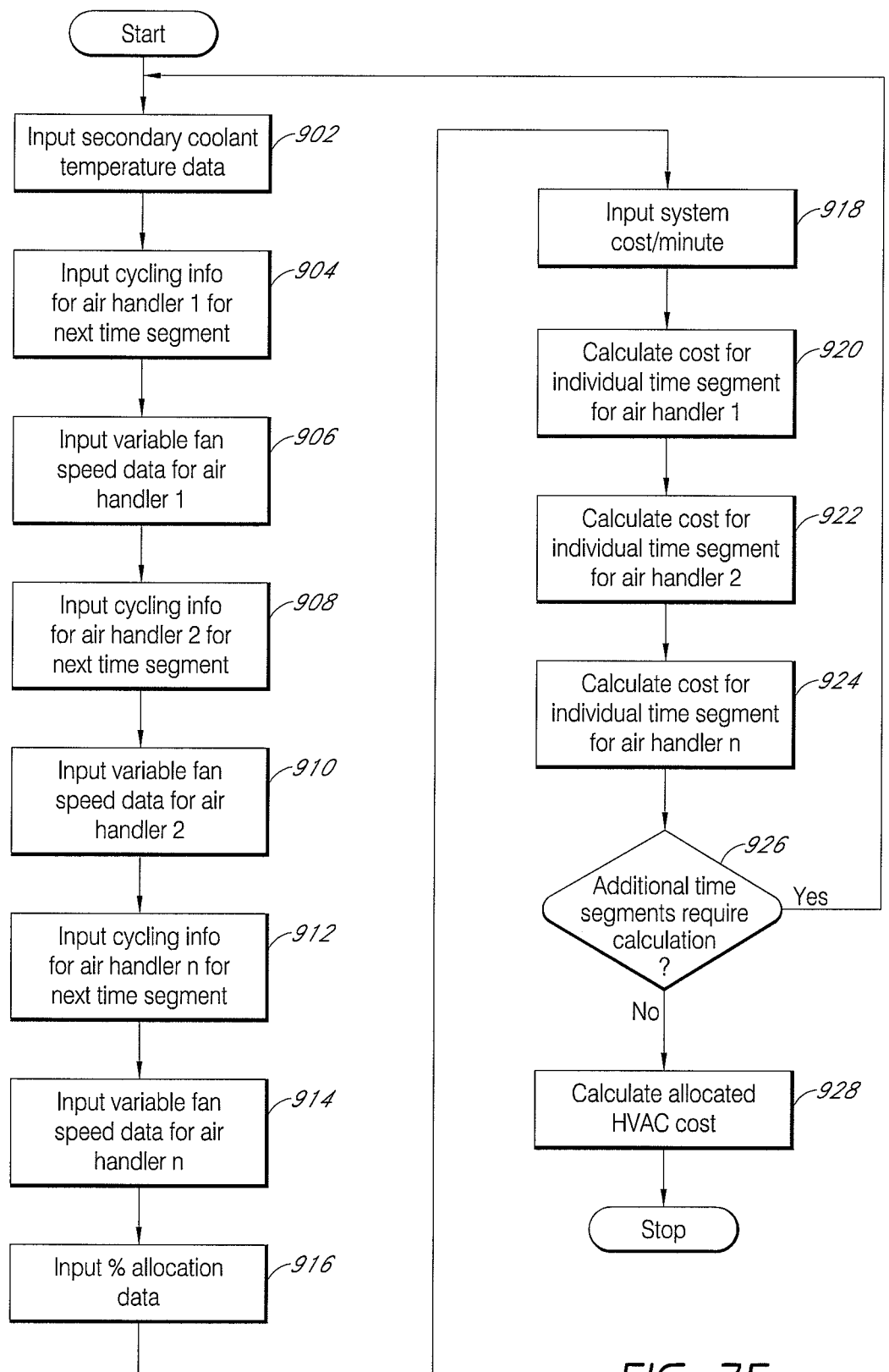

FIG. 7f illustrates how an embodiment of the subject invention can be used to calculate the cost of operation of the HVAC system to be allocated to a given conditioned space where server 106 has access to information regarding the overall change in temperature for the coolant in secondary loop 202.

This information may come from sensors 220a and 220b. This information can be useful because the energy required to operate the chiller may be expected to vary based upon the load placed on it by all of the connected air handlers. A large temperature rise from inlet to outlet may be expected to require the chiller to use more energy in order to reject the heat the air handlers add to the coolant; a minor temperature rise in coolant temperature will require less energy to dissipate. If may therefore be advantageous to allow the overall operating costs being allocated to individual air handlers to vary based upon overall operating costs as approximated by the temperature rise in the secondary coolant.

In step 902 the server retrieves information about absolute and/or relative coolant temperatures as it enters and leaves the air handlers being evaluated.

In step 904 the server retrieves from database 300 the cycling data for the first air handler to be evaluated for a specified time interval (such as for one minute). Such data could indicate that for the interval in question the fan in the air handler was "on," or that it was "off". In step 906 the server retrieves from database 300 values for the speed of the fan in the air handler for the specified time interval. Such data may be expressed as a percentage of maximum speed, as a direct measurement of revolutions per minute, as a measurement of the current drawn by the electric motor powering the fan, or some other measurement.

In step 908 the server retrieves from database 300 the cycling data for the next air handler to be evaluated for the specified time interval, and in step 910 the server retrieves from database 300 values for the speed of the fan in the next air handler for the specified time interval. The server continues to retrieve cycling data and fan speed values for additional air handlers until in steps 912 and 914 the server retrieves from database 300 the cycling and fan speed data for the last air handler to be evaluated.

In step 916 the server retrieves additional data that may be used to allocate overall operating costs during the specified interval. Such data may include static data such as the square footage of each separate unit in the building, the relative location of each unit (because units with more south and west-facing windows are likely to have higher loads, etc.), the size of each air handler and/or its included blower motor, or dynamic data such as the actual and/or predicted temperature rise (in the case of cooling) or drop (in the case of heating) for each air handler.

In step 918 the server retrieves from database 300 the cost per minute of run time for the complete chiller system for the time increment being evaluated. This number may be calculated or actually measured, and will likely be a function of the cost of a kilowatt-hour of electricity, the overall operating cost per time interval for the chiller unit associated with the air handler, and the number (and perhaps size) of other air handlers also associated with the same chiller.

In step 920 the server calculates the cost of operating the first air handler for the time increment being evaluated. This cost will likely be a function of the overall cost per minute calculated in step 922, as well as the other parameters retrieved in steps 902-916. Specifically, the method described in FIG. 7f is intended to vary the allocated cost for a given unit during a given interval based upon the load placed upon the chiller not just by that unit, but by other units as well. This approach would allow equitable full allocation of chiller operating costs regardless of the number of units operating at a given time, even where the individual units employ variable-speed fans.

In step 922 the server calculates the cost of operating the next air handler for the time increment being evaluated. The server continues to calculate operating costs for additional air handlers until in step 924 the server calculates operating costs for the last air handler to be evaluated for that time increment.

In step 926 the server determines whether there are additional time intervals for which operating costs are to be calculated. If there are additional intervals, the server returns to step 902. If not, in step 928 the server calculates the allocated HVAC cost for all of the individual time intervals.

Figure 7G:
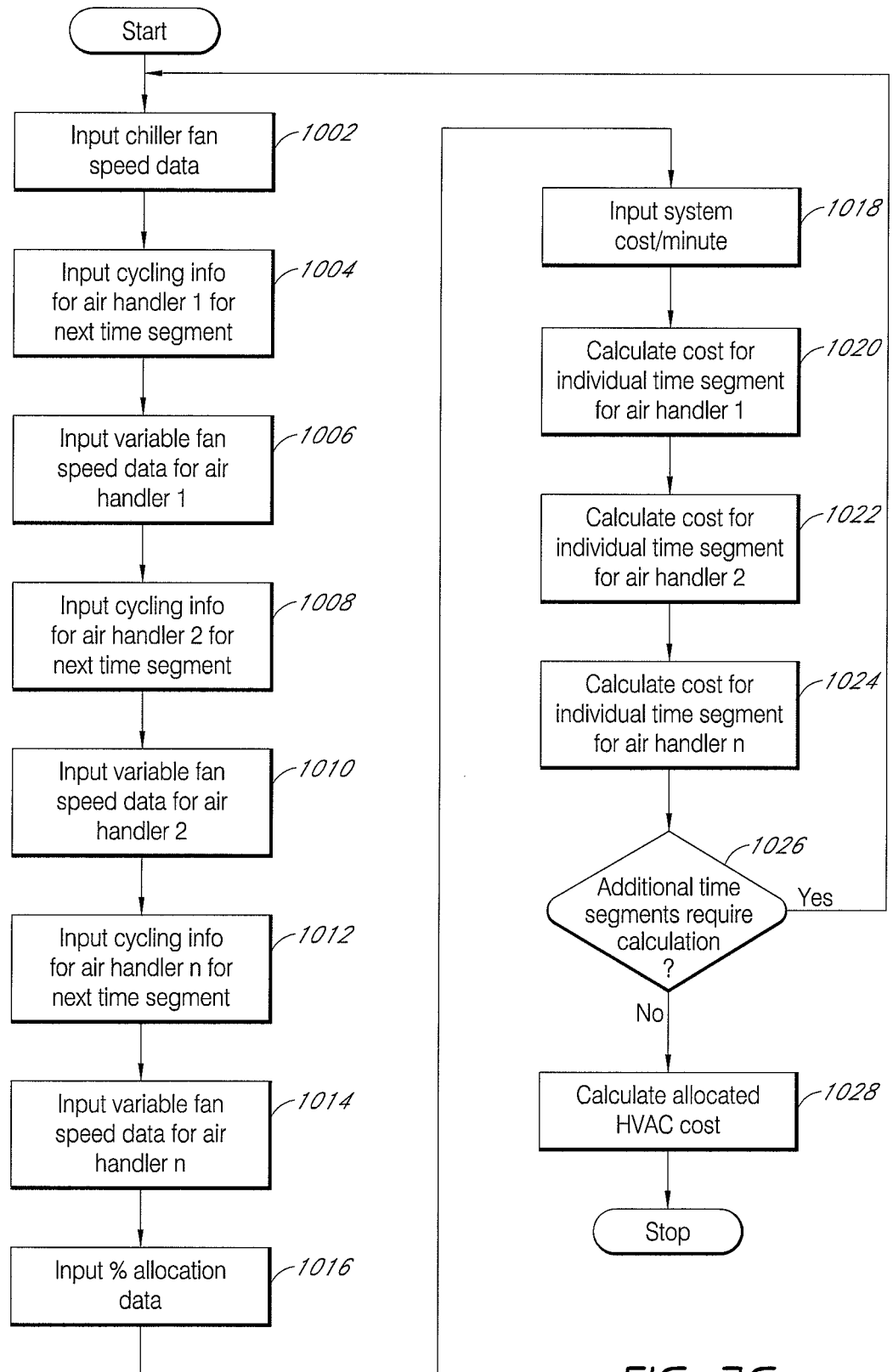

FIG. 7g illustrates how an embodiment of the subject invention can be used to calculate the cost of operation of the HVAC system to be allocated to a given conditioned space where server 106 has access to information regarding the speed of the fan or fans used to chill the primary loop 204 of chiller 206.

This information may come from sensors attached to the motor or motors, or from control circuitry that determines the voltage and/or current supplied to the motor, or even from external power sources sued to drive especially large systems. This information can be useful because the energy required to operate the chiller may be expected to vary based upon the load placed on it by all of the connected air handlers. When loads are greater, the fan(s) will have to work harder in order to reject the heat the air handlers add to the secondary loop, which are in turn transferred to the primary loop; a minor temperature rise in secondary loop coolant temperature will require less energy to dissipate, thus permitting the fan(s) to run more slowly. If may therefore be advantageous to allow the overall operating costs being allocated to individual air handlers to vary based upon overall operating costs as approximated by the speed of the fans used to chill the primary loop coolant.

In step 1002 the server retrieves information about the energy consumption associated with operation of the main chiller fans 212. Such information may include rotational speed, current draw, diesel fuel flow rate (in the case of diesel-fueled engines turning the fans), or other means of measuring or estimating energy use.

In step 1004 the server retrieves from database 300 the cycling data for the first air handler to be evaluated for a specified time interval (such as for one minute). Such data could indicate that for the interval in question the fan in the air handler was "on," or that it was "off". In step 1006 the server retrieves from database 300 values for the speed of the fan in the air handler for the specified time interval. Such data may be expressed as a percentage of maximum speed, as a direct measurement of revolutions per minute, as a measurement of the current drawn by the electric motor powering the fan, or some other measurement.

In step 1008 the server retrieves from database 300 the cycling data for the next air handler to be evaluated for the specified time interval, and in step 1010 the server retrieves from database 300 values for the speed of the fan in the next air handler for the specified time interval. The server continues to retrieve cycling data and fan speed values for additional air handlers until in steps 1012 and 1014 the server retrieves from database 300 the cycling and fan speed data for the last air handler to be evaluated.

In step 1016 the server retrieves additional data that may be used to allocate overall operating costs during the specified interval. Such data may include static data such as the square footage of each separate unit in the building, the relative location of each unit (because units with more south and west-facing windows are likely to have higher loads, etc.), the size of each air handler and/or its included blower motor, or dynamic data such as the actual or predicted temperature rise (in the case of cooling) or drop (in the case of heating) for each air handler.

In step 1018 the server retrieves from database 300 the cost per minute of run time for the complete chiller system for the time increment being evaluated. This number may be calculated or actually measured, and will likely be a function of the cost of a kilowatt-hour of electricity, the overall operating cost per time interval for the chiller unit associated with the air handler, and the number (and perhaps size) of other air handlers also associated with the same chiller.

In step 1020 the server calculates the cost of operating the first air handler for the time increment being evaluated. This cost will likely be a function of the overall cost per minute calculated in step 1022, as well as the other parameters retrieved in steps 1002-1016. Specifically, the method described in FIG. 7g is intended to vary the allocated cost for a given unit during a given interval based upon the load placed upon the chiller not just by that unit, but by other units as well. This approach would allow equitable full allocation of chiller operating costs regardless of the number of units operating at a given time, even where the individual units employ variable-speed fans.

In step 1022 the server calculates the cost of operating the next air handler for the time increment being evaluated. The server continues to calculate operating costs for additional air handlers until in step 1024 the server calculates operating costs for the last air handler to be evaluated for that time increment.

In step 1026 the server determines whether there are additional time intervals for which operating costs are to be calculated. If there are additional intervals, the server returns to step 1002. If not, in step 1028 the server calculates the allocated HVAC cost for all of the individual time intervals.

It should be noted that the processes described above in the context of air conditioning and the circulation of a coolant can be applied in other contexts as well, such as a hydronic system in which a heated fluid is circulated, steam-based systems, etc.

Other central-plant HVAC system topologies are also possible. So long as it is possible to measure at least one dynamic aspect of the cost of operating the common aspects of the system, and at least one dynamic aspect of the system that is controlled separately for individual occupancy units, it will be possible to allocate operating costs to some degree based upon such measurements.

In addition to being used to help properly allocate the cost of operating a centralized chiller-based HVAC system, the subject invention may also be used to help enable and encourage owners, tenants and other occupants of units conditioned by such systems to be more energy efficient.

One of the most significant ways to cut HVAC energy use without adversely affecting comfort is to avoid heating and cooling spaces when they are unoccupied. Directly sensing occupancy with motion sensors is common in the hospitality industry, but is more problematic in multi-room contexts. It also requires expensive retrofitting in existing structures.

Adding occupancy detection capability to residential HVAC systems could also add considerable value in the form of energy savings without significant tradeoff in terms of comfort. But the systems used in hotels do not easily transfer to the single-family residential context. Hotel rooms tend to be small enough that a single motion sensor is sufficient to determine with a high degree of accuracy whether or not the room is occupied. A single motion sensor in the average home today would have limited value because there are likely to be many places one or more people could be home and active yet invisible to the motion sensor. The most economical way to include a motion sensor in a traditional programmable thermostat would be to build it into the thermostat itself. But thermostats are generally located in hallways, and thus are unlikely to be exposed to the areas where people tend to spend their time. Wiring a home with multiple motion sensors in order to maximize the chances of detecting occupants would involve considerable expense, both for the sensors themselves and for the considerable cost of installation, especially in the retrofit market. Yet if control is ceded to a single-sensor system that cannot reliably detect presence, the resulting errors would likely lead the homeowner to reject the system.

Although progress in residential HVAC control has been slow, tremendous technological change has come to the tools used for personal communication. When programmable thermostats were first offered, telephones were virtually all tethered by wires to a wall jack. But now a large percentage of the population carries at least one mobile device capable of sending and receiving voice or data or even video (or a combination thereof) from almost anywhere by means of a wireless network. These devices create the possibility that a consumer can, with an appropriate mobile device and a network-enabled HVAC system, control his or her HVAC system even when away from home. But systems that relay on active management decisions by consumers are likely to yield sub-optimal energy management outcomes, because consumers are unlikely to devote the attention and effort required to fully optimize energy use on a daily basis.

Many new mobile devices now incorporate another significant new technology—the ability to geolocate the device (and thus, presumably, the user of the device). One method of locating such devices uses the Global Positioning System (GPS). The GPS system uses a constellation of orbiting satellites with very precise clocks to triangulate the position of a device anywhere on earth based upon arrival times of signals received from those satellites by the device. Another approach to geolocation triangulates using signals from multiple cell phone towers. Such systems can enable a variety of so-called "location based services" to users of enabled devices. These services are generally thought of as aids to commerce like pointing users to restaurants or gas stations, etc.

The subject invention can actually indirectly detect and even anticipate some occupancy changes without a direct occupancy sensor by using information about the behavior and location of users of that space as gathered from other electronic devices used by those actual or potential occupants.

Figure 8:
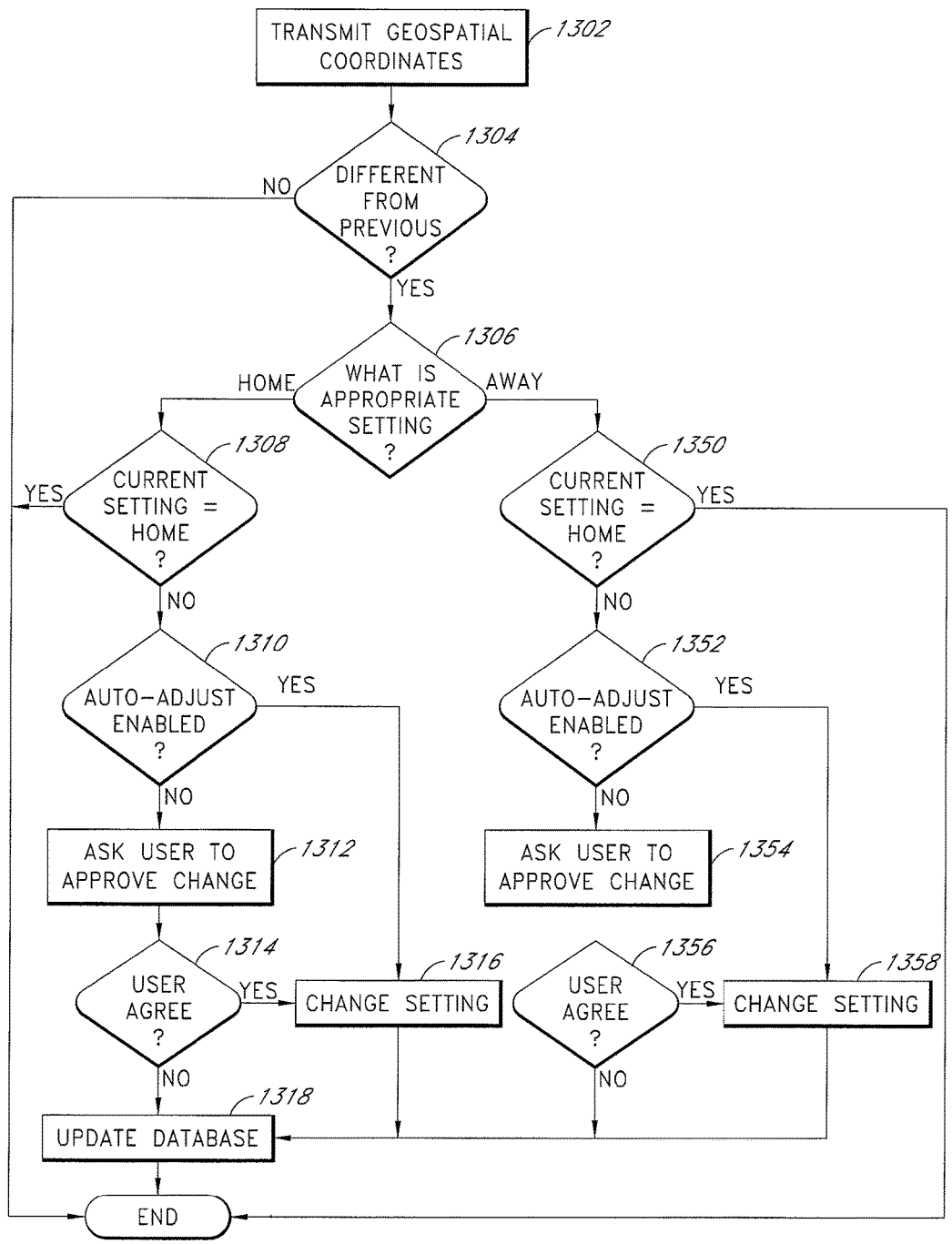
FIG. 8 is a flowchart that shows how the invention can be used to select different HVAC settings based upon its ability to identify the location of a potential occupant using a mobile device connected to the system.

FIG. 8 is a high-level flowchart showing the steps involved in the operation of one embodiment of the subject invention in order to use a mobile device to assist in the process of determining whether to condition a given space for occupancy. In step 1302, mobile device 105 transmits geopositioning information to server 106 via the Internet. In step 1304 the server compares the latest geopositioning data point to previous data points in order to determine whether a change in location or vector of movement has occurred. In step 1306 the server evaluates the geopositioning data in order to determine whether the temperature settings for the HVAC system for the structure associated with the mobile device 105 should be optimized for an unoccupied structure, or for an occupied structure in light of the movement (or lack thereof) in the geopositioning data. If the server 106 determines that the home should be in occupied or "home" mode, then in step 1308 the server queries database 300 to determine whether thermostat 108 is already set for home or away mode. If thermostat 108 is already in home mode, then the application terminates for a specified interval. If the HVAC settings then in effect are intended to apply when the home is unoccupied, then in step 1310 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 1316, in which it changes the programmed setpoint for the thermostat to the setting intended for the space when occupied. If the user has previously specified that the application should not make such changes without further user input, then in step 1312 the application transmits a command to the location specified by the user (generally mobile device 105) directing the device display a message informing the user that the current setting assumes an unoccupied space and asking the user to choose whether to either keep the current settings or revert to the pre-selected setting for an occupied home. If the user selects to retain the current setting, then in step 1318 the application will write to database 300 the fact that the user has so elected and terminate. If the user elects to change the setting, then in step 1316 the application transmits the revised setpoint to the thermostat. In step 1318 the application writes the updated setting information to database 300.

If the server 106 determines in step 1306 that the home should be in unoccupied or away mode, then in step 1350 the server queries database 300 to determine whether thermostat 108 is set for set for home or away mode. If thermostat 108 is already in home mode, then the application terminates for a specified interval. If the HVAC settings then in effect are intended to apply when the home is occupied, then in step 1352 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 1358, in which it changes the programmed setpoint for the thermostat to the setting intended for the space when unoccupied. If the user has previously specified that the application should not make such changes without further user input, then in step 1354 the application transmits a command to the location specified by the user (generally mobile device 105) directing the device display a message informing the user that the current setting assumes an unoccupied space and asking the user to choose whether to either keep the current settings or revert to the pre-selected setting for an occupied home. If the user selects to retain the current setting, then in step 1318 the application will write to database 300 the fact that the user has so elected and terminate. If the user elects to change the setting, then in step 1316 the application transmits the revised setpoint to the thermostat. In step 1318 the application writes the updated setting information to database 300. If thermostat 108 is already in away mode, the program ends. If it was in home mode, then in step 1314 server 108 initiates a state change to put thermostat 108 in away mode. In either case, the server then in step 1316 writes the state change to database 300. In each case the server can also send a message to the person who owns the mobile device requesting, confirming or announcing the state change.

Figure 9:
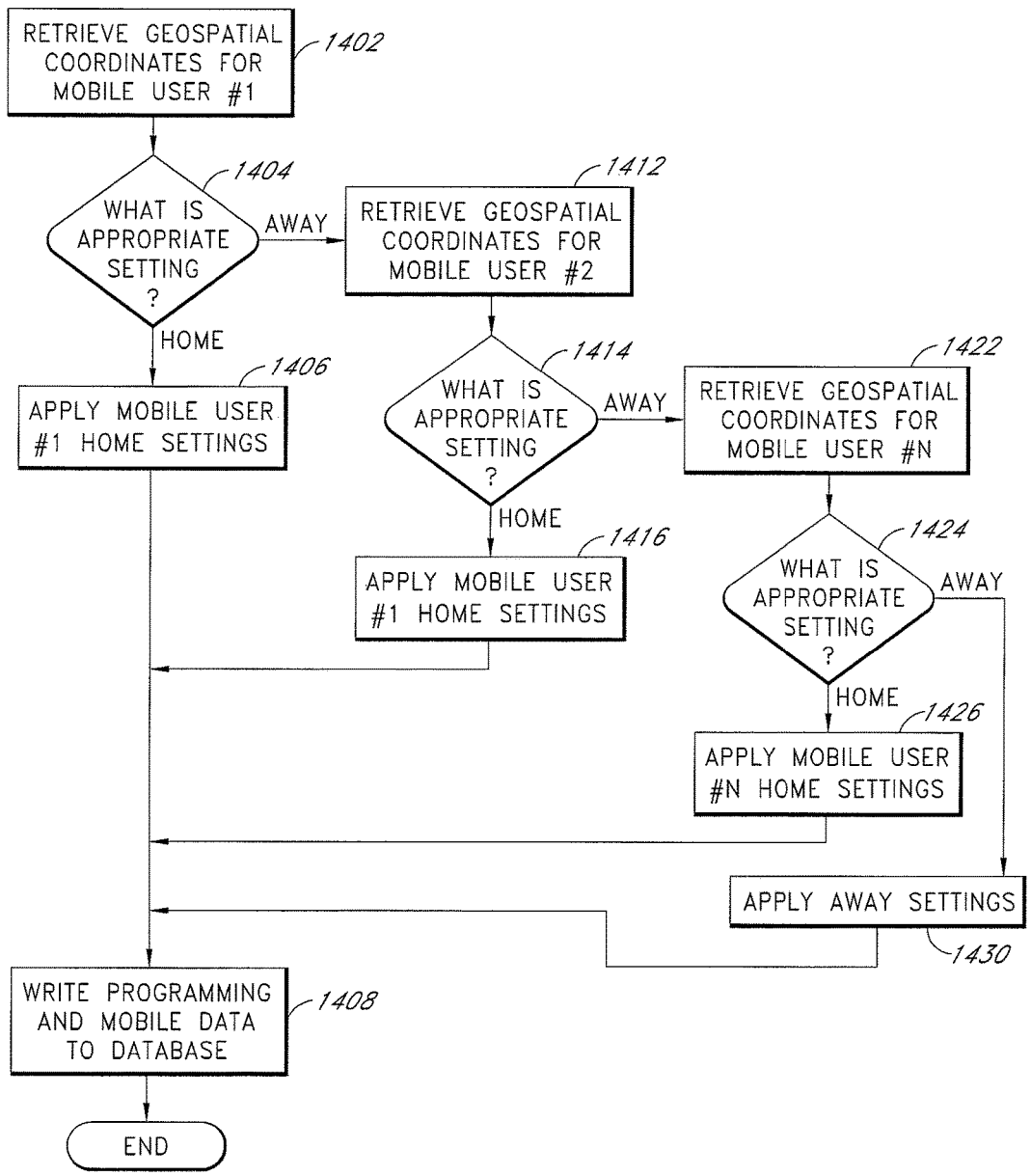
FIG. 9 is a flowchart that shows how the invention can be used to select different HVAC settings based upon its ability to identify which of multiple potential occupants is using the mobile device connected to the system.

FIG. 9 is a flowchart that shows one process by which the subject invention can be used to select different HVAC settings based upon its ability to identify which of multiple potential occupants is using the mobile device attached to the system. The process shown assumes (a) a static hierarchy of temperature preferences as between multiple occupants (that is, that for a given conditioned space, mobile user #1's preferences will always control the outcome if mobile user #1 is present, that mobile user #2's preferences yield to #1's, but always prevail over user #3, etc.); and (b) that there are no occupants to consider who are not associated with a geopositioning-enabled mobile device. Other heuristics may be applied in order to account for more dynamic interactions of preferences, for situations in which some occupants do not have enabled mobile devices, etc.

In step 1402 server 106 retrieves the most recent geospatial coordinates from the mobile device 105 associated with mobile user #1. In step 1404 server 106 uses current and recent coordinates to determine whether mobile user #1's "home" (or "occupied") settings should be applied. If server 106 determines that User #1's home settings should be applied, then in step 1406 server 106 applies the correct setting and transmits it to the thermostat(s). In step 1408, server 106 writes to database 300 the geospatial information used to adjust the programming. If after performing step 1404, the server concludes that mobile user #1's "home" settings should not be applied, then in step 1412 server 106 retrieves the most recent geospatial coordinates from the mobile device 105 associated with mobile user #2. In step 1414 server 106 uses current and recent coordinates to determine whether mobile user #2's "home" settings should be applied. If server 106 determines that User #2's home settings should be applied, then in step 1416 server 106 applies the correct setting and transmits it to the thermostat(s). In step 1408, server 106 writes to database 300 the geospatial and other relevant information used to adjust the programming. If after performing step 1414, the server concludes that mobile user #2's "home" settings should not be applied, then in step 1422 server 106 retrieves the most recent geospatial coordinates from the mobile device 105 associated with mobile user #N. In step 1424 server 106 uses current and recent coordinates to determine whether mobile user #N's "home" settings should be applied. If server 106 determines that User #N's home settings should be applied, then in step 1426 server 106 applies the correct setting and transmits it to the thermostat(s). In step 1408, server 106 writes to database 300 the geospatial information used to adjust the programming.

If none of the mobile devices associated with a given home or other structure report geospatial coordinates consistent with occupancy, then in step 1430 the server instructs the thermostat(s) to switch to or maintain the "away" setting.

Additional energy-saving and comfort-enhancing functionality is also envisioned as part of the subject invention. For example, information from historic data may be used to predict how long it will take a regular user to reach a conditioned space from the current coordinates, and the estimated arrival time may be used to calculate optimal cycling strategies for the HVAC system. Thus the longer it is predicted to take the mobile device user to arrive at home, the later the subject invention will switch to an occupied setting. In addition, information about traffic conditions may be integrated into these calculations, so that the geospatial data relative to mobile device 105 may indicate that a user is taking his or her normal route, but because of a traffic jam, is likely to arrive later than would otherwise be expected. The characteristics of a given location may be used to infer arrival times as well. For example, if the geospatial data indicates that the user of mobile device 105 has arrived at the supermarket on his way to the conditioned space, a delay of 20 minutes is likely, whereas if the user has parked at a restaurant, the delay is likely to be one hour.

It is also possible to incorporate more sophisticated heuristics in incorporating the varying preferences of multiple occupants of a given structure. For example, rules can be structured so that User #1's preferences control during the heating season, but not during the cooling season; User #2's preferences might control during certain times of the day but not others; User #3's preferences may take precedence whenever they result in a more energy efficient strategy, but not when they result in increased energy use, and so on.

The subject invention is capable of delivering additional techniques that increase comfort and efficiency. In addition to using the system to allow better signaling and control of the HVAC system, which relies primarily on communication running from the server to the thermostat, the bi-directional communication will also allow thermostat 108 to regularly measure and send to the server information about the temperature in the conditioned space. By comparing outside temperature, inside temperature, thermostat settings, cycling behavior of the HVAC system, and other variables, the system will be capable of numerous diagnostic and controlling functions beyond those of a standard thermostat. It will also be capable of using the known physical relationship between different conditioned spaces (that is, the fact that, for example, one apartment might be directly above another) to understand and optimize the use of energy in those spaces. Thus if the occupants of an apartment on the $10^{th}$ floor maintain very high winter setpoints, thereby reducing the need to run the heating for the unit directly above it on the $11^{th}$ floor (because heat rises), the cost allocation system could, if desired, share some of the cost of that heating between units, or could advise the occupant of the $10^{th}$ floor unit of these facts, or otherwise use the data to reinforce more energy-efficient choices.

Figure 10A:
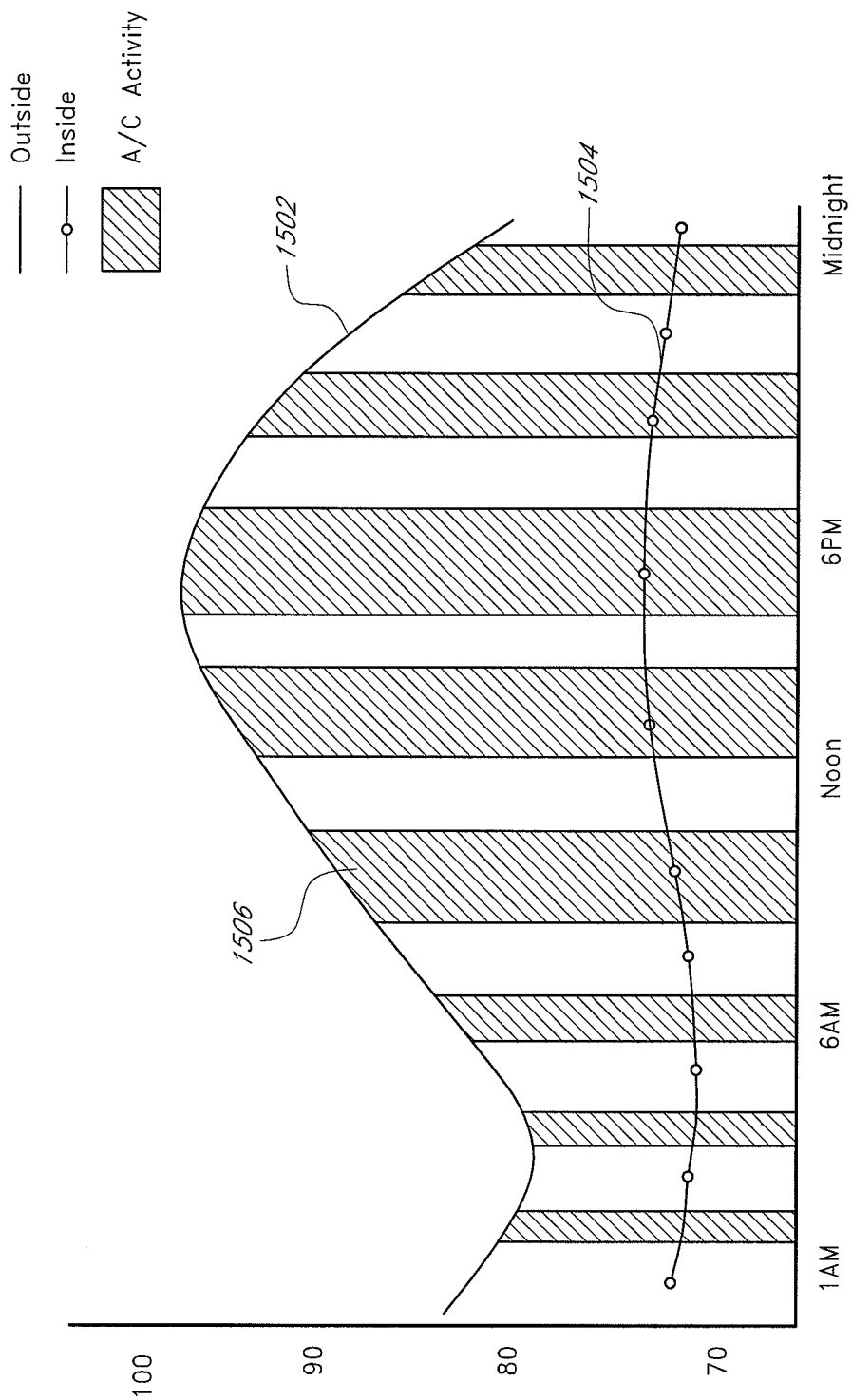
FIGS. 10a and 10b show how comparing inside temperature and outside temperature and other variables for a given conditioned space permits calculation of dynamic signatures.

For example, FIG. 10*a* shows a graph of inside temperature, outside temperature and HVAC activity for a 24-hour period in a specific hypothetical conditioned space. When outside temperature 1502 increases, inside temperature 1504 follows, but with some delay because of the thermal mass of the building, unless the air conditioning 1506 operates to counteract this effect. When the air conditioning turns on, the inside temperature stays constant (or rises at a much lower rate or even falls) despite the rising outside temperature. In this example, frequent and heavy use of the air conditioning results in only a very slight temperature increase inside the space of 4 degrees, from 72 to 76 degrees, despite the increase in outside temperature from 80 to 100 degrees.

Figure 10B:
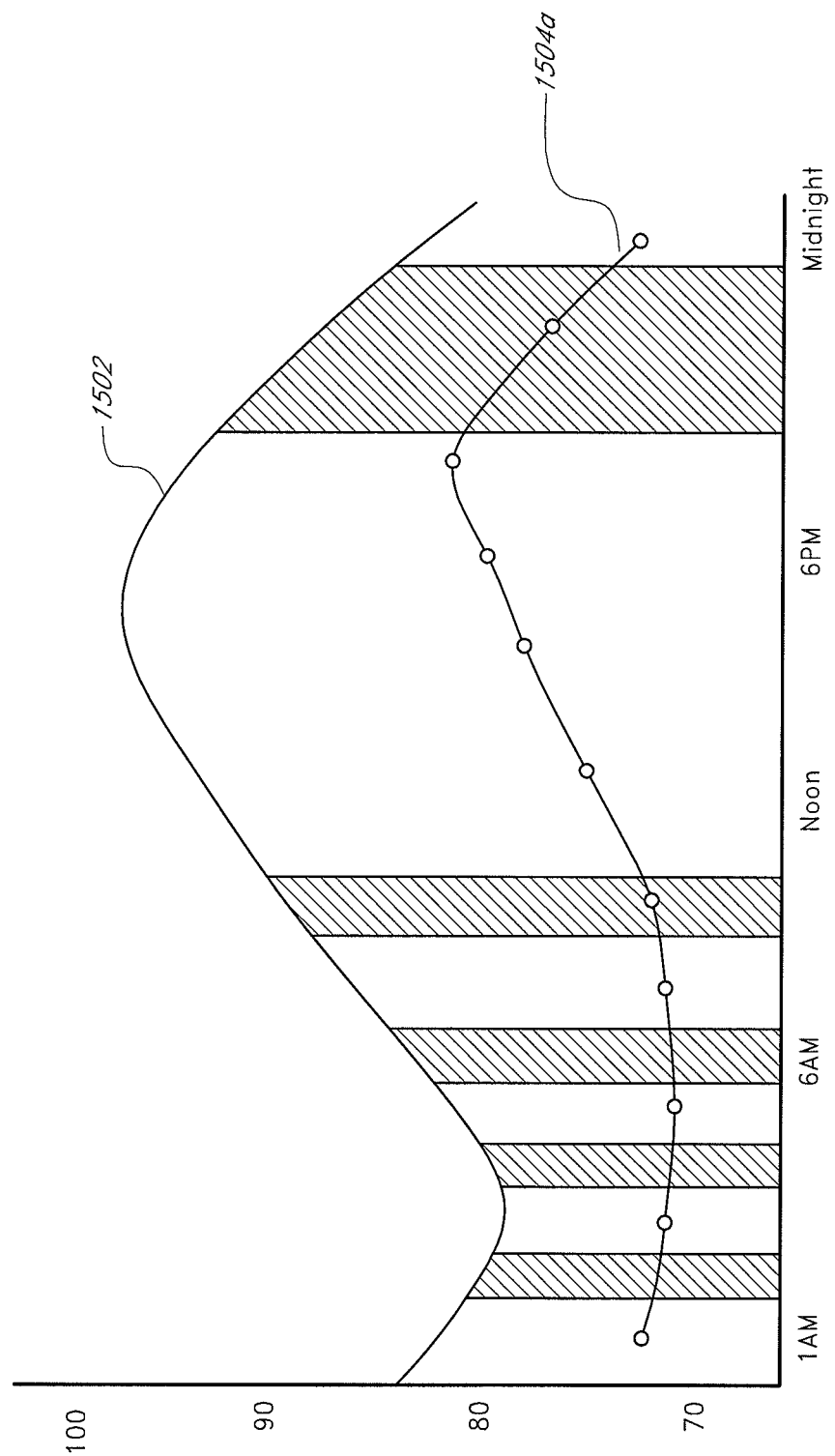

FIG. 10*b* shows a graph of the same conditioned space on the same day, but assumes that the air conditioning is turned off from noon to 7 PM. As expected, the inside temperature 1504*a* rises with increasing outside temperatures 1502 for most of that period, reaching 88 degrees at 7 PM. Because server 106 logs the temperature readings from inside each conditioned space (whether once per minute or over some other interval), as well as the timing and duration of air conditioning cycles, database 300 will contain a history of the thermal performance of each such space. That performance data will allow the server 106 to calculate an effective thermal mass for each such space—that is, the speed with which the temperature inside a given conditioned space will change in response to changes in outside temperature. Because the server will also log these inputs against other inputs including time of day, humidity, etc. the server will be able to predict, at any given time on any given day, the rate at which inside temperature should change for given inside and outside temperatures. Because the server also logs similar data from other thermostats in other units in the same building, it is also possible to predict how temperatures and setpoints in one unit will affect temperatures and system run times on adjacent units.

The ability to predict the rate of change in inside temperature in a given space under varying conditions may be applied by in effect holding the desired future inside temperature as a constraint and using the ability to predict the rate of change to determine when the HVAC system must be turned on in order to reach the desired temperature at the desired time. The ability of an HVAC system to vary turn-on time in order to achieve a setpoint with minimum energy use may be thought of as Just In Time (JIT) optimization.

Figure 11:
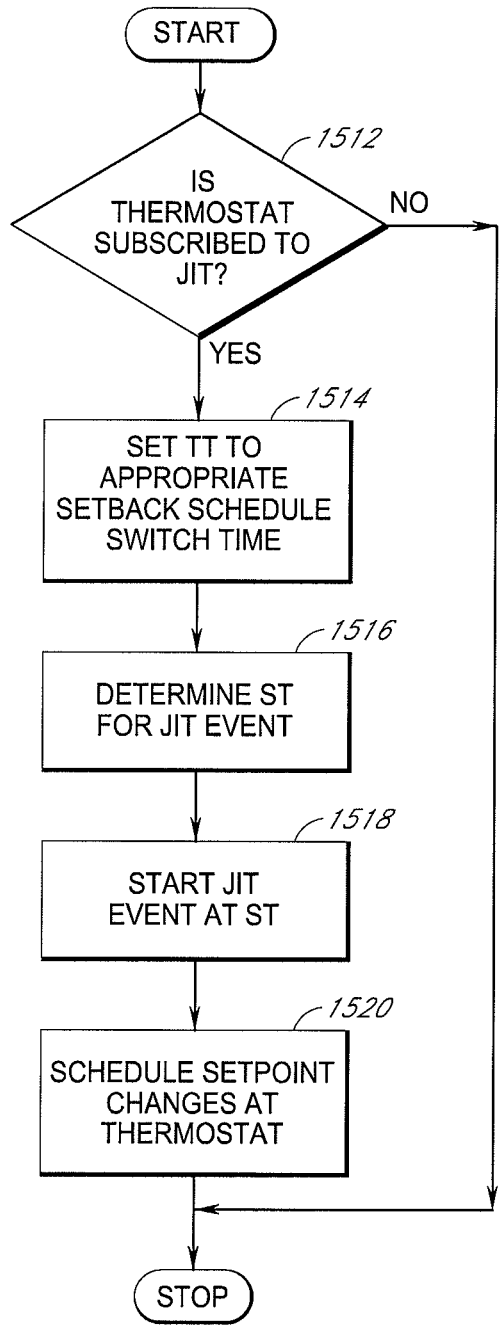
FIG. 11 is a flow chart for a high level version of the process of calculating the appropriate just-in-time turn-on time for the HVAC system in a given conditioned space.

FIG. 11 shows a flowchart illustrating the high-level process for controlling a just-in-time (JIT) event for a specific occupied space. In step 1512, the server determines whether a specific thermostat 108 is scheduled to run the preconditioning program. If, not, the program terminates. If it so scheduled, then in step 1514 the server retrieves the predetermined target time when the preconditioning is intended to have been completed (TT). Using TT as an input, in step 1516 the server then determines the time at which the computational steps required to program the preconditioning event will be performed (ST). In step 1518, performed at start time ST, the server begins the process of actually calculating the required parameters, as discussed in greater detail below. Then in 1520 specific setpoint changes are transmitted to the thermostat so that the temperature inside the home may be appropriately changed as intended.

Figure 12:
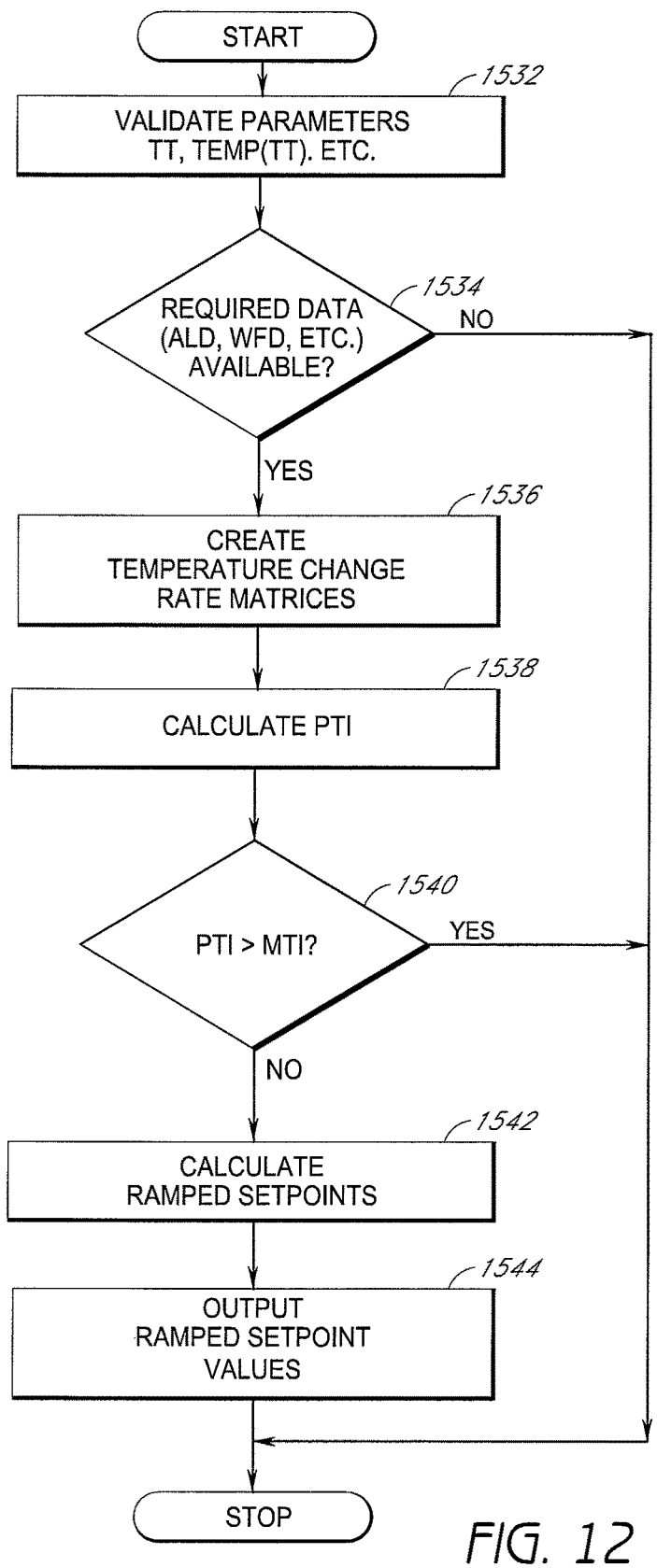
FIG. 12 is a more detailed flowchart listing the steps in the process of calculating the appropriate turn-on time in a given conditioned space for a just-in-time event.

FIG. 12 shows a more detailed flowchart of the process. In step 1532, the server retrieves input parameters used to create a JIT event for a specific occupied space. These parameters include the maximum time allowed for a JIT event for thermostat 108 (MTI); the target time the system is intended to hit the desired temperature (TT); and the desired inside temperature at TT (TempTT). It is useful to set a value for MTI because, for example, it will be reasonable to prevent the HVAC system from running a preconditioning event if it would be expected to take 8 hours, which might be prohibitively expensive.

In step 1534, the server retrieves data used to calculate the appropriate start time with the given input parameters. This data may include a set of algorithmic learning data (ALD), composed of historic readings from the thermostat, together with associated weather data, such as outside temperature, solar radiation, humidity, wind speed and direction, etc.; together with weather forecast data for the subject location for the period when the algorithm is scheduled to run (the weather forecast data, or WFD). The forecasting data can be as simple as a listing of expected temperatures for a period of hours subsequent to the time at which the calculations are performed, or may include more detailed tables including humidity, solar radiation, wind, etc. Alternatively, it can include additional information such as some or all of the kinds of data collected in the ALD.

In step 1536, the server uses the ALD and the WFD to create prediction tables that determine the expected rate of change or slope of inside temperature for each minute of HVAC cycle time ($\Delta T$) for the relevant range of possible pre-existing inside temperatures and outside climatic conditions. An example of a simple prediction table is illustrated in FIGS. 17-1 and 17.2.

In step 1538, the server uses the prediction tables created in step 1106, combined with input parameters TT and Temp(TT) to determine the time at which slope $\Delta T$ intersects with predicted initial temperature PT. The time between PT and TT is the key calculated parameter: the preconditioning time interval, or PTI.

In step 1540, the server checks to confirm that the time required to execute the pre-conditioning event PTI does not exceed the maximum parameter MTI. If PTI exceeds MTI, the scheduling routine concludes and no ramping setpoints are transmitted to the thermostat.

If the system is perfect in its predictive abilities and its assumptions about the temperature inside the home are completely accurate, then in theory the thermostat can simply be reprogrammed once—at time PT, the thermostat can simply be reprogrammed to Temp(TT). However, there are drawbacks to this approach. First, if the server has been overly conservative in its predictions as to the possible rate of change in temperature caused by the HVAC system, the inside temperature will reach TT too soon, thus wasting energy and at least partially defeating the purpose of running the preconditioning routine in the first place. If the server is too optimistic in its projections, there will be no way to catch up, and the home will not reach Temp(TT) until after TT. Thus it would be desirable to build into the system a means for self-correcting for slightly conservative start times without excessive energy use. Second, the use of setpoints as a proxy for actual inside temperatures in the calculations is efficient, but can be inaccurate under certain circumstances. In the winter (heating) context, for example, if the actual inside temperature is a few degrees above the setpoint (which can happen when outside temperatures are warm enough that the home's natural "set point" is above the thermostat setting), then setting the thermostat to Temp(TT) at time PT will almost certainly lead to reaching TT too soon as well.

The currently preferred solution to both of these possible inaccuracies is to calculate and program a series of intermediate settings between Temp(PT) and Temp(TT) that are roughly related to $\Delta T$.

Thus if MTI is greater than PTI, then in step 1542 the server calculates the schedule of intermediate setpoints and time intervals to be transmitted to the thermostat. Because thermostats cannot generally be programmed with steps of less than 1 degree F., $\Delta T$ is quantized into discrete interval data of at least 1 degree F. each. For example, if Temp(PT) is 65 degrees F., Temp(TT) is 72 degrees F., and PT is 90 minutes, the thermostat might be programmed to be set at 66 for 10 minutes, 67 for 12 minutes, 68 for 15 minutes, etc. The server may optionally limit the process by assigning a minimum programming interval (e.g., at least ten minutes between setpoint changes) to avoid frequent switching of the HVAC system, which can reduce accuracy because of the thermostat's compressor delay circuit, which may prevent quick corrections. The duration of each individual step may be a simple arithmetic function of the time PTI divided by the number of whole-degree steps to be taken; alternatively, the duration of each step may take into account second order thermodynamic effects relating to the increasing difficulty of "pushing" the temperature inside a conditioned space further from its natural setpoint given outside weather conditions, etc. (that is, the fact that on a cold winter day it may take more energy to move the temperature inside the home from 70 degrees F. to 71 than it does to move it from 60 degrees to 61).

In step 1544, the server schedules setpoint changes calculated in step 1112 for execution by the thermostat.

With this system, if actual inside temperature at PT is significantly higher than Temp(PT), then the first changes to setpoints will have no effect (that is, the HVAC system will remain off), and the HVAC system will not begin using energy, until the appropriate time, as shown in FIG. 12. Similarly, if the server has used conservative predictions to generate $\Delta T$, and the HVAC system runs ahead of the predicted rate of change, the incremental changes in setpoint will delay further increases until the appropriate time in order to again minimize unnecessary energy use.

Figure 13A:
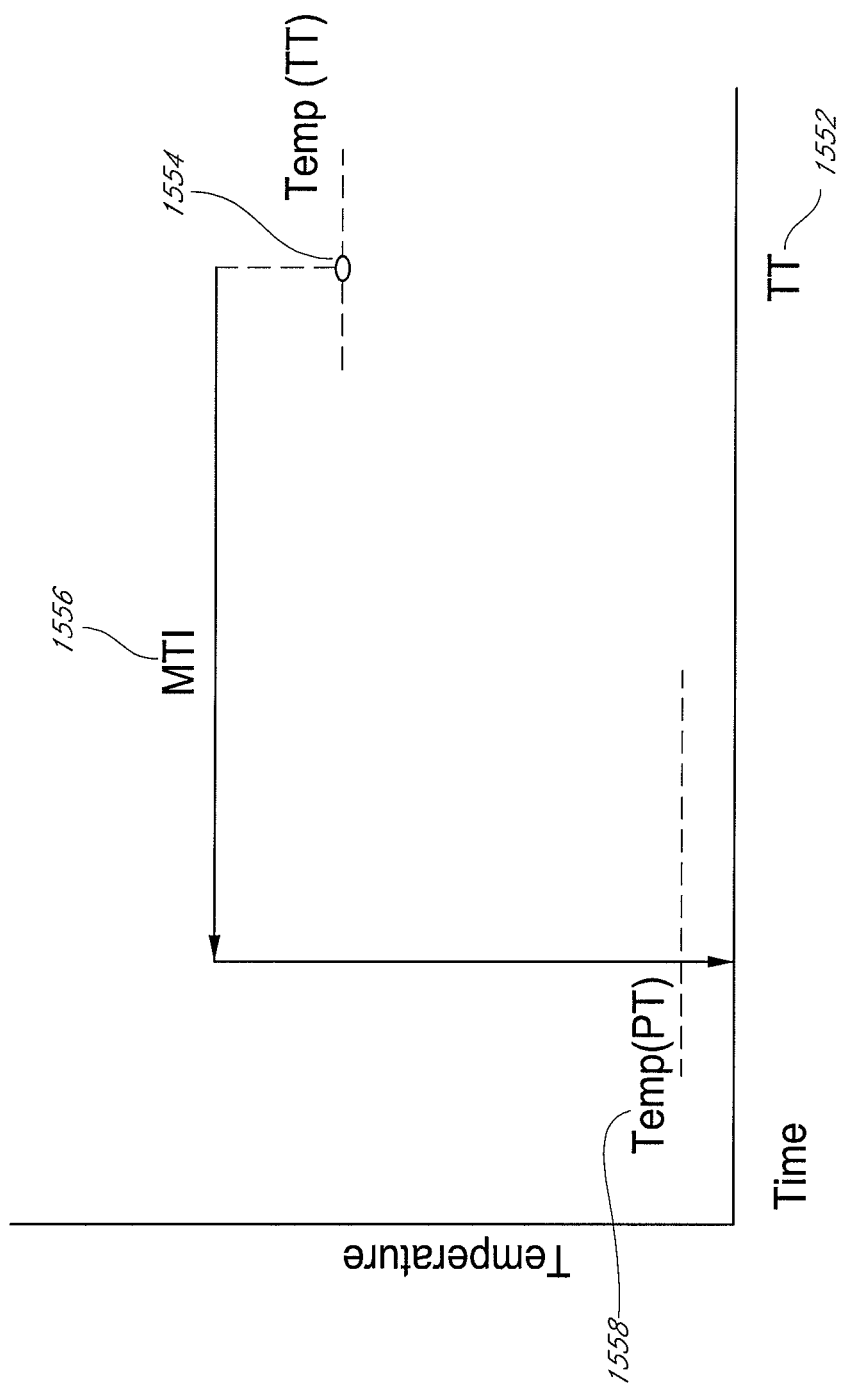
FIGS. 13a, 13b, 13c and 13d show the steps shown in the flowchart in FIG. 12 in the form of a graph of temperature and time.

FIGS. 13(a) through 13(d) shows the steps in the preconditioning process as a graph of temperature and time. FIG. 13(a) shows step 1532, in which inputs target time TT 1552, target temperature Temp(TT) 1554, maximum conditioning interval MTI 1556 and the predicted inside temperature during the period of time the preconditioning event is likely to begin Temp(PT) 1558 are retrieved.

Figure 13B:
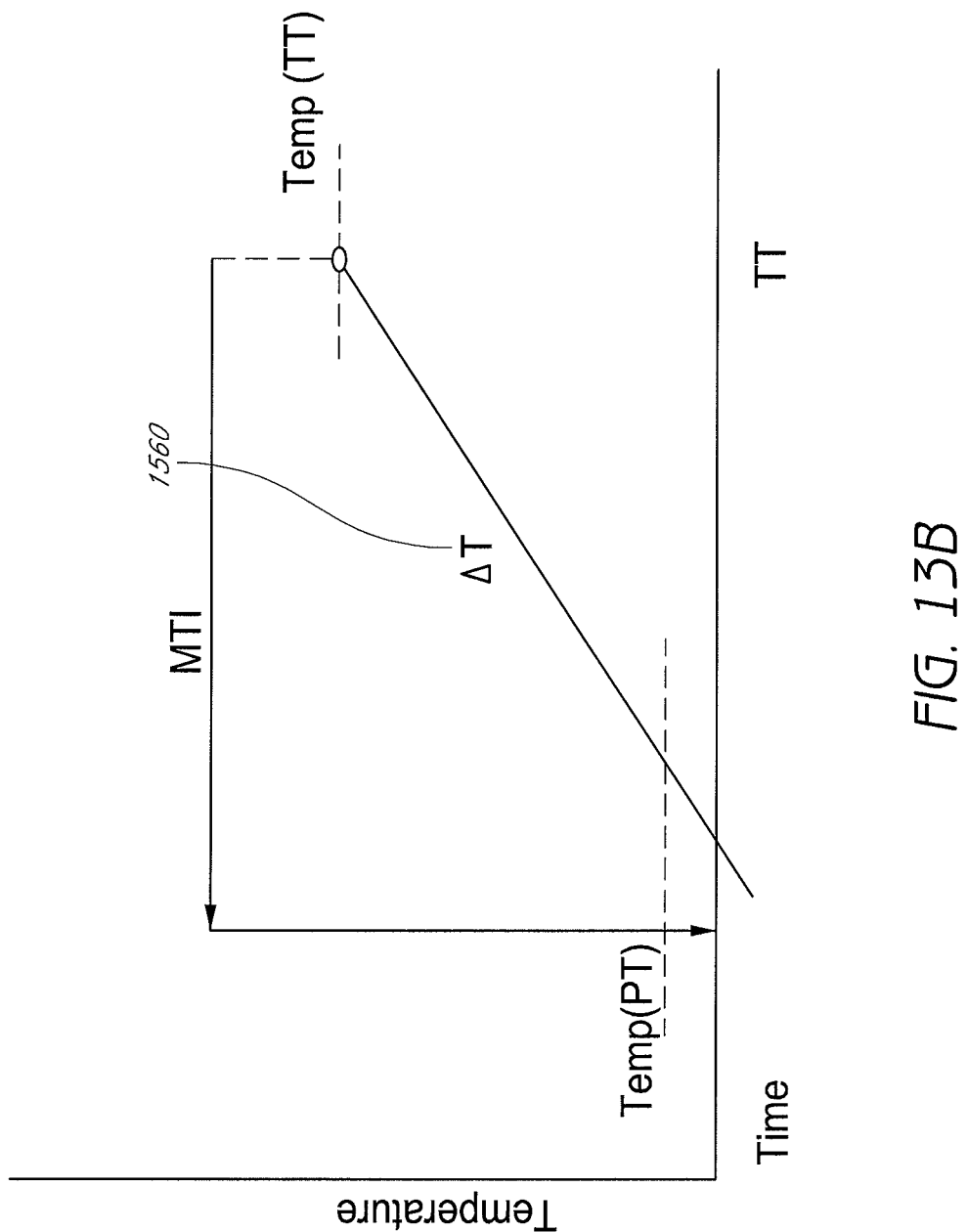

FIG. 13(b) shows the initial calculations performed in step 1538, in which expected rate of change in temperature $\Delta T$ 1560 inside the home is generated from the ALD and WFD using Temp(TT) 1554 at time TT 1552 as the endpoint.

Figure 13C:
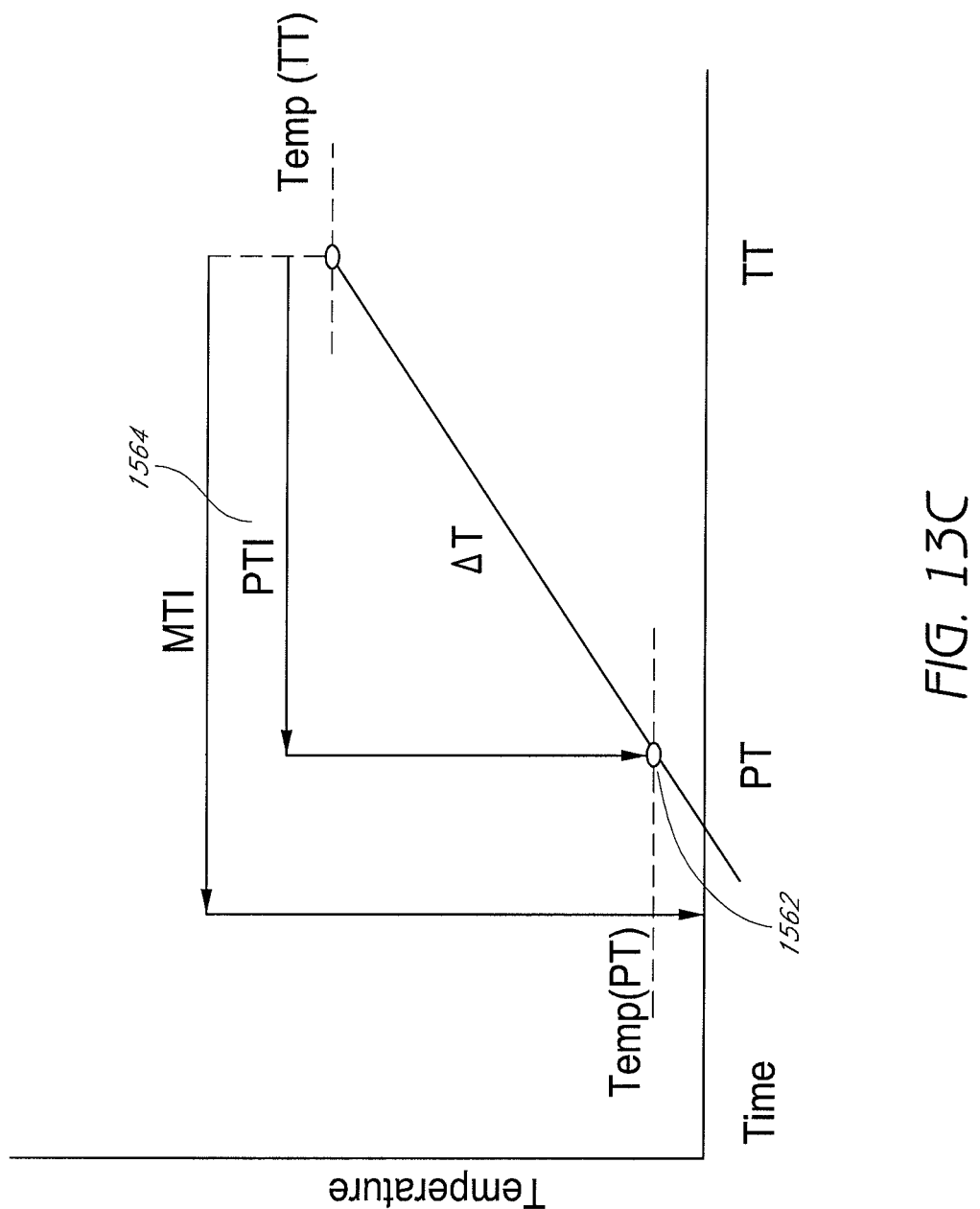

FIG. 13(c) shows how in step 1538 $\Delta T$ 1560 is used to determine start time PT 1562 and preconditioning time interval PTI 1564. It also shows how in step 1540 the server can compare PTI with MTI to determine whether or not to instantiate the pre-conditioning program for the thermostat.

Figure 13D:
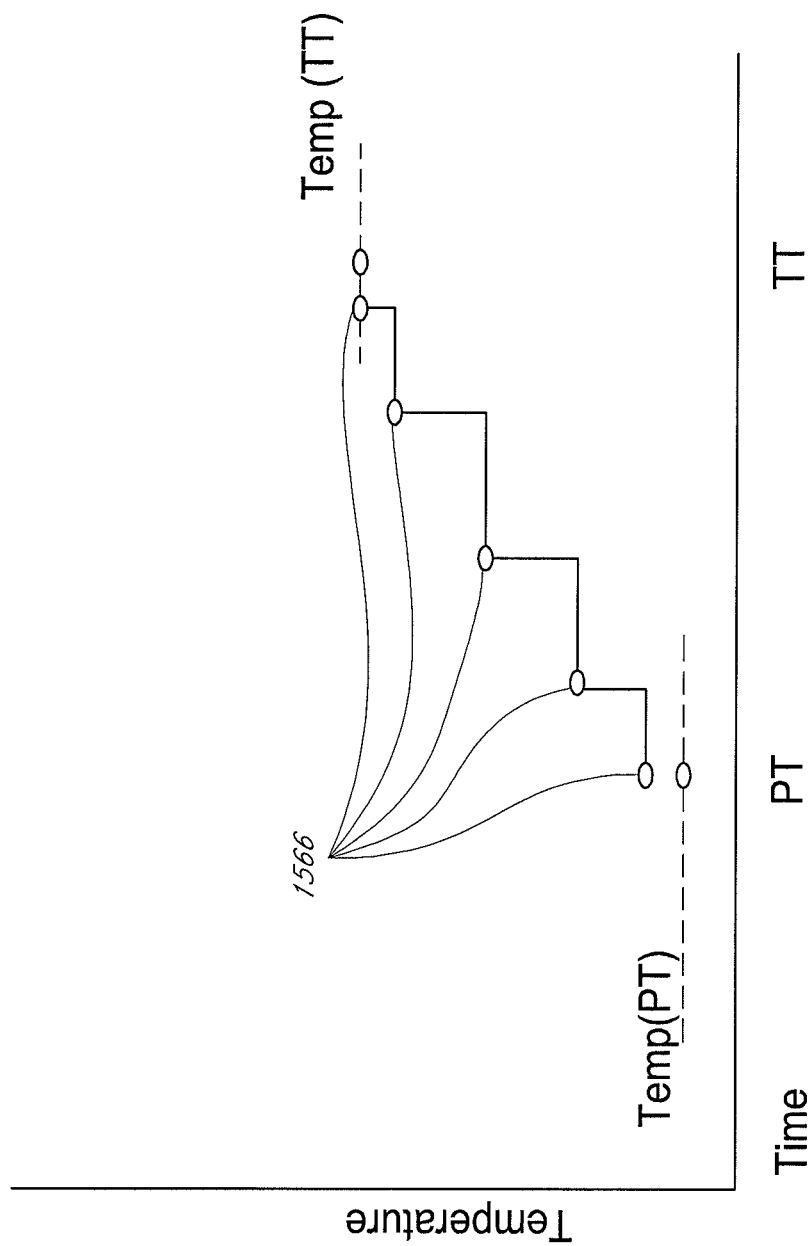

FIG. 13(d) shows step 1542, in which specific ramped setpoints 1566 are generated. Because of the assumed thermal mass of the system, actual inside temperature at any given time will not correspond to setpoints until some interval after each setpoint change. Thus initial ramped setpoint 1216 may be higher than Temp(PT) 1558, for example.

FIG. 14 shows an example of the types of data that may be used by the server in order to calculate $\Delta T$ 1560. Such data may include inside temperature 1572, outside temperature 1574, cloud cover 1576, humidity 1578, barometric pressure 1580, wind speed 1582, and wind direction 1584.

Each of these data points should be captured at frequent intervals. In the currently preferred embodiment, as shown in FIG. 14, the interval is once every 60 seconds.

Figure 15:
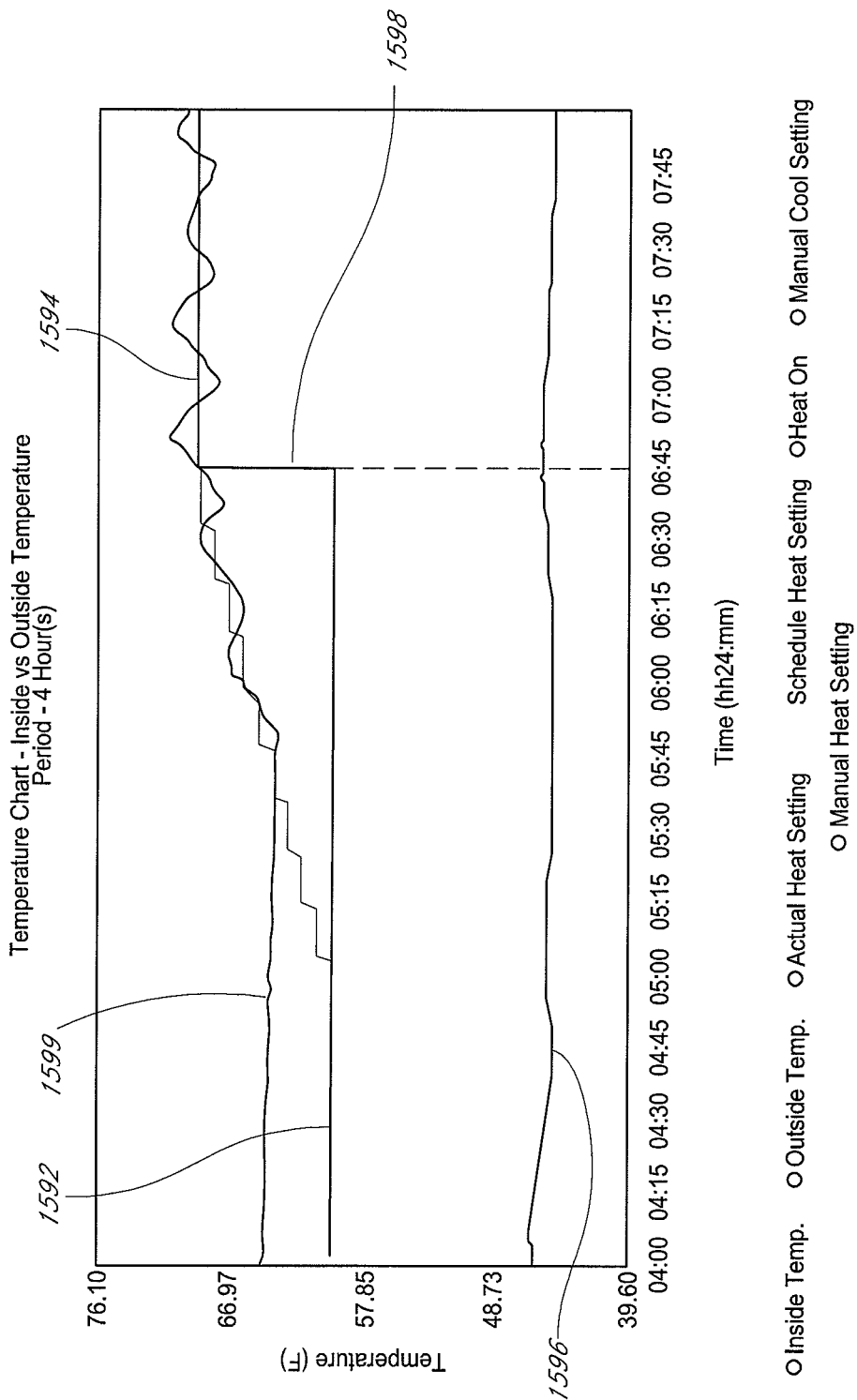
FIG. 15 shows an embodiment of the subject invention as applied in a specific conditioned space on a specific day.

FIG. 15 shows application of the subject invention in a conditioned space. Temperature and setpoints are plotted for the 4-hour period from 4 AM to 8 AM with temperature on the vertical axis and time on the horizontal axis. The winter nighttime setpoint 1592 is 60 degrees F.; the morning setpoint temperature 1594 is 69 degrees F. The outside temperature 1596 is approximately 45 degrees F. The target time TT 1598 for the setpoint change to morning setting is 6:45 AM. In the absence of the subject invention, the occupant could program the thermostat to change to the new setpoint at 6:45, but there is an inherent delay between a setpoint change and the response of the temperature inside the home. (In this space on this day, the delay is approximately fifty minutes.) Thus if the occupant truly desired to achieve the target temperature at the target time, some anticipation would be necessary. The amount of anticipation required depends upon numerous variables, including the capacity and state of tune of the HVAC system, the thermal properties of the building envelope, current and recent weather conditions, etc.

After calculating the appropriate slope ΔT 1560 by which to ramp inside temperature in order to reach the target as explained above, the server transmits a series of setpoints 1566 to the thermostat because the thermostat is presumed to only accept discrete integers as program settings. (If a thermostat is capable of accepting finer settings, as in the case of some thermostats designed to operate in regions in which temperature is generally denoted in Centigrade rather than Fahrenheit, which accept settings in half-degree increments, tighter control may be possible.) In any event, in the currently preferred embodiment of the subject invention, programming changes are quantized such that the frequency of setpoint changes is balanced between the goal of minimizing network traffic and the frequency of changes made on the one hand and the desire for accuracy on the other. Balancing these considerations may result in some cases in either more frequent changes or in larger steps between settings. As shown in FIG. 15, the setpoint "stairsteps" from 60 degrees F. to 69 degrees F. in nine separate setpoint changes over a period of 90 minutes.

Because the inside temperature 1599 when the setpoint management routine was instantiated at 5:04 AM was above the "slope" and thus above the setpoint, the HVAC system was not triggered and no energy was used unnecessarily heating the space before such energy use was required. Actual energy usage does not begin until 5:49 AM.

Figure 16:
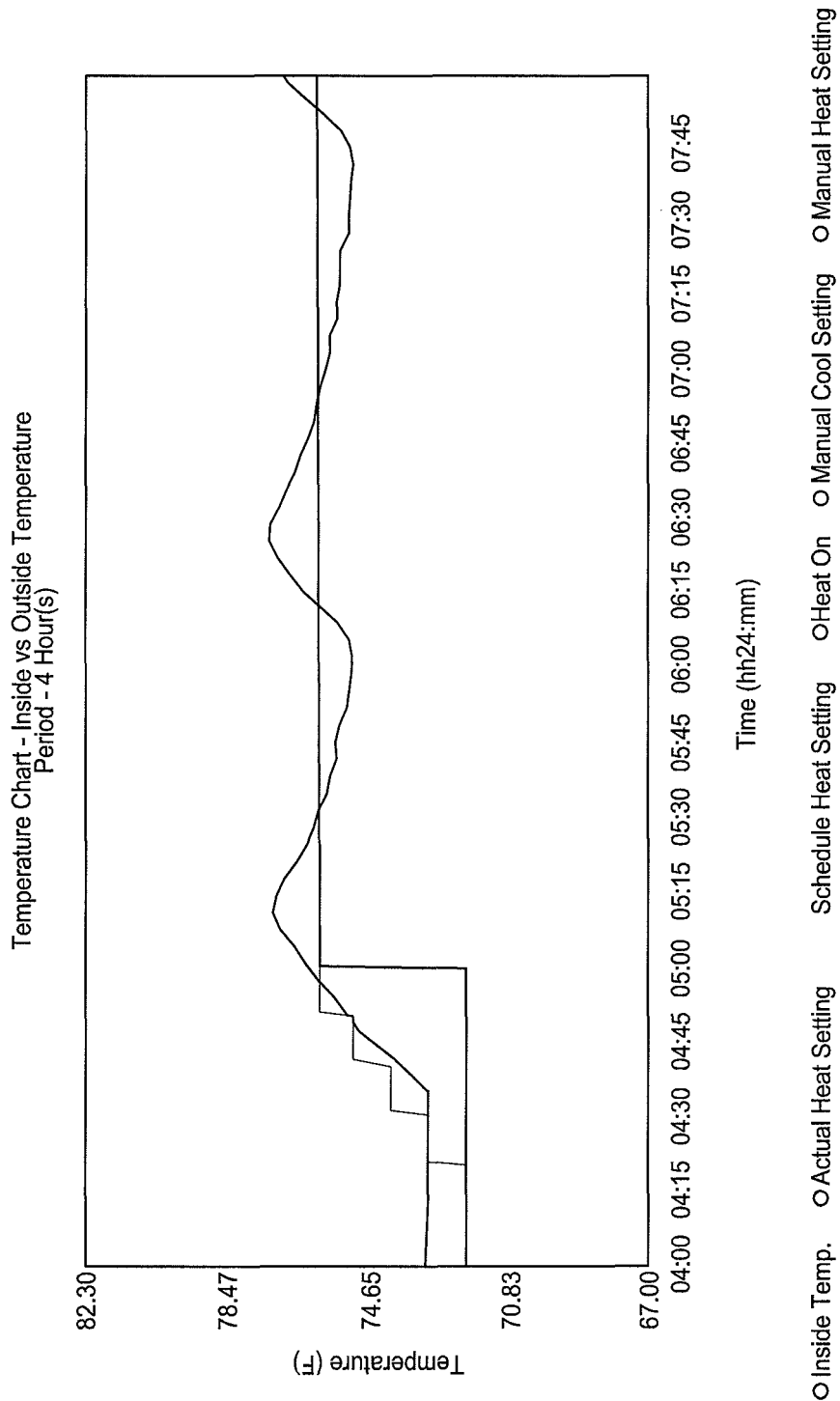
FIG. 16 shows an embodiment of the subject invention as applied in a different specific conditioned space on a specific day.

FIG. 16 shows application of the subject invention in a different conditioned space during a similar four-hour interval. In FIG. 16, the predicted slope ΔT 1560 is less conservative relative to the actual performance of the home and HVAC system, so there is no off cycling during the preconditioning event—the HVAC system turns on at approximately 4:35 AM and stays on continuously during the event. The conditioned space reaches the target temperature Temp (TT) roughly two minutes prior to target time TT.

FIGS. 17-1 and 17-2 shows a simple prediction table. The first column 1602 lists a series of differentials between outside and inside temperatures. Thus when the outside temperature is 14 degrees and the inside temperature is 68 degrees, the differential is −54 degrees; when the outside temperature is 94 degrees and the inside temperature is 71 degrees, the differential is 13 degrees. The second column 1604 lists the predicted rate of change in inside temperature ΔT 1210 assuming that the furnace is running in terms of degrees Fahrenheit of change per hour. A similar prediction table will be generated for predicted rates of change when the air conditioner is on; additional tables may be generated that predict how temperatures will change when the HVAC system is off.

Alternatively, the programming of the just-in-time setpoints may be based not on a single rate of change for the entire event, but on a more complex multivariate equation that takes into account the possibility that the rate of change may be different for events of different durations, as well as other variables such as wind speed, humidity, solar conditions (cloudy vs. clear), etc.

The method for calculating start times may also optionally take into account not only the predicted temperature at the calculated start time, but may incorporate measured inside temperature data from immediately prior to the scheduled start time in order to update calculations, or may employ more predictive means to extrapolate what the inside temperature is likely to be based upon outside temperatures, etc.

Significant energy savings are possible if HVAC control systems can reliably detect when a space is unoccupied. Explicit occupancy sensors are widely available, and can generally accomplish this, though this task is much easier in single-room spaces like hotel rooms than it is in multi-room spaces like larger homes. But the subject invention can accomplish some of the benefits of explicit occupancy detection by recognizing manual interaction with the physical thermostat—the buttons on the thermostat itself can only be pressed if someone is there to press them.

Some thermostats are capable of explicitly reporting manual overrides, but others are not. Where, as with the subject invention, an energy management service may make frequent changes to thermostat setpoints, disambiguating human interactions is of great importance.

Because the instant invention is capable of recording the setpoint actually used at a connected thermostat over time, it is also capable of inferring manual setpoint changes (as, for example, entered by pushing the "up" or "down" arrow on the control panel of the device) even when such overrides of the pre-set program are not specifically recorded as such by the thermostat.

In order to adapt programming to take into account the manual overrides entered into the thermostat, it is first necessary to determine when a manual override has in fact occurred. Most thermostats, including many two-way communicating devices, do not record such inputs locally, and neither recognize nor transmit the fact that a manual override has occurred. Furthermore, in a system as described herein, frequent changes in setpoints may be initiated by algorithms running on the server, thereby making it impossible to infer a manual override from the mere fact that the setpoint has changed. It is therefore necessary to deduce the occurrence of such events from the data that the subject invention does have access to.

Figure 18:
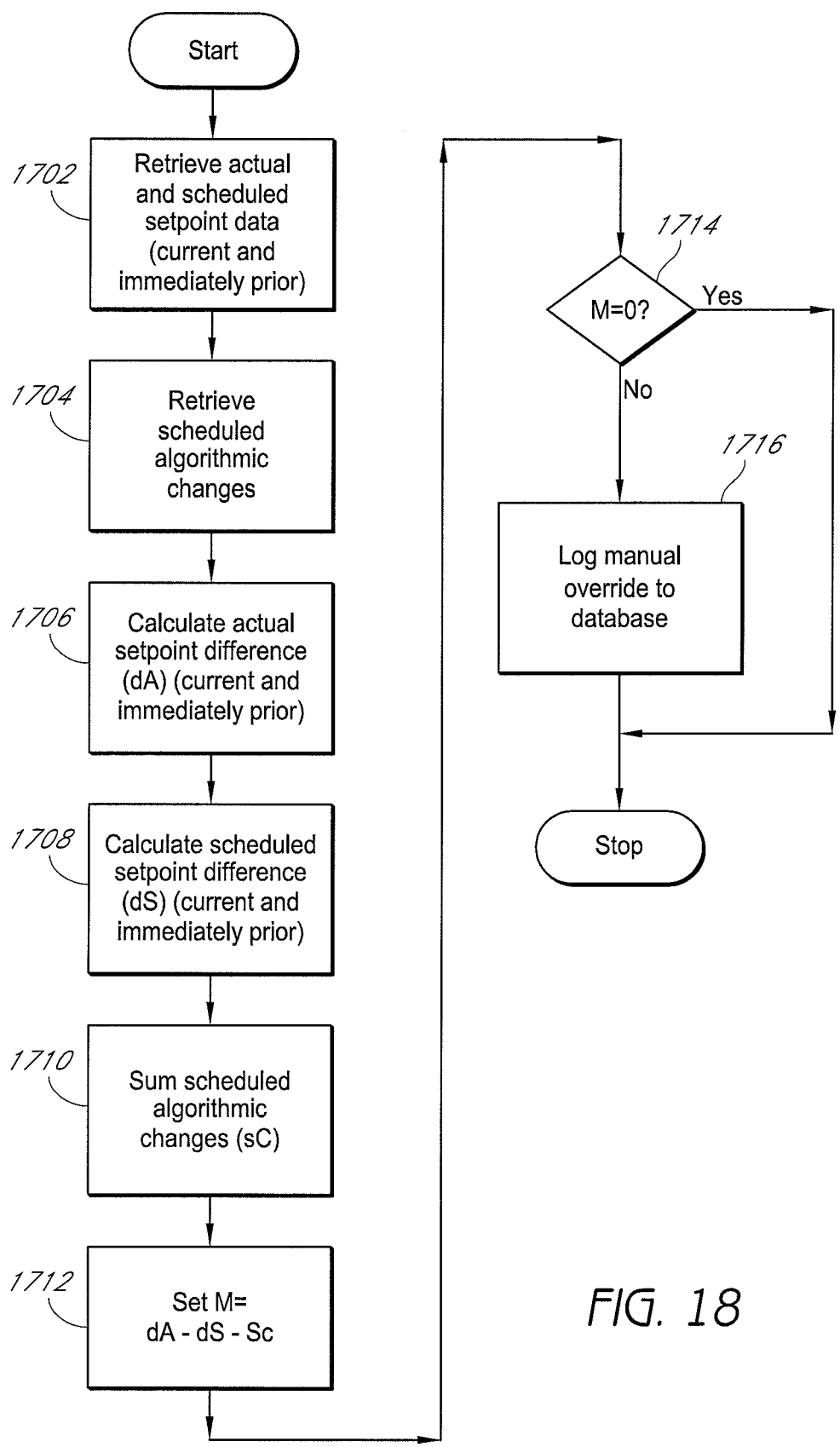
FIG. 18 shows how manual inputs can be recognized and recorded by an embodiment of the subject invention.

FIG. 18 illustrates the currently preferred method for detecting the occurrence of a manual override event. In step 1702, the server retrieves the primary data points used to infer the occurrence of a manual override from one or more databases in overall database structure 300. The data should include each of the following: for the most recent point at which it can obtain such data (time0) the actual setpoint as recorded at the thermostat at (A0); for the point immediately prior to time0 (time−1), the actual setpoint recorded for the thermostat (A−1); for time0 the setpoint as scheduled by server 106 according to the basic setpoint programming (S0), and for time−1 the setpoint as scheduled by server 106 according to the standard setpoint programming (S−1). In step 1704, the server retrieves any additional automated setpoint changes C that have been scheduled for the thermostat by server 106 at time0. Such changes may include algorithmic changes intended to reduce energy consumption, etc. In step 1706 the server calculates the difference (dA) between A0 and A−1; for example, if the actual setpoint is 67 degrees at T−1 and 69 at T0, dA is +2; if the setpoint at T−1 is 70 and the setpoint at T0 is 66, dA is −4. In step 1708, the server performs similar steps in order to calculate dS, the difference between S0 and S-1. This is necessary because, for example, the setpoint may have been changed because the server itself had just executed a change, such as a scheduled change from "away" (or unoccupied) to "home" (or occupied) mode. In step 1710 the server evaluates and sums all active algorithms and other server-initiated strategies to determine their net effect on setpoint at time0. For example, if one algorithm has increased setpoint at time0 by 2 degrees as a short-term energy savings measure, but another algorithm has decreased the setpoint by one degree to compensate for expected subjective reactions to weather conditions, the net algorithmic effect sC is +1 degree.

In step 1712, the server calculates the value for M, where M is equal to the difference between actual setpoints dA, less the difference between scheduled setpoints dS, less the aggregate of algorithmic change sC. In step 1714 the server evaluates this difference. If the difference equals zero, the server concludes that no manual override has occurred, and the routine terminates. But if the difference is any value other than zero, then the server concludes that a manual override has occurred. Thus in step 1716 the server logs the occurrence and magnitude of the override to one or more databases in overall database structure 300.

Figure 19:
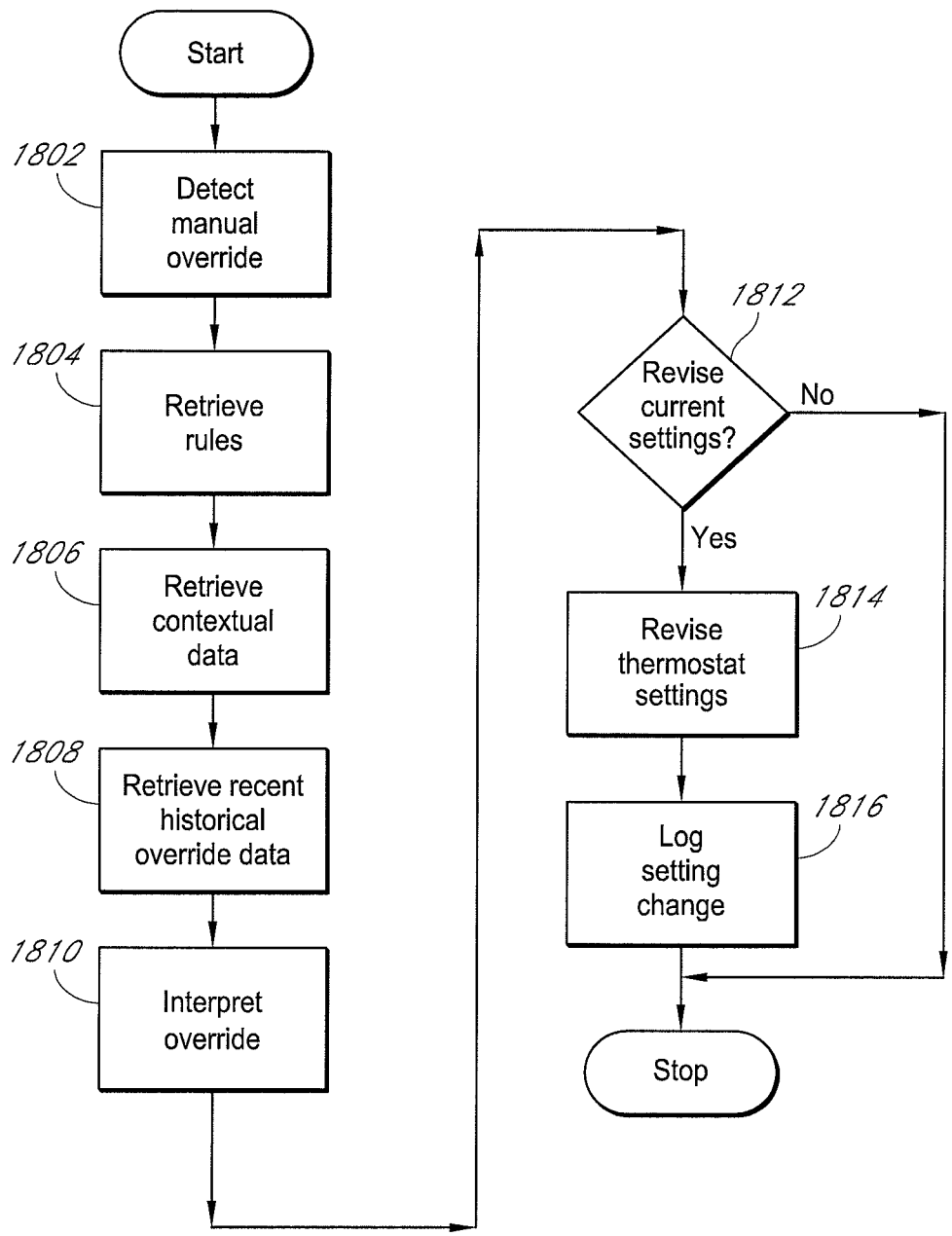
FIG. 19 shows how an embodiment of the subject invention uses manual inputs to interpret manual overrides and make short-term changes in response thereto.

The process of interpreting a manual override is shown in FIG. 19. Step 1802 is the detection of an override, as described in detail in FIG. 18. In step 1804 the server retrieves the stored rules for the subject thermostat 108. Such rules may include weather and time-related inferences such as "if outside temperature is greater than 85 degrees and inside temperature is more than 2 degrees above setpoint and manual override lowers setpoint by 3 or more degrees, then revert to original setpoint in 2 hours," or "if heating setpoint change is scheduled from 'away' to 'home' within 2 hours after detected override, and override increases setpoint by at least 2 degrees, then change to 'home' setting," or the like. In step 1806 the server retrieves contextual data required to interpret the manual override. Such data may include current and recent weather conditions, current and recent inside temperatures, etc. This data is helpful because it is likely that manual overrides are at least in part deterministic: that is, that they may often be explained by such contextual data, and such understanding can permit anticipation of the desire on the part of the occupants to override and to adjust programming accordingly, so as to obviate the need for such changes. The amount of data may be for a period of a few hours to as long as several days or more. Recent data may be more heavily weighted than older data in order to assure rapid adaptation to situations in which manual overrides represent stable changes such as changes in work schedules, etc.

In step 1808 the server retrieves any relevant override data from the period preceding the specific override being evaluated that has not yet been evaluated by and incorporated into the long-term programming and rules engines as described below in FIG. 19. In step 1810 the server evaluates the override and determines which rule, if any, should be applied as a result of the override. In step 1812 the server determines whether to alter the current setpoint as a result of applying the rules in step 1810. If no setpoint change is indicated, then the routine ends. If a setpoint change is indicated, then in step 1814 the server transmits the setpoint change to the thermostat for execution, and in step 1816 it records that change to one or more databases in overall database structure 300.

Figure 20:
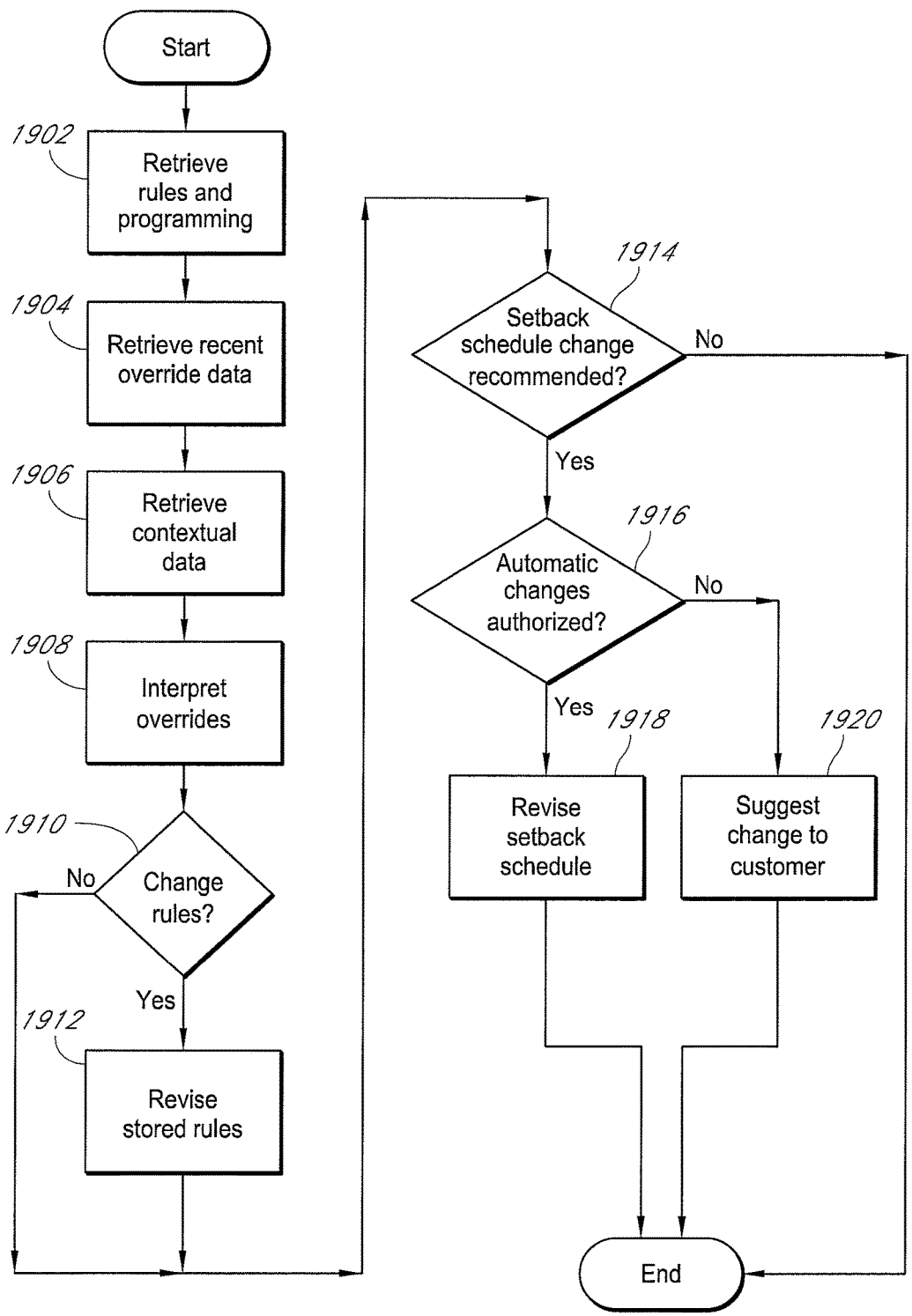
FIG. 20 shows how an embodiment of the subject invention uses manual inputs to make long-term changes to interpretive rules and to setpoint scheduling.

In order to ensure that both the stored rules for interpreting manual overrides and the programming itself continue to most accurately reflect the intentions of the occupants, the server will periodically review both the rules used to interpret overrides and the setpoint scheduling employed. FIG. 20 shows the steps used to incorporate manual overrides into the long-term rules and setpoint schedule. In step 1902 the server retrieves the stored programming for a given thermostat as well as the rules for interpreting overrides for that thermostat. In step 1904 the server retrieves the recent override data as determined using the process described in FIGS. 18 and 19 to be evaluated for possible revisions to the rules and the programming. In step 1906 the server retrieves the contextual data regarding overrides retrieved in step 1904 (Because the process illustrated in FIG. 20 is not presently expected to be executed as a real-time process, and is expected to be run anywhere from once per day to once per month, the range and volume of contextual data to be evaluated is likely to be greater than in the process illustrated in FIG. 19).

In step 1908 the server interprets the overrides in light of the existing programming schedule, rules for overrides, contextual data, etc. In step 1910 the server determines whether, as a result of those overrides as interpreted, the rules for interpreting manual overrides should be revised. If the rules are not to be revised, the server moves to step 1914. If the rules are to be revised, then in step 1912 the server revises the rules and the new rules are stored in one or more databases in overall database structure 300. In step 1914 the server determines whether any changes to the baseline programming for the thermostat should be revised. If not, the routine terminates. If revisions are warranted, then in step 1916 the server retrieves from database 900 the permissions the server has to make autonomous changes to settings. If the server has been given permission to make the proposed changes, then in step 1918 the server revises the thermostat's programming and writes the changes to one or more databases in overall database structure 300. If the server has not been authorized to make such changes autonomously, then in step 1920 the server transmits the recommendation to change settings to the customer in the manner previously specified by the customer, such as email, changes to the customer's home page as displayed on website 200, etc.

Additional means of implementing the instant invention may be achieved using variations in system architecture. For example, much or even all of the work being accomplished by remote server 106 may also be done by thermostat 108 if that device has sufficient processing capabilities, memory, etc. Alternatively, these steps may be undertaken by a local processor such as a local personal computer, or by a dedicated appliance having the requisite capabilities, such as gateway 112.

Demand for electricity varies widely from winter to summer, and from early morning to late afternoon. Air conditioning is a major component of peak load. The traditional approach to dealing with high demand on hot days is to build increase supply—build new power plants, or buy additional capacity on the spot market. But because many people now consider reducing loads to be a superior strategy for matching electricity supply to demand when the grid is stressed, the ability to shed load by turning off air conditioners during peak events has become a useful tool for managing loads. A key component of any such system is the ability to document and verify that a given air conditioner has actually turned off. Data logging hardware can accomplish this, but due to the cost is usually only deployed for statistical sampling. The instant invention provides a means to verify demand response without additional hardware such as a data logger.

Thermostats 108 record temperature readings at frequent intervals, such as once per minute. Because server 106 logs the temperature readings from inside each conditioned space (whether once per minute or over some other interval), as well as the timing and duration of air conditioning cycles, database 300 will contain a history of the thermal performance of each conditioned space. That performance data will allow the server 106 to calculate an effective thermal mass for each such space—that is, the speed with the temperature inside a given space is expected to change in response to changes in outside temperature. Because the server will also log these inputs against other inputs including time of day, humidity, etc. the server will be able to predict, at any given time on any given day, the rate at which inside temperature should change for given inside and outside temperatures. This will permit remote verification of load shedding by the air conditioner without directly measuring or recording the electrical load drawn by the air conditioner, and without requiring reliance on bare HVAC cycling data, which is susceptible to manipulation.

Figure 21:
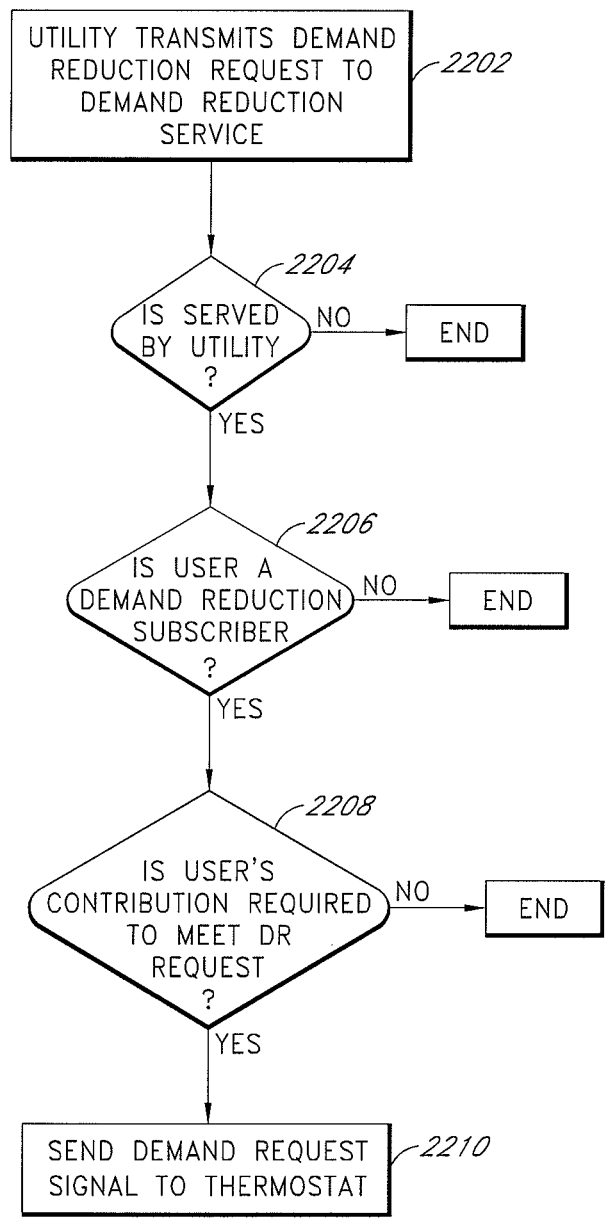
FIG. 21 is a flow chart illustrating the steps involved in generating a demand reduction event for a given subscriber.

FIG. 21 shows the steps followed in order to initiate air conditioner shutoff. When a summer peak demand situation occurs, the utility will transmit an email or other signal 2202 to server 106 requesting a reduction in load. Server 106 will determine 2204 if a given conditioned space is served by the utility seeking reduction; determine 2206 if a given user has agreed to reduce peak demand; and determine 2208 if a reduction of consumption by the user is required or desirable in order to achieve the reduction in demand requested by the utility or demand response aggregator. The server will transmit 2210 a signal to the user's thermostat 108 signaling the thermostat to shut off the air conditioner 110.

Figure 22:
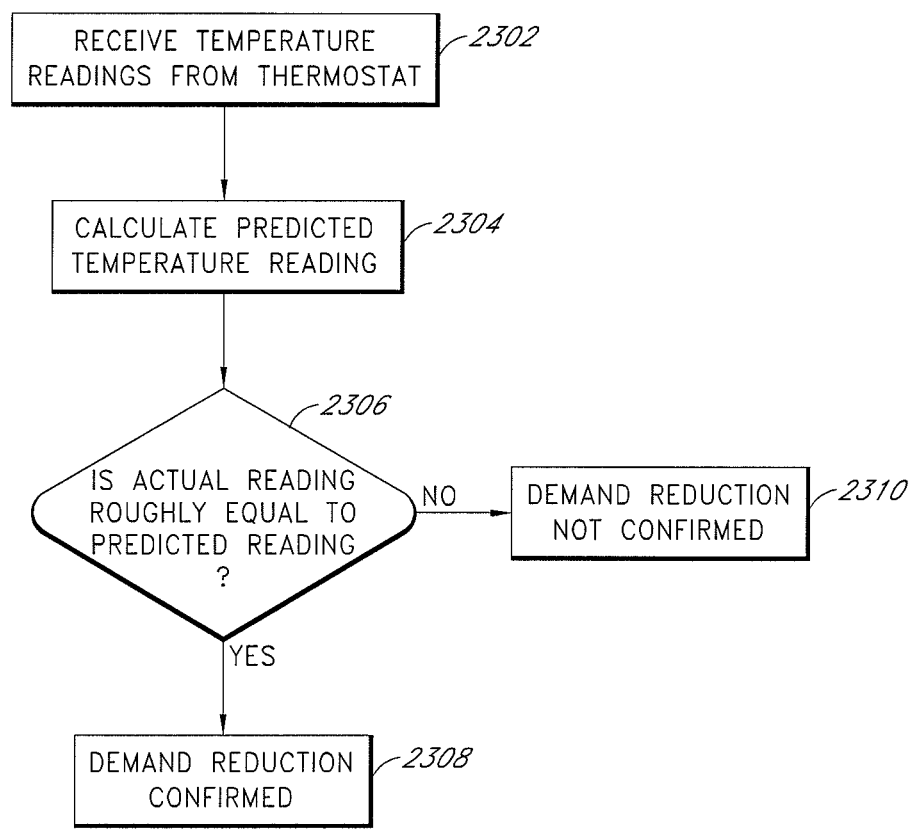
FIG. 22 is a flow chart illustrating the steps involved in confirming that a demand reduction event has taken place.

FIG. 22 shows the steps followed in order to verify that a specific air conditioner has in fact been shut off. Server 106 will receive and monitor 2302 the temperature readings sent by the user's thermostat 108. The server then calculates 2304 the temperature reading to be expected for that thermostat given inputs such as current and recent outside temperature, recent inside temperature readings, the calculated thermal mass of the structure, temperature readings in other conditioned spaces such as other units within the same building, etc. The server will compare 2306 the predicted reading with the actual reading. If the server determines that the temperature inside the conditioned space is rising at roughly the rate predicted if the air conditioning is shut off, then the server confirms 2308 that the air conditioning has been shut off. If the temperature reading from the thermostat shows no increase, or significantly less increase than predicted by the model, then the server concludes 2310 that the air conditioning was not switched off, and that no contribution to the demand response request was made.

For example, assume that on at 3 PM on date Y utility X wishes to trigger a demand reduction event. A server at utility X transmits a message to the server at demand reduction service provider Z requesting W megawatts of demand reduction. The demand reduction service provider server determines that it will turn off the air conditioner for conditioned space A in order to contribute to the required demand reduction. At the time the event is triggered, the inside temperature as reported by the thermostat in conditioned space A is 72 degrees F. The outside temperature near conditioned space A is 96 degrees Fahrenheit. The inside temperature at conditioned space B, which is not part of the demand reduction program, but is both connected to the demand reduction service server and located geographically proximate to conditioned space A, is 74F. Because the air conditioner in conditioned space A has been turned off, the temperature inside conditioned space A begins to rise, so that at 4 PM it has increased to 79F. Because the server is aware of the outside temperature, which remains at 96F, and of the rate of temperature rise inside conditioned space A on previous days on which temperatures have been at or near 96F, and the temperature in conditioned space B, which has risen only to 75F because the air conditioning in conditioned space B continues to operate normally, the server is able to confirm with a high degree of certainty that the air conditioner in conditioned space A has indeed been shut off.

In contrast, if the HVAC system for conditioned space A has been tampered with, so that a demand reduction signal from the server does not actually result in shutting off the air conditioner for conditioned space A, when the server compares the rate of temperature change in conditioned space A against the other data points, the server will receive data inconsistent with the rate of increase predicted. As a result, it will conclude that the air conditioner has not been shut off in conditioned space A as expected, and may not credit conditioned space A with the financial credit that would be associated with demand reduction compliance, or may trigger a business process that could result in termination of conditioned space A's participation in the demand reduction program.

Figure 23:
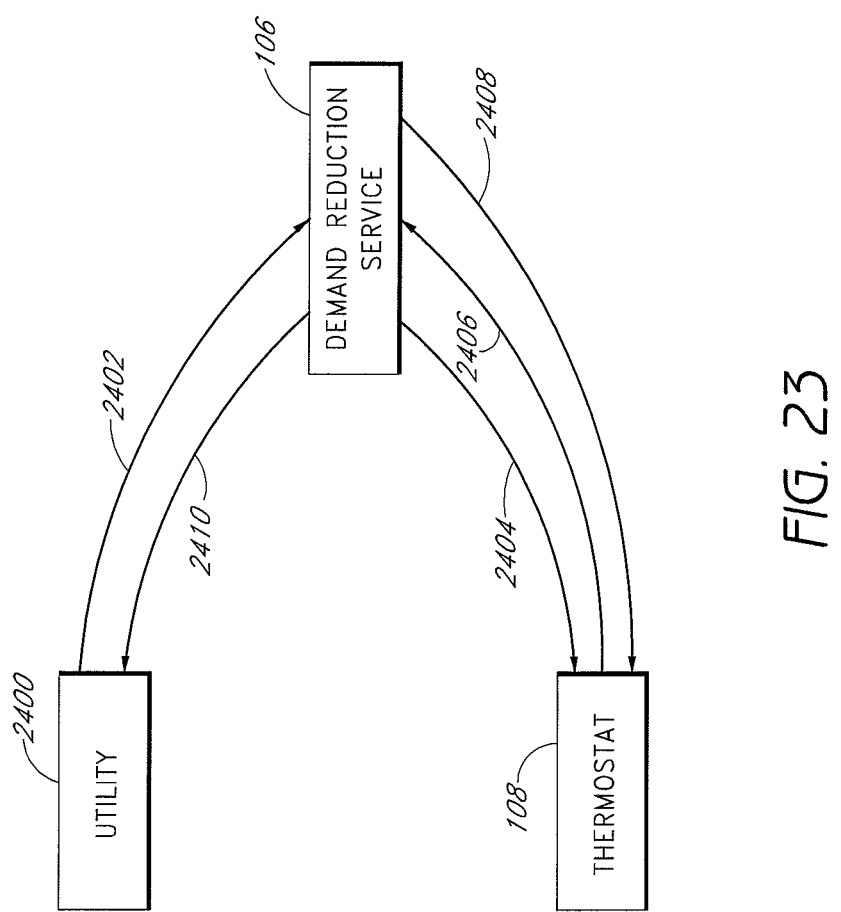
FIG. 23 is a representation of the movement of messages and information between the components of an embodiment of the subject invention.

FIG. 23 illustrates the movement of signals and information between the components of one embodiment of the subject invention to trigger and verify a demand reduction response. Where demand response events are undertaken on behalf of a utility by a third party, participants in the communications may include electric utility server 2400, demand reduction service server 106, and thermostat 108. In step 2402 the electric utility server 2400 transmits a message to demand reduction service server 106 requesting a demand reduction of a specified duration and size. Demand reduction service server 106 uses database 300 to determine which subscribers should be included in the demand reduction event. For each included subscriber, the server then sends a signal 2404 to the subscriber's thermostat 108 instructing it (a) to shut down at the appropriate time or (b) to allow the temperature as measured by the thermostat to increase to a certain temperature at the specified time, depending upon the agreement between the owner (or tenant, or facilities manager as the case may be) and the demand reduction service provider. The server then receives 2406 temperature measurements from the subscriber's thermostat. At the conclusion of the demand reduction event, the server transmits a signal 2408 to the thermostat permitting the thermostat to signal its attached HVAC system to resume cooling, if the system has been shut off, or to reduce the target temperature to its non-demand reduction setting, if the target temperature was merely increased. If thermostat 108 is capable of storing scheduling information, these instructions may be transmitted prior to the time they are to be executed and stored locally. After determining the total number of subscribers actually participating in the DR event, the server then calculates the total demand reduction achieved and sends a message 2410 to the electric utility confirming such reduction.

Additional steps may be included in the process. For example, if the subscriber has previously requested that notice be provided when a peak demand reduction event occurs, the server may also send an alert, which may be in the form of an email or text message or an update to the personalized web page for that user, or both. If the server determines that a given conditioned space has (or has not) complied with the terms of its demand reduction agreement, the server may send a message to the subscriber confirming that fact.

It should also be noted that in some climate zones, peak demand events occur during extreme cold weather rather than (or in addition to) during hot weather. The same process as discussed above could be employed to reduce demand by shutting off electric heaters and monitoring the rate at which temperatures fall.

It should also be noted that the peak demand reduction service can be performed directly by an electric utility, so that the functions of server 106 can be combined with the functions of server 2400.

It should also be noted that additional variations are possible in a situation in which a building has multiple separately occupancy units owned or managed by a single entity. Additional variations are possible where a central chiller is combined with multiple air handlers in individual occupancy units, such as apartments or separate retail or office spaces. For example, a landlord may enter into an overall demand response contract that calls for delivery of several megawatts or more of load shedding, and achieve that goal by managing the thermostats in individual units. The landlord may incentivize tenants to agree to participate by sharing some of the benefit of the demand response payments with tenants that cooperate, and allocating payment (or credit against payments owed by the tenant to the landlord) based on the degree to which the load was actually reduced in that unit. The processes described in FIGS. 7a through 7g may easily be adapted to accomplish this.

The system installed in a subscriber's home may optionally include additional temperature sensors at different locations within the building. These additional sensors may be connected to the rest of the system via a wireless system such as 802.11 or 802.15.4, or may be connected via wires. Additional temperature and/or humidity sensors may allow increased accuracy of the system, which can in turn increase user comfort, energy savings or both.

The bi-directional communication between server 106 and thermostat 108 will also allow thermostat 108 to regularly measure and send to server 106 information about the temperature in the conditioned space. By comparing outside temperature, inside temperature, thermostat settings, cycling behavior of the HVAC system, and other variables, the system will be capable of numerous diagnostic and controlling functions beyond those of a standard thermostat.

Figure 24A:
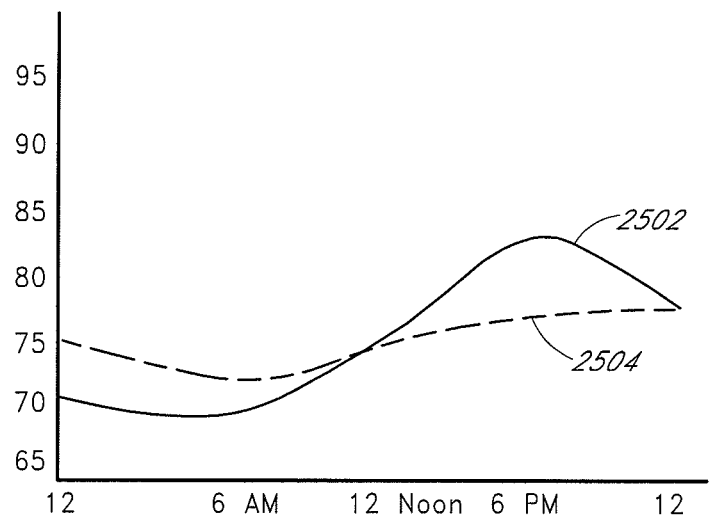
FIGS. 24a and 24b show graphical representations of inside and outside temperatures in two different conditioned spaces, one with high thermal mass and one with low thermal mass.

For example, FIG. 24a shows a graph of inside temperature and outside temperature for a 24-hour period in conditioned space A, assuming no HVAC activity. Conditioned space A has double-glazed windows and is well insulated. When outside temperature 2502 increases, inside temperature 2504 follows, but with significant delay because of the thermal mass of the building.

Figure 24B:
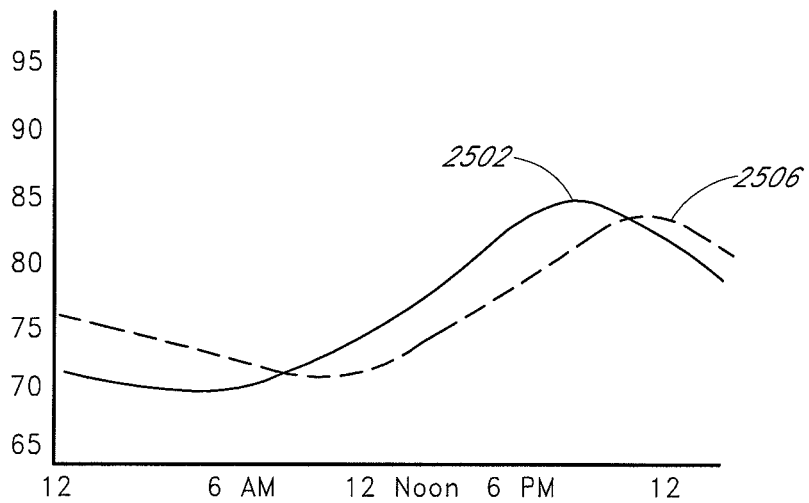

FIG. 24b shows a graph of inside temperature and outside temperature for the same 24-hour period in conditioned space B. Conditioned space B is identical to conditioned space A except that it (i) is located a block away and (ii) has single-glazed windows and is poorly insulated. Because the two spaces are so close to each other, outside temperature 2502 is the same in FIG. 24a and FIG. 24b. But the lower thermal mass of conditioned space B means that the rate at which the inside temperature 2506 changes in response to the changes in outside temperature is much greater.

Figure 25A:
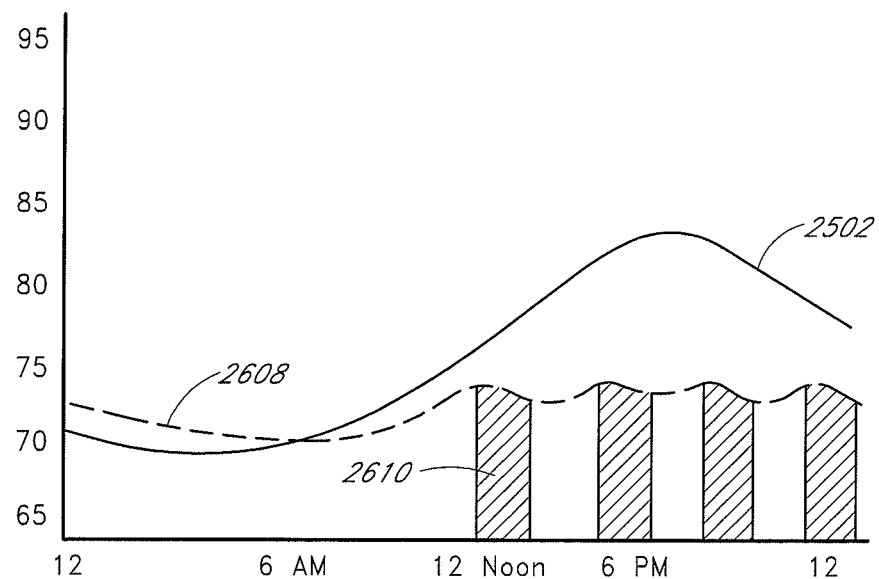
FIGS. 25a and 25b show graphical representations of inside and outside temperatures in the same conditioned spaces as in FIGS. 24a and 24b, showing the cycling of the air conditioning systems in those conditioned spaces.

The differences in thermal mass will affect the cycling behavior of the HVAC systems in the two conditioned spaces as well. FIG. 25a shows a graph of inside temperature and outside temperature in conditioned space A for the same 24-hour period as shown in FIG. 24a, but assuming that the air conditioning is being used to try to maintain an internal temperature of 70 degrees. Outside temperatures 2502 are the same as in FIGS. 24a and 24b. Inside temperature 2608 is maintained within the range determined by thermostat 108 by the cycling of the air conditioner. Because of the high thermal mass of the conditioned space, the air conditioning does not need to run for very long to maintain the target temperature, as shown by shaded areas 2610.

Figure 25B:
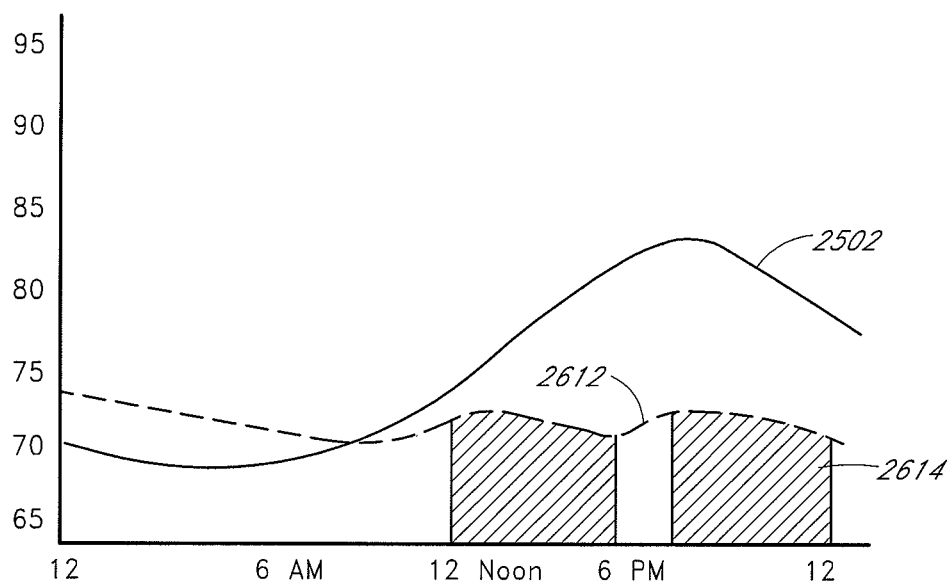

FIG. 25b shows a graph of inside temperature 2612 and outside temperature 2502 for the same 24-hour period in conditioned space B, assuming use of the air conditioning as in FIG. 25a. Because of the lower thermal mass of conditioned space B, the air conditioning system in conditioned space B has to run longer in order to maintain the same target temperature range, as shown by shaded areas 2614.

Because server 106 logs the temperature readings from inside each conditioned space (whether once per minute or over some other interval), as well as the timing and duration of air conditioning cycles, database 300 will contain a history of the thermal performance of each system and each conditioned space. That performance data will allow the server 106 to calculate an effective thermal mass for each such structure—that is, the speed with the temperature inside a given conditioned space will change in response to changes in outside temperature and differences between inside and outside temperatures. Because the server 106 will also log these inputs against other inputs including time of day, humidity, etc. the server will be able to predict, at any given time on any given day, the rate at which inside temperature should change for given inside and outside temperatures.

Figure 26A:
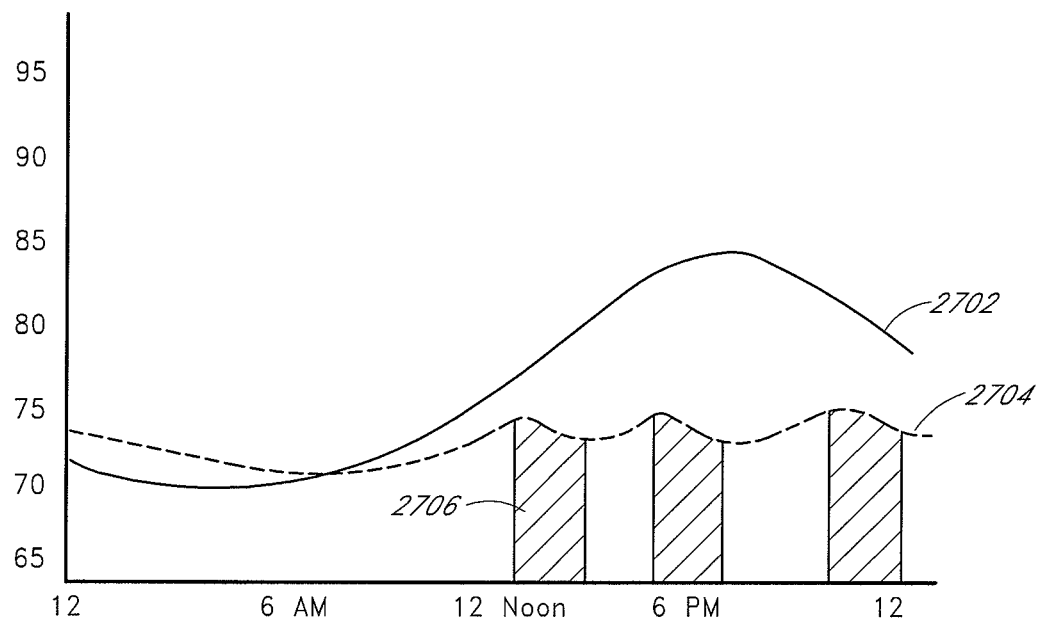
FIGS. 26a and 26b show graphical representations of inside and outside temperatures in the same conditioned space as in FIGS. 24a and 25a, showing the cycling of the air conditioning on two different days in order to demonstrate the effect of a change in operating efficiency on the parameters measured by the thermostat.
Figure 26B:
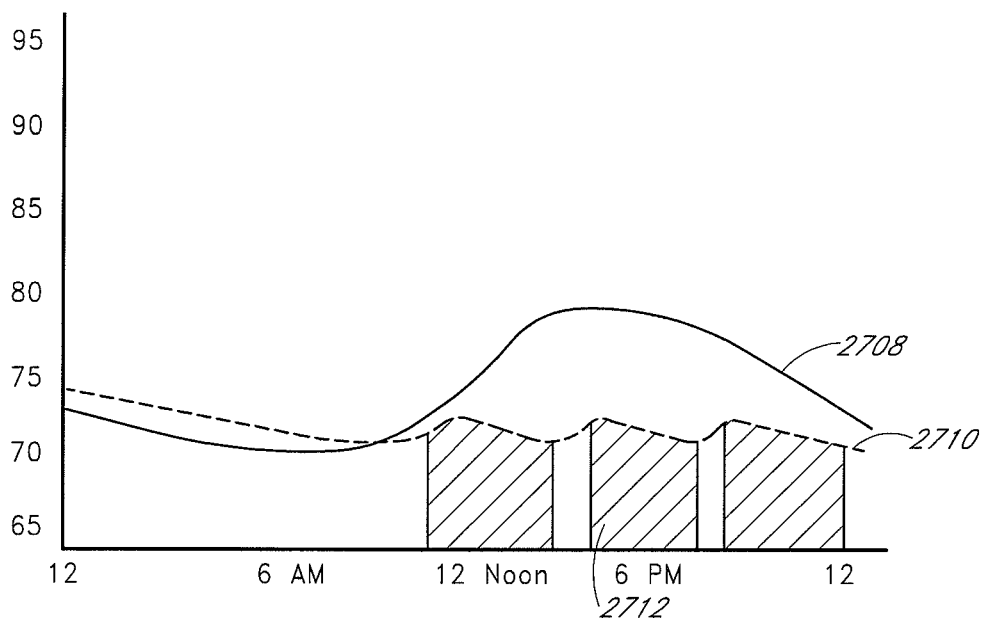

The server will also record the responses of each occupancy unit to changes in outside conditions and cycling behavior over time. That will allow the server to diagnose problems as and when they develop. For example, FIG. 26a shows a graph of outside temperature 2702, inside temperature 2704 and HVAC cycle times 2706 in conditioned space A for a specific 24-hour period on date X. Assume that, based upon comparison of the performance of conditioned space A on date X relative to conditioned space A's historical performance, and in comparison to the performance of conditioned space A relative to other nearby conditioned spaces on date X, the HVAC system in conditioned space A is presumed to be operating at normal efficiency, and that conditioned space A is in the 86$^{th}$ percentile as compared to those other conditioned spaces. FIG. 26b shows a graph of outside temperature 2708, inside temperature 2710 and HVAC cycle times 2712 in conditioned space A for the 24-hour period on date X+1. Conditioned space A's HVAC system now requires significantly longer cycle times in order to try to maintain the same internal temperature. If those longer cycle times were due to higher outside temperatures, those cycle times probably would not indicate the existence of any problems. But because server 106 is aware of the outside temperature, the system can eliminate that possibility as an explanation for the higher cycle times. Because server 106 is aware of the cycle times in nearby conditioned spaces, it can determine that, for example, on date X+1 the efficiency of conditioned space A is only in the 23$^{rd}$ percentile. The server may be programmed with a series of heuristics, gathered from predictive models and past experience, correlating the drop in efficiency and the time interval over which it has occurred with different possible causes. For example, a 50% drop in efficiency in one day may be correlated with a refrigerant leak, especially if followed by a further drop in efficiency on the following day. A reduction of 10% over three months may be correlated with a clogged filter. Based upon the historical data recorded by the server, the server 106 will be able to alert the appropriate responsible person that there is a problem and suggest a possible cause.

Figure 27A:
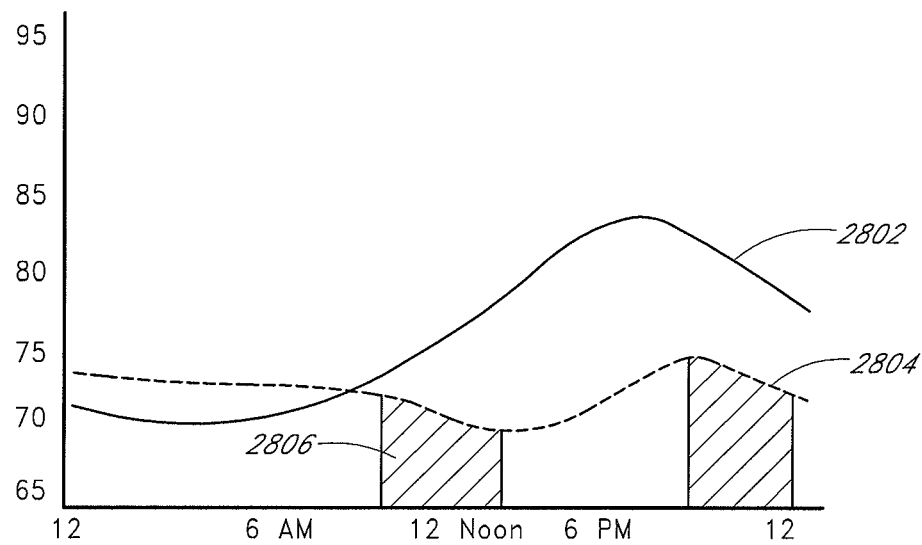
FIGS. 27a and 27b show the effects of employing a pre-cooling strategy in two different conditioned spaces.
Figure 27B:
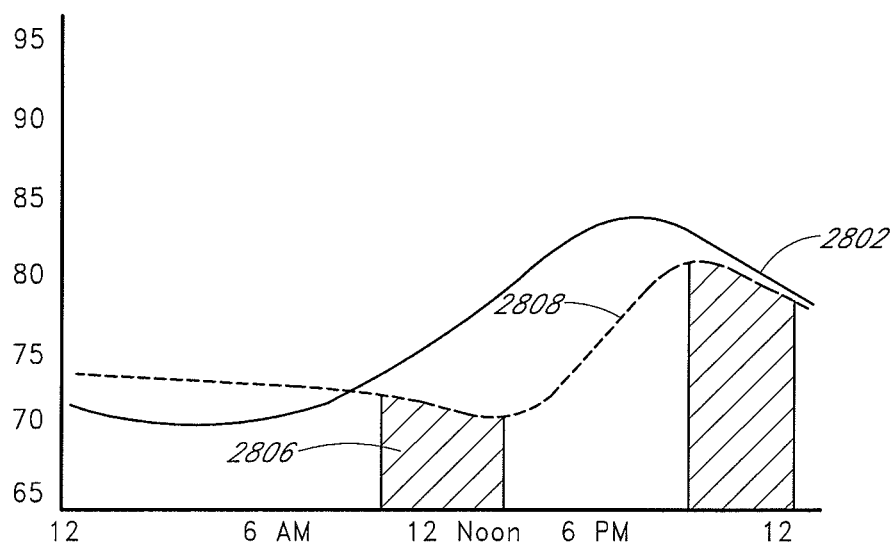

Because the system will be able to calculate effective thermal mass relative to each HVAC system or air handler, it will be able to determine the cost effectiveness of strategies such as pre-cooling for specific conditioned spaces under different conditions. FIG. 27a shows a graph of outside temperature 2802, inside temperature 2804 and HVAC cycling times 2806 in conditioned space A for a specific 24-hour period on date Y assuming that the system has used a pre-cooling strategy to avoid running the air conditioning during the afternoon, when rates are highest. Because conditioned space A has high thermal mass, the space is capable of "banking" cooling, and energy consumed during off-peak hours is in effect stored, allowing the conditioned space to remain cool even when the system is turned off. Temperatures keep rising during the period the air conditioning is off, but because thermal mass is high, the rate of increase is low, and the conditioned space is still comfortable several hours later. Although the pre-cooling cycle time is relatively long, the effective ratepayer may still benefit if electricity prices vary at different times of the day, and if the price per kilowatt during the morning pre-cooling phase is lower than the price during the peak load period, or if other incentives are provided. FIG. 27b shows a graph of the same outside temperature 2802 in conditioned space B as in conditioned space A in FIG. 27a for the same 24-hour period and using the same pre-cooling strategy as shown by cycling times 2806. But because conditioned space B has significantly less thermal mass, using additional energy in order to pre-cool the space does not have the desired effect; inside temperature 2808 warms up so fast that the cooling that had been banked is quickly lost. Thus the system will recommend that conditioned space A pre-cool in order to save money, but not recommend pre-cooling for conditioned space B.

Figure 28A:
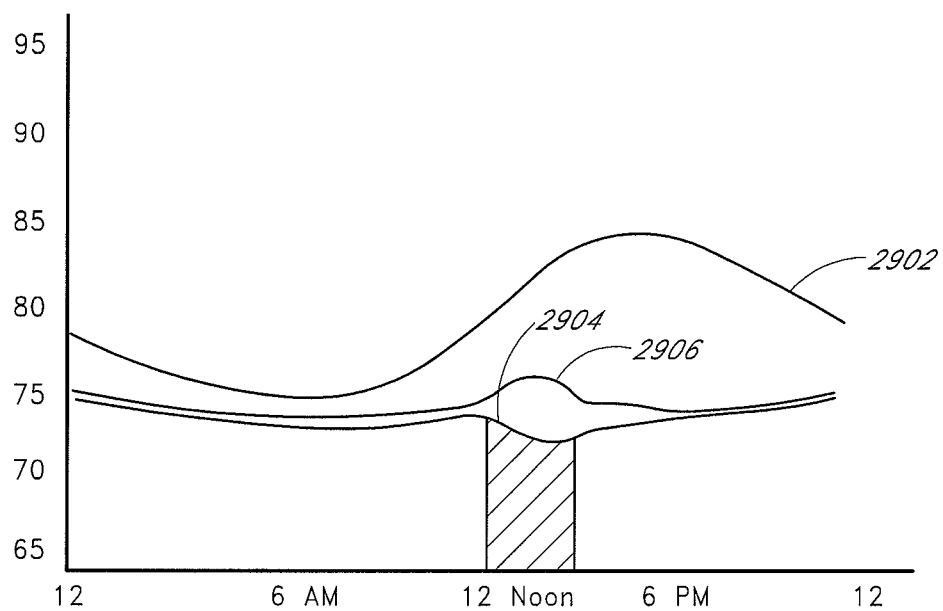
FIGS. 28a and 28b show graphical representations of inside and outside temperatures in two different conditioned spaces in order to demonstrate how the system can correct for erroneous readings in one conditioned space by referencing readings in another.
Figure 28B:
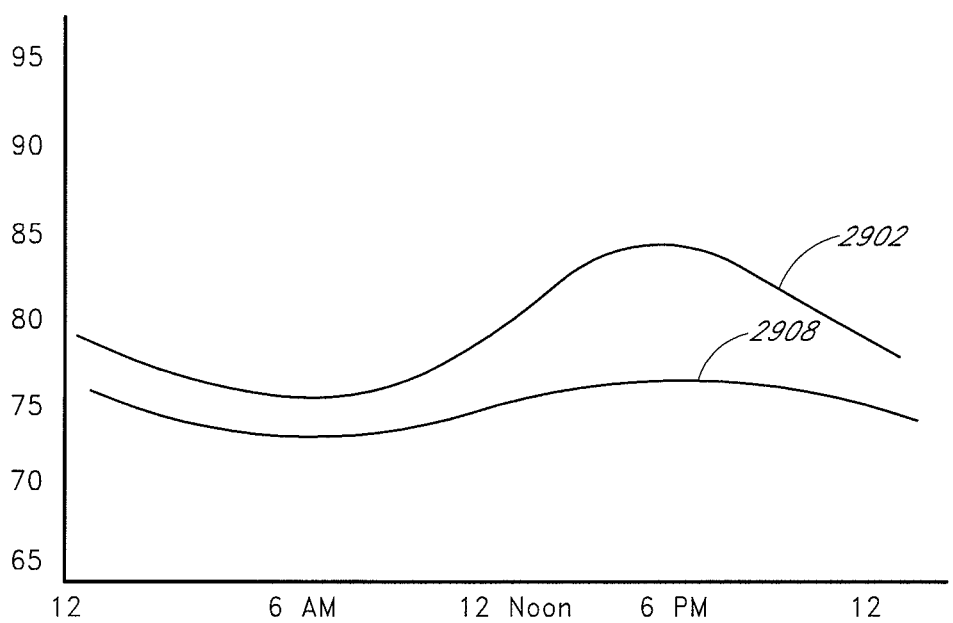

The subject invention can also help compensate for anomalies such as measurement inaccuracies due to factors such as poor thermostat location. It is well known that thermostats should be placed in a location that will be likely to experience "average" temperatures for the overall conditioned space, and should be isolated from windows and other influences that could bias the temperatures they "see." But for various reasons, not all thermostat installations fit that ideal. FIG. 28a shows a graph of outside temperature 2902, the actual average inside temperature for the entire conditioned space 2904, and inside temperature as read by the thermostat 2906 in conditioned space C for a specific 24-hour period on September $15^{th}$, assuming that the thermostat is located so that for part of the afternoon on that day the thermostat is in direct sunlight. Until the point at which the sun hits the thermostat, the average inside temperature and temperature as read by the thermostat track very closely. But when the direct sunlight hits the thermostat, the thermostat and the surrounding area can heat up, causing the internal temperature as read by the thermostat to diverge significantly from the average temperature for the rest of the conditioned space. A conventional thermostat has no way of distinguishing this circumstance from a genuinely hot day, and will both over-cool the rest of the conditioned space and waste considerable energy when it cycles the air conditioner in order to reduce the temperature as sensed by the thermostat. If the air conditioning remains off, this phenomenon will manifest as a spike in temperature as measured by the thermostat. If the air conditioning turns on (and has sufficient capacity to respond to the distorted temperature signal caused by the sunlight), this phenomenon will likely manifest as relatively small changes in the temperature as sensed by the thermostat, but significantly increased HVAC usage (as well as excessively lowered temperatures in the rest of the conditioned space, but this result may not be directly measured in a single-sensor environment). The subject system, in contrast, has multiple mechanisms that will allow it to correct for such distortions. First, because the subject system compares the internal readings from conditioned space C with the external temperature, it will be obvious that the rise in sensed temperature at 4:00 PM is not correlated with a corresponding change in outside temperature. Second, because the system is also monitoring the readings from the thermostat in nearby conditioned space D, which (as shown in FIG. 28b) is exposed to the same outside temperature 602, but has no sudden rise in measured internal afternoon temperature 2908, the system has further validation that the temperature increase is not caused by climatic conditions. And finally, because the system has monitored and recorded the temperature readings from the thermostat in conditioned space C for each previous day, and has compared the changing times of the aberration with the progression of the sun, the system can distinguish the patterns likely to indicate solar overheating from other potential causes.

Another application for the subject invention is to determine the thermal characteristics of individual units within a larger building, and use that information to detect and recognize defects, and faults in the HVAC systems and building envelopes.

Figure 29:
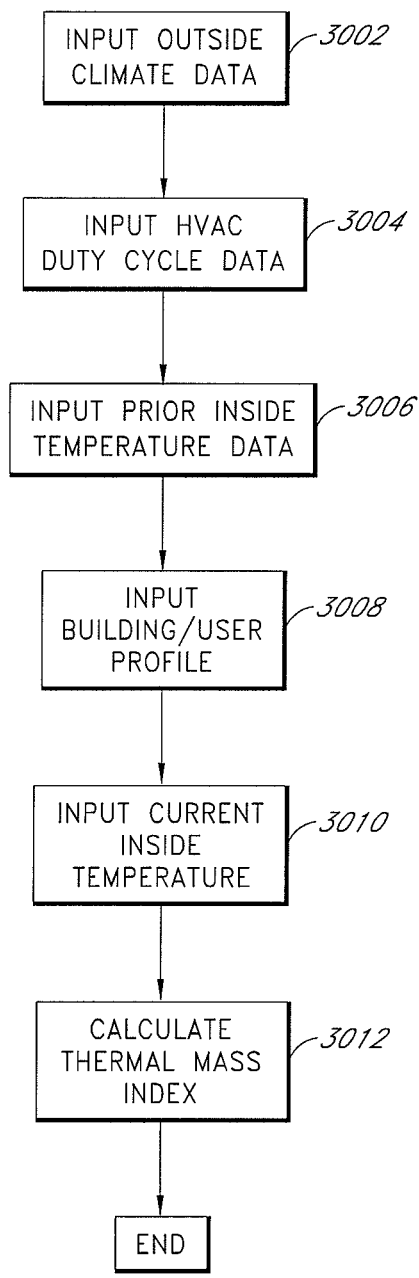
FIG. 29 is a flowchart illustrating the steps involved in calculating the effective thermal mass of a conditioned space using an embodiment of the subject invention.

FIG. 29 illustrates the steps involved in calculating comparative thermal mass, or the thermal mass index for a specific conditioned space within a larger structure. In step 3002, the server retrieves climate data related to conditioned space X. Such data may include current outside temperature, outside temperature during the preceding hours, outside humidity, wind direction and speed, whether the sun is obscured by clouds, and other factors. In step 3004, the server retrieves HVAC duty cycle data for conditioned space X. Such data may include target settings for the thermostat in current and previous periods, the timing of switch-on and switch-off events and other data. In step 3006, the server retrieves data regarding recent temperature readings as recorded by the thermostat in conditioned space X. In step 3008, the server retrieves profile data for conditioned space X. Such data may include square footage, when the conditioned space was built and/or renovated, the extent to which it is insulated, its location within the larger structure, the make, model and age of the associated HVAC hardware specific that unit, and other data. In step 3010, the server retrieves the current inside temperature reading as transmitted by the thermostat. In step 3012, the server calculates the thermal mass index for the conditioned space under the relevant conditions; that is, for example, it may calculate the likely rate of change for internal temperature in conditioned space X from a starting point of 70 degrees when the outside temperature is 85 degrees at 3:00 PM on August $10^{th}$ when the wind is blowing at 5 mph from the north and the sky is cloudy. The server may accomplish this by applying a basic algorithm that weighs each of these external variables as well as variables for various characteristics of the conditioned space itself (such as size, level of insulation, method of construction, etc.) and data from other conditioned spaces and environments.

Figure 30:
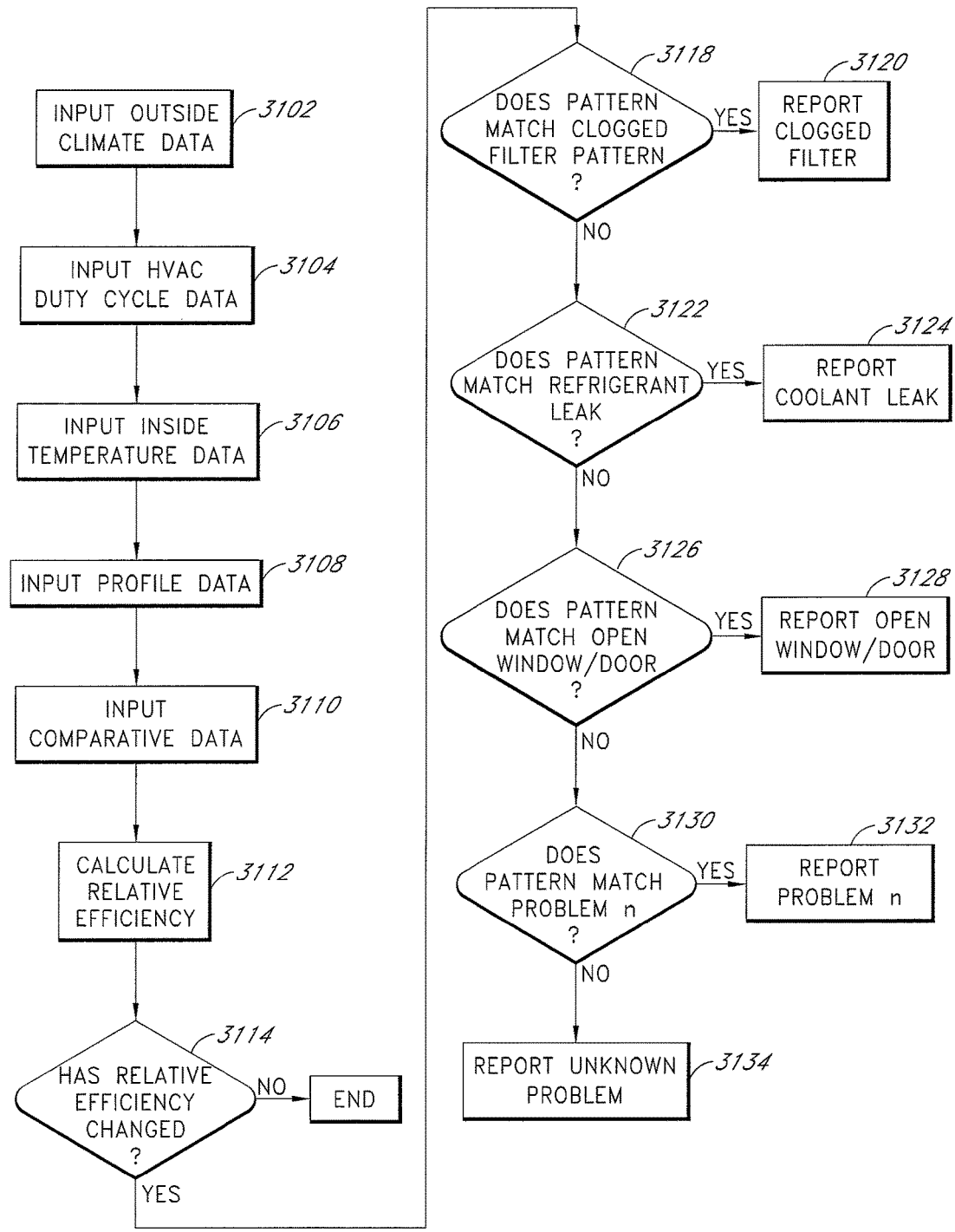
FIG. 30 is a flowchart illustrating the steps involved in determining whether an HVAC system has developed a problem that impairs efficiency using an embodiment of the subject invention.

This approach may be used to recognize and diagnose changes in operating parameters of the HVAC system over time, both generally and in individual units. FIG. 30 illustrates the steps involved in one method for diagnosing defects in the HVAC system for specific conditioned space X. In step 3102, the server retrieves climate data related to conditioned space X. Such data may include current outside temperature, outside temperature during the preceding hours, outside humidity, wind direction and speed, whether the sun is obscured by clouds, and other factors. In step 3104, the server retrieves HVAC duty cycle data for conditioned space X. Such data may include target settings for the thermostat in current and previous periods, the timing of switch-on and switch-off events and other data. In step 3106, the server retrieves data regarding current and recent temperature readings as recorded by the thermostat in conditioned space X. In step 3108, the server retrieves profile data for conditioned space X. Such data may include square footage, when the conditioned space was built and/or renovated, the extent to which it is insulated, its location within the larger structure, make, model and age of HVAC equipment associated with that specific unit, if any, and other data. In step 3110, the server retrieves comparative data from other conditioned spaces that have thermostats that also report to the server. Such data may include interior temperature readings, outside temperature for those specific locations, duty cycle data for the HVAC systems at those locations, profile data for the structures and HVAC systems associated with those conditioned spaces and the calculated thermal mass index for those other conditioned spaces. In step 3112, the server calculates the current relative efficiency of conditioned space X as compared to other conditioned spaces. Those comparisons will take into account differences in size, location, age, etc. in making those comparisons.

The server will also take into account that comparative efficiency is not absolute, but will vary depending on conditions. For example, a conditioned space that has extensive south-facing windows is likely to experience significant solar gain. On sunny winter days, that home will appear more efficient than on cloudy winter days. That same conditioned space will appear more efficient at times of day and year when trees or overhangs shade those windows than it will when summer sun reaches those windows. Thus the server may calculate efficiency under varying conditions.

For example, in step 3114 the server compares the HVAC system's efficiency, corrected for the relevant conditions, to its efficiency in the past. If the current efficiency is substantially the same as the historical efficiency, the server concludes 3116 that there is no defect and the diagnostic routine ends. If the efficiency has changed, the server proceeds to compare the historical and current data against patterns of changes known to indicate specific problems. For example, in step 3118, the server compares that pattern of efficiency changes against the known pattern for a clogged air filter, which is likely to show a slow, gradual degradation over a period of weeks or even months. If the pattern of degradation matches the clogged filter paradigm, the server creates and transmits to the appropriate party a message 3120 alerting the party to the possible problem. If the problem does not match the clogged filter paradigm, the system compares 3122 the pattern to the known pattern for a refrigerant leak, which is likely to show degradation over a period of a few hours to a few days. If the pattern of degradation matches the refrigerant leak paradigm, the server creates and transmits to the appropriate party a message 3124 alerting the party to the possible problem. If the problem does not match the refrigerant leak paradigm, the system compares 3126 the pattern to the known pattern for an open window or door, which is likely to show significant changes for relatively short periods at intervals uncorrelated with climatic patterns. If the pattern of degradation matches the open door/window paradigm, the server creates and transmits to the appropriate party a message 3128 alerting the party to the possible problem. If the problem does not match the open door/window paradigm, the system continues to step through remaining know patterns N 3130 until either a pattern is matched 3132 or the list has been exhausted without a match 3134.

Figure 31:
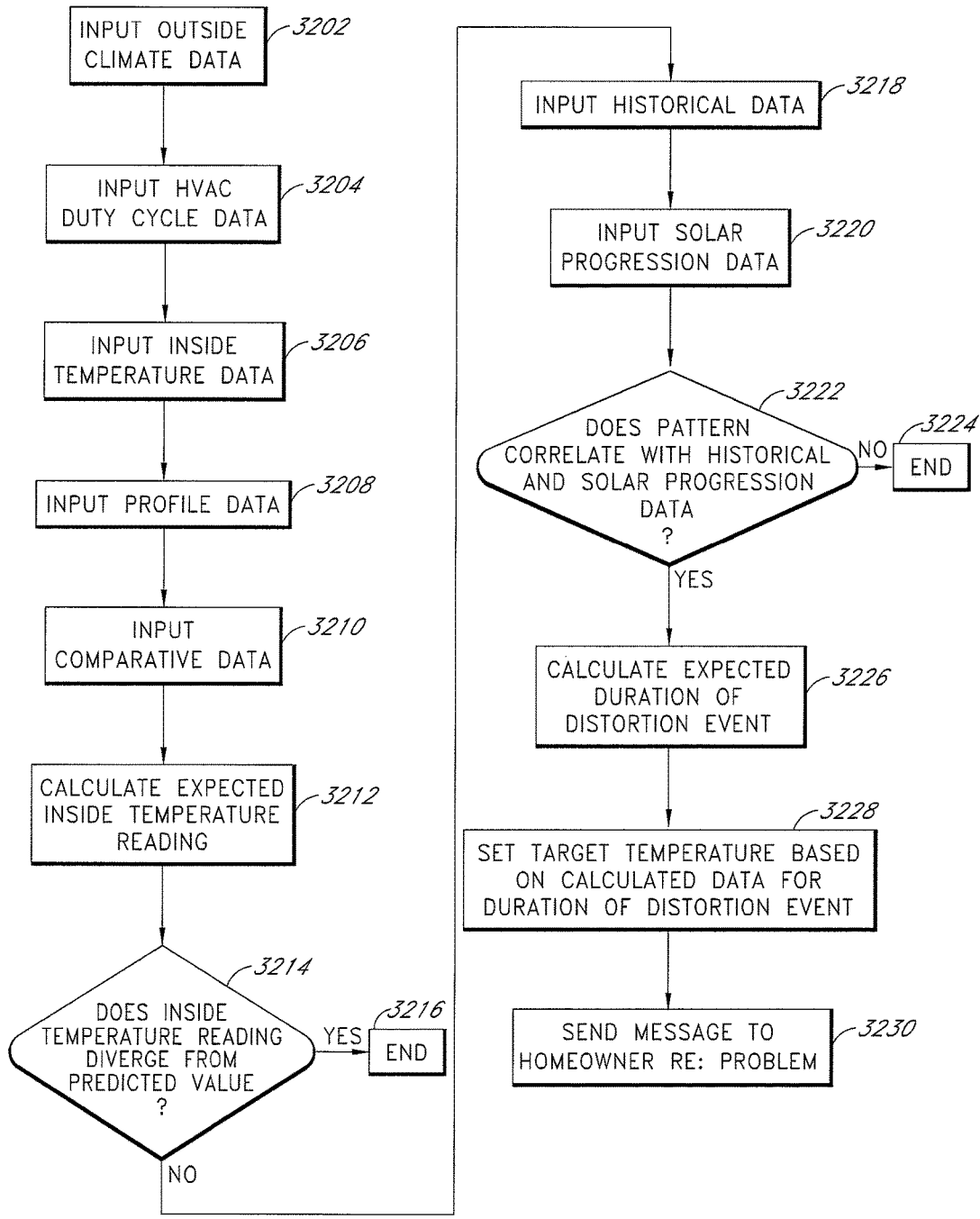
FIG. 31 is a flowchart illustrating the steps involved in correcting for erroneous readings in one conditioned space by referencing readings in another using an embodiment of the subject invention.

FIG. 31 illustrates the steps involved in one method for diagnosing inaccurate thermostat readings due to improper location. In step 3202, the server retrieves climate data related to conditioned space X. Such data may include current outside temperature, outside temperature during the preceding hours, outside humidity, wind direction and speed, whether the sun is obscured by clouds, and other factors. In step 3204, the server retrieves HVAC duty cycle data for conditioned space X. Such data may include target settings for the thermostat in current and previous periods, the timing of switch-on and switch-off events and other data. In step 3206, the server retrieves data regarding current and recent temperature readings as recorded by the thermostat in conditioned space X. In step 3208, the server retrieves profile data for conditioned space X. Such data may include square footage, when the space was built and/or renovated, the extent to which it is insulated, its location within the larger structure, make, model and age of HVAC hardware specific to that space, if any, and other data. In step 3210, the server retrieves comparative data from other conditioned spaces that have thermostats that also report to the server. Such data may include interior temperature readings, outside temperature for those specific locations, duty cycle data for the HVAC systems at those locations, profile data for the structures and HVAC systems in those conditioned spaces and the calculated thermal mass index for those other conditioned spaces. In step 3212, the server calculates the expected thermostat temperature reading based upon the input data. In step 3214, the server compares the predicted and actual values. If the calculated and actual values are at least roughly equivalent, the server concludes 3216 that there is no thermostat-related anomaly. If the calculated and actual values are not roughly equivalent, the server retrieves additional historical information about past thermostat readings in step 3218. In step 3220, the server retrieves solar progression data, i.e., information regarding the times at which the sun rises and sets on the days being evaluated at the location of the conditioned space being evaluated, and the angle of the sun at that latitude, etc. In step 3222, the server compares the characteristics of the anomalies over time, to see if, for example, abnormally high readings began at 3:12 on June $5^{th}$, 3:09 on June $6^{th}$, 3:06 on June $7^{th}$, and the solar progression data suggests that at the conditioned space being analyzed, that sun would be likely to reach a given place in that unit three minutes earlier on each of those days. If the thermostat readings do not correlate with the solar progression data, the server may conclude 3224 that the sun is not causing the distortion by directly hitting the thermostat. If the thermostat readings do correlate with solar progression, the server then calculates 3226 the predicted duration of the distortion caused by the sun. In step 3228, the server calculates the appropriate setpoint information to be used by the thermostat to maintain the desired temperature and correct for the distortion for the expected length of the event. For example, if the uncorrected setpoint during the predicted event is 72 degrees, and the sun is expected to elevate the temperature reading by eight degrees, the server will instruct the thermostat to maintain a setpoint of 80 degrees. In step 3230, the server sends the appropriate party a message describing the problem.

The instant invention may also be used to implement additional energy savings by implementing small, repeated changes in setpoint for individual conditioned spaces. Because energy consumption is strongly correlated with setpoint—that is, the further a given setpoint diverges from the balance point (the natural inside temperature assuming no HVAC activity) in a given conditioned space under given conditions, the higher energy consumption will be to maintain temperature at that setpoint), energy will be saved by any strategy that over a given time frame lowers the average heating setpoint or raises the cooling setpoint. It is therefore possible to save energy by adopting a strategy that takes advantage of human insensitivity to slow temperature ramping by incorporating a user's desired setpoint within the range of the ramp, but setting the average target temperature below the desired setpoint in the case of heating, and above it in the case of cooling. For example, a ramped summer setpoint that consisted of a repeated pattern of three phases of equal length set at 72° F., 73° F., and 74° F. would create an effective average setpoint of 73° F., but would generally be experienced by occupants as yielding equivalent comfort as in a room set at a constant 72° F. Energy savings resulting from this approach have been shown to be in the range of 4-6%.

The subject invention can automatically generate optimized ramped setpoints for individual conditioned spaces in a larger building that could save energy without compromising the comfort of the occupants. It would also be advantageous to create a temperature control system that could incorporate adaptive algorithms that could automatically determine when the ramped setpoints should not be applied due to a variety of exogenous conditions that make application of such ramped setpoints undesirable.

Figure 32:
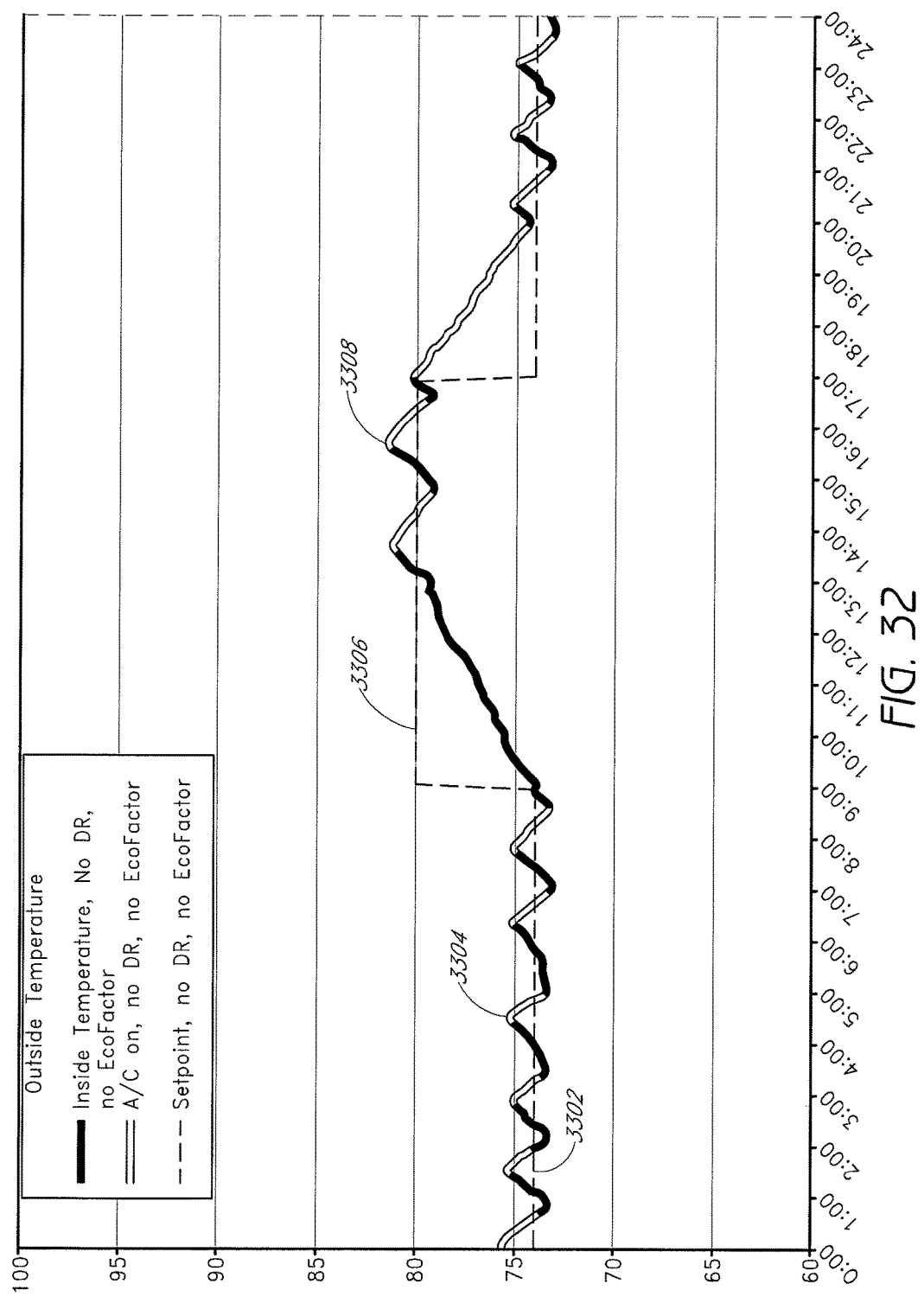
FIG. 32 shows the conventional programming of a programmable thermostat over a 24-hour period.

FIG. 32 represents the conventional programming of a thermostat and the resulting behavior of a conditioned space's HVAC system in the air conditioning context. The morning setpoint 3302 of 74 degrees remains constant from midnight until 9:00 AM, and the inside temperature 3304 varies more or less within the limits of the hysteresis band (which is generally set by the thermostat) during that entire period. When the setpoint changes to 80 degrees 3306, the inside temperature 3308 rises until it reaches and then varies within the hysteresis band around the new setpoint, and so on. Whether the average temperature is equal to, greater or less than the nominal setpoint will depend on weather conditions, the dynamic signature of the structure, and the efficiency and size of the HVAC system. But in most cases the average temperature will be at least roughly equivalent to the nominal setpoint.

Figure 33:
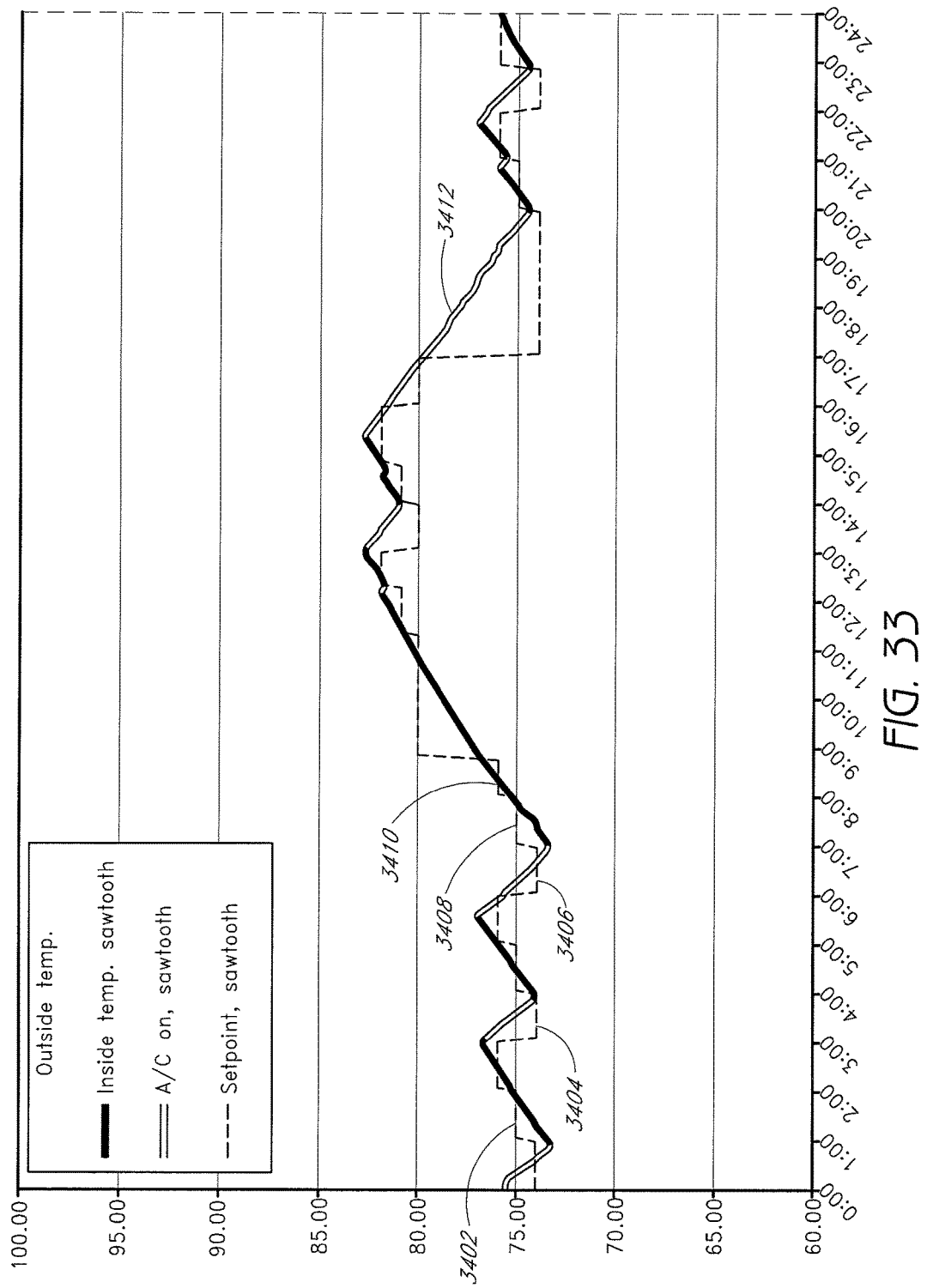
FIG. 33 shows the programming of a programmable thermostat over a 24-hour period using, ramped setpoints.

FIG. 33 represents implementation of a three-phase ramped setpoint derived from the same user preferences as manifested by the settings shown in FIG. 32. Thus the user-selected setpoint for the morning is still 74 degrees, and is reflected in the setpoint 3404 at the start of each three-step cycle, but because (in the air conditioning context) the setpoint requested by the user is the lowest of the three discrete steps, rather than the middle step, the average setpoint will be one degree higher 3402 (in the case of 1 degree steps between setpoints), and the resulting average inside temperature will be roughly one degree warmer than the average temperature without use of the ramped setpoints, thereby saving energy.

In the currently preferred embodiment, the implementation of the ramped setpoints may be dynamic based upon both conditions inside the structure and other planned setpoint changes. Thus, for example, the ramped setpoints 3406, 3408 and 3410 may be timed so that the 9 AM change in user-determined setpoint from 74 degrees to 80 degrees is in effect anticipated, and the period in which the air conditioner is not used can be extended prior to the scheduled start time for the less energy-intensive setpoint. Similarly, because the server 106 is aware that a lower setpoint will begin at 5 PM, the timing can be adjusted to avoid excessively warm temperatures immediately prior to the scheduled setpoint change, which could cause noticeable discomfort relative to the new setpoint if the air conditioner is incapable of quickly reducing inside temperature on a given day based upon the expected slope of inside temperatures at that time 3412.

In order to implement such ramped setpoints automatically, algorithms may be created. These algorithms may be generated and/or executed as instructions on remote server 106 and the resulting setpoint changes can be transmitted to a given thermostat on a just-in-time basis or, if the thermostat 108 is capable of storing future settings, they may be transferred in batch mode to such thermostats. Basic parameters used to generate such algorithms include:
 the number of discrete phases to be used;
 the temperature differential associated with each phase; and
 the duration of each phase.

In order to increase user comfort and thus maximize consumer acceptance, additional parameters may be considered, including:
 time of day
 outside weather conditions
 recent history of manual inputs; and
 recent pre-programmed setpoint changes.

Time of day may be relevant because, for example, if the home is typically unoccupied at a given time, there is no need for perceptual programming. Outside weather is relevant because comfort is dependent not just on temperature as sensed by a thermostat, but also includes radiant differentials. On extremely cold days, even if the inside dry-bulb temperature is within normal comfort range, radiant losses due to cold surfaces such as single-glazed windows can cause subjective discomfort; thus on such days occupants may be more sensitive to ramping. Recent manual inputs (e.g., programming overrides) may create situations in which exceptions should be taken; depending on the context, recent manual inputs may either suspend the ramping of setpoints or simply alter the baseline temperature from which the ramping takes place.

Figure 34:
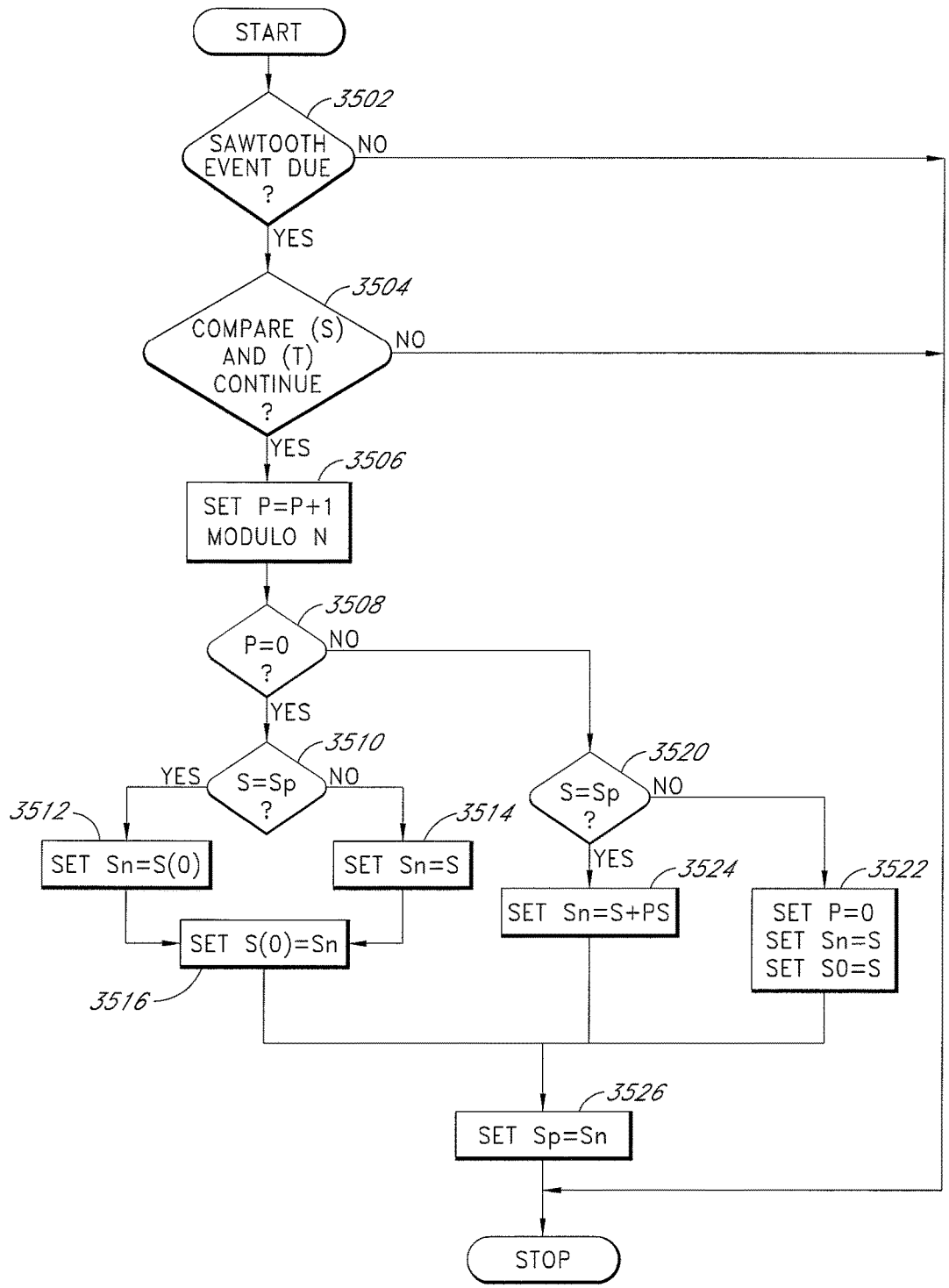
FIG. 34 shows the steps required for the core function of the ramped setpoint algorithm.

FIG. 34 shows the steps used in an embodiment of the core ramped setpoint algorithm in the context of a remotely managed thermostat system. In step 3502 the application determines whether to instantiate the algorithm based upon external scheduling criteria. Such information may include previously learned occupancy patterns, previously learned temperature preferences, responses to previous implementations of energy-savings strategies, etc. In step 3504 the application running on a remote server retrieves from the thermostat the data generated by or entered into the thermostat, including current temperature settings, HVAC status and inside temperature. The algorithm performs preliminary logical tests at that point to determine whether further processing is required. For example, in the heating context, if the inside temperature as reported by the thermostat 108 is more than 1 degree higher than the current setpoint, the algorithm may determine that running the ramped setpoint program will have no effect and therefore terminate. In step 3506 the algorithm advances to the next phase from the most recent phase; i.e., if the algorithm is just starting, the phase changes from "0" to "1"; if it has just completed the third phase of a three-phase ramp, the phase will change from "2" to "0". In step 3508 the application determines if the current phase is "0". If it is, then in step 3510 the algorithm determines whether current setpoint equals the setpoint in the previous phase. If so, which implies no manual overrides or other setpoint adjustments have occurred during the most recent phase, then in step 3512 the algorithm sets the new setpoint back to the previous phase "0" setpoint. If not, then in step 3514, the algorithm keeps the current temperature setting as setpoint for this new phase. In step 3516, the algorithm logs the resulting new setpoint as the new phase "0" setpoint for use in subsequent phases.

Returning to the branch after step 3508, if the current phase at that point is not phase "0", then in step 3520, the algorithm determines whether the current setpoint is equal to the setpoint temperature in the previous phase. If not, which implies setpoints have been adjusted by the occupants, thermostat schedules, or other events, then in step 3522, the application resets the phase to "0", resets the new setpoint associated with phase "0" to equal the current temperature setting, and sets the current setting to that temperature. Alternatively, if the current temperature setting as determined in step 3520 is equal to the setpoint in the previous phase, then in step 3524 new setpoint is made to equal current setpoint plus the differential associated with each phase change. In step 3526 the "previous-phase setpoint" variable is reset to equal the new setpoint in anticipation of its use during a subsequent iteration.

Figure 35:
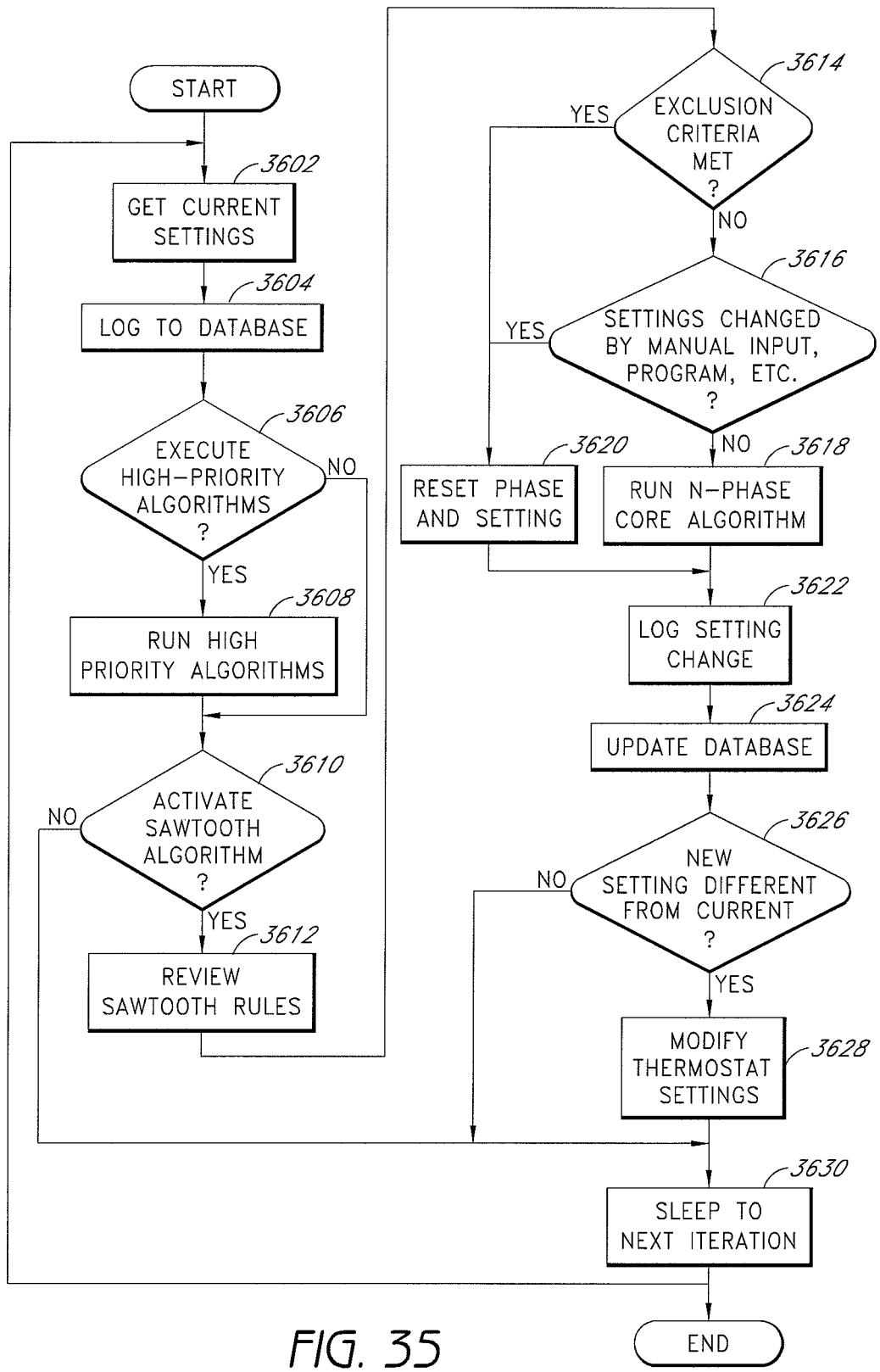
FIG. 35 shows a flowchart listing steps in the process of deciding whether to implement the ramped setpoint algorithm using an embodiment of the subject invention.

FIG. 35 shows one embodiment of the overall control application implementing the algorithm described in FIG. 35. In step 3602, the control application retrieves the current setting from the thermostat. In step 3604, the setting is logged in database 300. In step 3606, the control program determines whether other algorithms that have higher precedence than the ramped setpoint algorithm are to be run. If another algorithm is to be run prior to the ramped setpoint algorithm, then the other program is executed in step 3608. If there are no alternate algorithms that should precede the ramped setpoint application then in step 3610, the control program determines whether the thermostat has been assigned to execute the ramped setpoint program. If not, the control program skips the remaining actions in the current iteration. If the program is set to run, then in step 3612 the algorithm retrieves from database 300 the rules and parameters governing the implementation of the algorithm for the current application of the program. In step 3614, the algorithm determines whether one or more conditions that preclude application of the algorithm, such as extreme outside weather conditions, whether the home is likely to be occupied, execution of a conflicting algorithm, etc. If any of the exclusionary conditions apply, the application skips execution of the ramped setpoint algorithm for the current iteration. If not, the application proceeds to step 3616 in which the application determines whether the setpoint has been altered by manual overrides, thermostat setback schedule changes, or other algorithms as compared to the previous value as stored in database 300. If the setpoint has been altered, the application proceeds to step 3620 discussed below. In step 3618, the program described in FIG. 34 is executed. In step 3620, the application resets the phase to "0". Certain temperature setting variables are reset in anticipation of their use in subsequent phases. These variables include the new phase 0 temperature setting, which is anchored to the current actual temperature setting, and the new previous-phase setpoint, which will be used for identifying setpoint, overrides in the subsequent phase.

In step 3622, the system records the changes to the thermostat settings to database 300. In step 3624, the system records the changes to the phase status of the algorithm to database 300. In step 3626, the application determines whether the new temperature setting differs from the current setting. If they are the same, the application skips applying changes to the thermostat. If they are different, then in step 3628, the application transmits revised settings to the thermostat. In step 3630, the application then hibernates for the specified duration until it is invoked again by beginning at step 3602 again.

Figure 36:
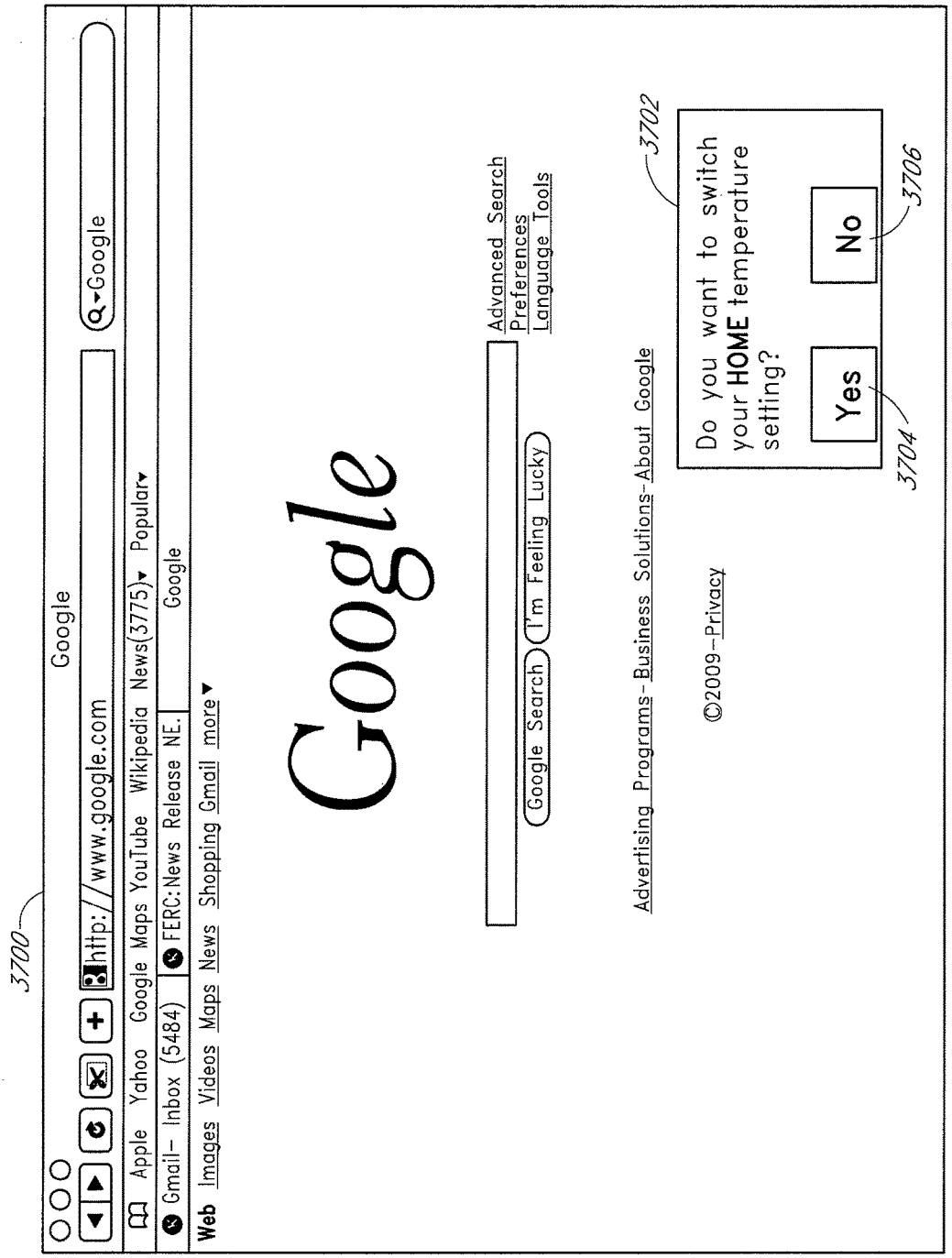
FIG. 36 shows the browser as seen on the display of the computer used as part of an embodiment of the subject invention.

The subject invention may also be used to detect occupancy of a specific conditioned space through the use of software related to electronic devices located inside the conditioned structure, such as the browser running on computer or other device 104. FIG. 36 represents the screen of a computer, television or other device 104 using a graphical user interface connected to the Internet. The screen shows that a browser 3700 is displayed on computer 104. In one embodiment, a background application installed on computer 104 detects activity by a user of the computer, such as cursor movement, keystrokes or otherwise, and signals the application running on server 106 that activity has been detected. Conversely, a lack of activity on devices normally associated with an individual occupancy unit may suggest, but cannot conclusively show, that the unit is occupied. Server 106 may then, depending on context, (a) transmit a signal to thermostat 108 changing setpoint because occupancy has been detected at a time when the system did not expect occupancy (or that non-occupancy has been inferred when occupancy is assumed to be the norm); (b) signal the background application running on computer 104 to trigger a software routine that instantiates a pop-up window 3702 that asks the user if the server should change the current setpoint, alter the overall programming of the system based upon a new occupancy pattern, etc. The user can respond by clicking the cursor on "yes" button 3704 or "No" button 3706. Equivalent means of signalling activity may be employed with interactive television programming, gaming systems, etc.

Figure 37:
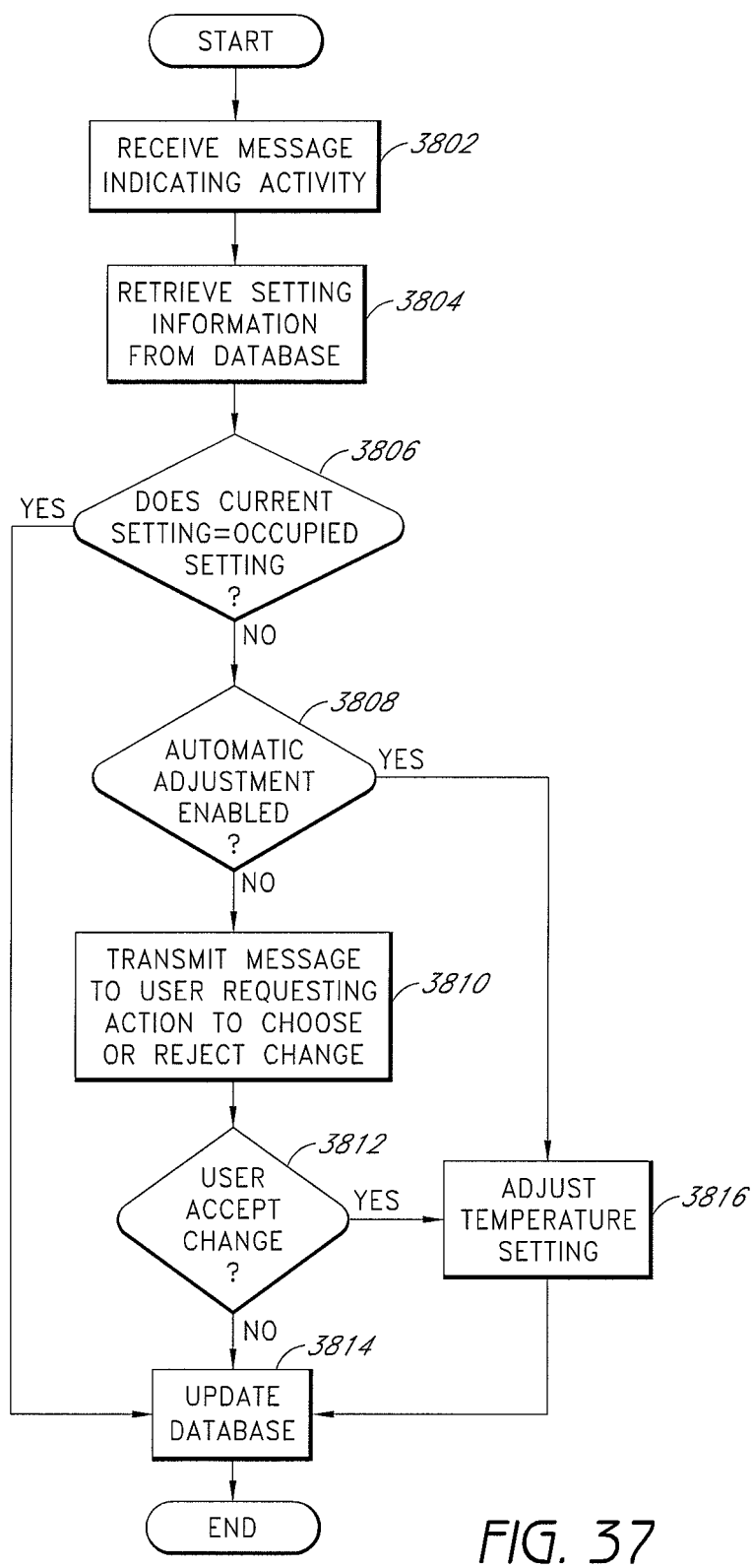
FIG. 37 is a flowchart showing the steps involved in the operation of one embodiment of the subject invention.

FIG. 37 is a flowchart showing the steps involved in the operation of one embodiment of the subject invention. In step 3802, computer 104 transmits a message to server 106 via the Internet indicating that there is user activity on computer 104. This activity can be in the form of keystrokes, cursor movement, input via a television remote control, etc. In step 3804 the application queries database 300 to retrieve setting information for the associated HVAC system. In step 3806 the application determines whether the current HVAC program is intended to apply when the conditioned space is occupied or unoccupied. If the HVAC settings then in effect are intended to apply to an occupied unit, then the application terminates for a specified interval. If the HVAC settings then in effect are intended to apply when the home is unoccupied, then in step 3808 the application will retrieve from database 300 the user's specific preferences for how to handle this situation. If the user has previously specified (at the time that the program was initially set up or subsequently modified) that the user prefers that the system automatically change settings under such circumstances, the application then proceeds to step 3816, in which it changes the programmed setpoint for the thermostat to the setting intended for the conditioned space when occupied. If the user has previously specified that the application should not make such changes without further user input, then in step 3810 the application transmits a command to computer 104 directing the browser to display a message informing the user that the current setting assumes an unoccupied conditioned space and asking the user in step 3812 to choose whether to either keep the current settings or revert to the pre-selected setting for an occupied conditioned space. If the user elects to retain the current setting, then in step 3814 the application will write to database 300 the fact that the users has so elected and terminate. If the user elects to change the setting, then in step 3816 the application transmits the revised setpoint to the thermostat. In step 3814 the application writes the updated setting information to database 300. Similar logic may be used to proceed from a lack of activity on computer 104 to a conclusion that the HVAC settings should be optimized for an unoccupied state.

Figure 38:
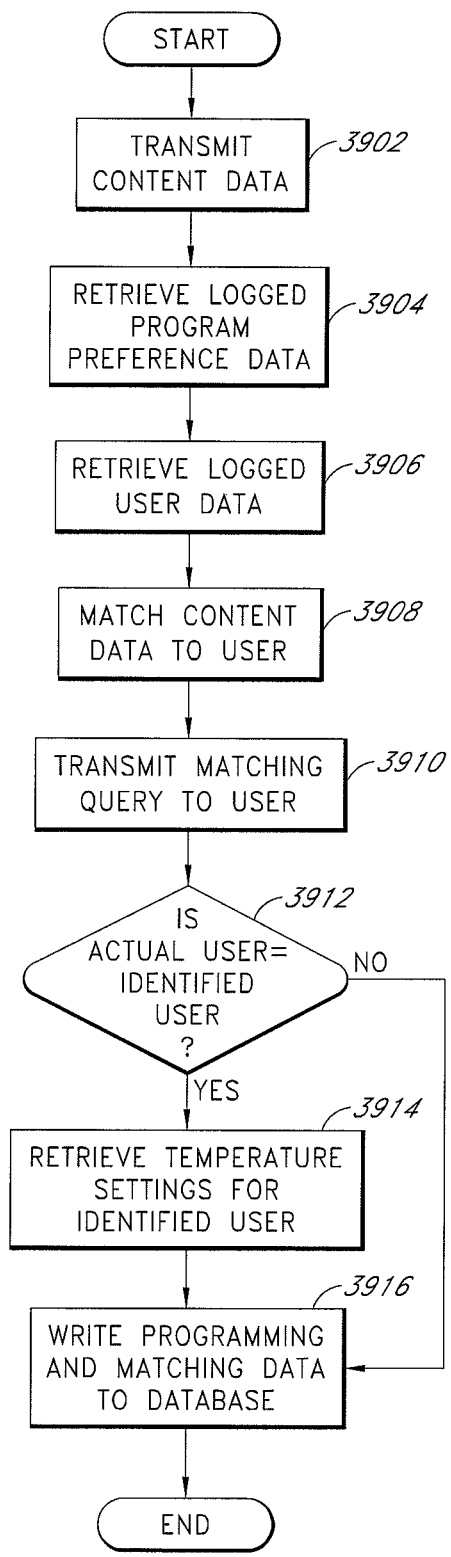
FIG. 38 is a flowchart that shows how an embodiment of the invention can be used to select different HVAC settings based upon its ability to identify which of multiple potential occupants is using the computer attached to the system.

FIG. 38 is a flowchart that shows how the subject invention can be used to select different HVAC settings based upon its ability to identify which of multiple potential occupants is using the computer or other device connected to the system. In step 3902 computer 104 transmits to server 106 information regarding the type of activity detected on computer 104. Such information could include the specific program or channel being watched if, for example, computer 104 is used to watch television. The information matching, for example, TV channel 7 at 4:00 PM on a given date to specific content may be made by referring to Internet-based or other widely available scheduling sources for such content. In step 3904 server 106 retrieves from database 300 previously logged data regarding viewed programs. In step 3906 server 106 retrieves previously stored data regarding the occupants of the conditioned space. For example, upon initiating the service, one or more users may have filled out online questionnaires sharing their age, gender, schedules, viewing preferences, etc. In step 3908, server 106 compares the received information about user activity to previously stored information retrieved from database 300 about the occupants and their viewing preferences. For example, if computer 104 indicates to server 106 that the computer is being used to watch golf, the server may conclude that an adult male is watching; if computer 104 indicates that it is being used to watch children's programming, server 106 may conclude that a child is watching. In step 3910 the server transmits a query to the user in order to verify the match, asking, in effect, "Is that you, Bob?" In step 3912, based upon the user's response, the application determines whether the correct user has been identified. If the answer is no, then the application proceeds to step 3916. If the answer is yes, then in step 3914 the application retrieves the temperature preferences for the identified occupant. In step 3916 the application writes to database 300 the programming information and information regarding matching of users to that programming.

In an alternative embodiment, the application running on computer 104 may respond to general user inputs (that is, inputs not specifically intended to instantiate communication with the remote server) by querying the user whether a given action should be taken. For example, in a system in which the computer 104 is a web-enabled television or web-enabled set-top device connected to a television as a display, software running on computer 104 detects user activity, and transmits a message indicating such activity to server 106. The trigger for this signal may be general, such as changing channels or adjusting volume with the remote control or a power-on event. Upon receipt by server 106 of this trigger, server 106 transmits instructions to computer 104 causing it to display a dialog box asking the user whether the user wishes to change HVAC settings.

Alternatively, server 106 may use biometric data provided by computer 104, such as fingerprints (which some computers and other devices now require for log-in), retinal scans, or other methods for identifying the user of an electronic device.

Those skilled in the relevant arts will likely recognize ways to apply the subject invention in additional contexts. In addition to use with chiller-based HVAC systems as described herein, the subject invention is also capable of use with other centralized systems including steam boilers, hydronic centralized heating, etc. The subject invention will be of value whenever a central plant is used to deliver space conditioning to separately owned or rented spaces, regardless of the means of generating and moving the conditioning (heating or cooling) medium.

Embodiments of the invention are also described above with reference to flow chart illustrations and/or block diagrams of methods, components, apparatus, systems, and the like. It will be understood that each block of the flow chart illustrations and/or block diagrams as well as each component, apparatus and system can be individually implemented or in any combination.

While particular embodiments of the present invention have been shown and described, it is apparent that changes and modifications may be made without departing from the invention in its broader aspects, and, therefore, that the invention may be carried out in other ways without departing from the true spirit and scope.

What is claimed is:

1. A system for allocating the cost of operating an HVAC system that air conditions a plurality of individual units of occupancy, the HVAC system comprising:
    a chiller-based air conditioning system that air conditions a plurality of individual units of occupancy in a building, the plurality of individual units of occupancy associated with different occupants, the chiller-based air conditioning system comprising a central chiller, at least one pipe with fluid, and a plurality of fans that condition the plurality of individual units of occupancy by blowing air over the at least one pipe;
    a first thermostatic controller comprising a thermostat, the thermostatic controller configured to turn on or off at least a first fan that is associated with a first unit of occupancy of the plurality of individual units of occupancy at least in part based on temperature readings from inside the first individual unit of occupancy, the first thermostatic controller further configured to determine when the first fan associated with the first individual unit of occupancy is on or off, the first thermostatic controller further configured to determine a speed of the first fan, the first thermostatic controller further configured to generate reports comprising whether the first fan is "on" or "off" and the speed of the first fan, wherein said first thermostatic controller does not directly measure electrical current flowing through said central chiller or directly measure voltage applied to said central chiller;
    a second thermostatic controller comprising a thermostat, the thermostatic controller configured to turn on or off at least a second fan that is associated with a second unit of occupancy of the plurality of individual units of occupancy at least in part based on temperature readings from inside the second individual unit of occupancy, the second thermostatic controller further configured to determine when the second fan associated with the second individual unit of occupancy is on or off, the second thermostatic controller further configured to determine a speed of the second fan, the second thermostatic controller further configured to generate reports comprising whether the second fan is "on" or "off" and the speed of the second fan, wherein said second thermostatic controller does not directly measure electrical current flowing through said central chiller or directly measure voltage applied to said central chiller;

at least one or more processors not located inside the first individual unit of occupancy or the second individual unit of occupancy that is in communication with at least the first thermostat and the second thermostat, wherein the one or more processors receives the reports from the first thermostatic controller that the first fan is turned on or off and the speed of the first fan, and receives the reports from the second thermostatic controller that the second fan is turned on or off and the speed of the second fan, the one or more processors configured to:
 record first sequential time intervals for the first thermostat based on the reports that said first fan associated with the first individual unit of occupancy is on or off;
 determine at least a first portion of a cost of operation of said central chiller associated with at least said first individual unit of occupancy based at least in part by evaluating operating time of said first fan and the speed of said first fan during said first sequential time intervals, and
 record second sequential time intervals for the second thermostat based on the reports that the second fan associated with the second individual unit of occupancy is on or off,
 determine at least a second portion of said cost of operation of said central chiller associated with at least said second individual unit of occupancy based at least in part by evaluating operating time of said second fan and the speed of said second fan during said second sequential time intervals;

a database for storing data reported by at least the first thermostat and the second thermostat; and
where directly sensing electrical current is not used to quantify the cost of operating said central chiller for any individual unit of occupancy, and where said first thermostat and said second thermostat do not directly measure electricity consumed by said central chiller.

2. A system as in claim 1 in which each of the plurality of individual units of occupancy is an apartment.

3. A system as in claim 1 in which the thermostatic controller communicates at least in part via a wireless network.

4. A system as in claim 1 in which the thermostatic controller communicates at least in part via the Internet.

5. A system as in claim 1 in which the fluid used to transfer heat between the first fan and the central chiller is water.

6. A system as in claim 1 in which the medium used to transfer heat between the first fan and the central chiller is steam.

7. A system as in claim 1 in which the individual unit of occupancy is a non-residential commercial space.

8. A system as in claim 1 in which the building comprises multiple stories.

9. A method for allocating the cost of operating an HVAC system that air conditions a plurality of individual units of occupancy, the method comprising:
 air conditioning a plurality of individual units of occupancy in a building, the plurality of individual units of occupancy associated with different occupants, wherein the air conditioning is performed by a plurality of fans that blow air over at least one pipe with fluid, the pipe connected to a chiller-based air conditioning system comprising at least a central chiller;
 receiving reports at one or more processors not located inside a first individual unit of occupancy or a second individual unit of occupancy, the reports including data about a first fan of the plurality of fans from a first thermostatic controller that turns on or off said at least first fan that is associated with a first individual unit of occupancy of the plurality of individual units of occupancy at least in part based on temperature readings from inside the first individual unit of occupancy, and the first thermostatic controller further configured to determine a speed of the first fan, wherein the reports comprise whether the at least first fan is associated with the first individual unit of occupancy is on or off and the speed of the at least first fan, wherein said first thermostatic controller does not directly measure electrical current flowing through said central chiller or directly measure voltage applied to said central chiller;
 receiving reports at one or more processors not located inside a first individual unit of occupancy or a second individual unit of occupancy, the reports including data about a second fan of the plurality of fans with a second thermostatic controller that turns on or off said at least second fan that is associated with a second individual unit of occupancy of the plurality of individual units of occupancy at least in part based on temperature readings from inside the second individual unit of occupancy, the second thermostatic controller further configured to determine a speed of the second fan, wherein the reports comprise whether the at least second fan associated with the second individual unit of occupancy is on or off and the speed of the at least second fan, where said second thermostatic controller does not directly measure electrical current flowing through said central chiller or directly measure voltage applied to said central chiller;
 recording with the one or more processors not located inside the first individual unit of occupancy or the second individual unit of occupancy, first sequential time intervals for said first thermostat based on the reports that said first fan associated with the first individual unit of occupancy is on or off;
 determining with the one or more processors not located inside the first individual unit of occupancy or the second individual unit of occupancy, at least a first portion of a cost of operation of said central chiller associated with at least said first individual unit of occupancy based at least in part by evaluating operating times of said first fan and the speed of the first fan during said first sequential time intervals, and
 recording with the one or more processors not located inside the first individual unit of occupancy or the second individual unit of occupancy, second sequential time intervals for the second thermostat based on the reports that the second fan associated with the second individual unit of occupancy is on or off;
 determining with the one or more processors not located inside the first individual unit of occupancy or the second individual unit of occupancy, at least a second portion of said cost of operation of said central chiller associated with at least said second individual unit of occupancy based at least in part by evaluating operation time of said second fan and the speed of said second fan during said second sequential time intervals;

determining with the one or more processors not located inside the first individual unit of occupancy or the second individual unit of occupancy second run times associated with the second fan based at least in part by evaluating said second sequential time intervals data for said second thermostat and the speed of the second fan during said second sequential time intervals;

where directly sensing electrical current is not used to quantify the cost of operating said central chiller within any individual unit of occupancy; and where said first thermostat and said second thermostat do not directly measure electricity consumed by said central chiller.

10. A method as in claim 9 in which each of the plurality of individual units of occupancy is an apartment.

11. A method as in claim 9 in which the thermostatic controller communicates at least in part via a wireless network.

12. A method as in claim 9 in which the thermostatic controller communicates at least in part via the Internet.

13. A method as in claim 9 in which the fluid used to transfer heat between the at least first fan and the central chiller is water.

14. A method as in claim 9 in which the fluid used to transfer heat between the at least first fan and the central chiller is steam.

15. A method as in claim 9 in which the plurality of individual units of occupancy are non-residential commercial spaces.

16. A method as in claim 9 in which the building comprises multiple stories.

* * * * *